(12) United States Patent
Gross

(10) Patent No.: US 11,673,721 B2
(45) Date of Patent: Jun. 13, 2023

(54) LIDDED CONTAINER

(71) Applicant: PackIt, LLC, Agoura Hills, CA (US)

(72) Inventor: Kenneth Arthur Gross, Porter Ranch, CA (US)

(73) Assignee: PACKIT, LLC, Agoura Hills, CA (US)

( * ) Notice: Subject to any disclaimer, the term of this patent is extended or adjusted under 35 U.S.C. 154(b) by 32 days.

(21) Appl. No.: 17/235,781

(22) Filed: Apr. 20, 2021

(65) Prior Publication Data

US 2021/0323737 A1 Oct. 21, 2021

Related U.S. Application Data

(60) Provisional application No. 63/037,949, filed on Jun. 11, 2020, provisional application No. 63/012,838, filed on Apr. 20, 2020.

(51) Int. Cl.
| | |
|---|---|
| *B65D 51/18* | (2006.01) |
| *B65D 43/22* | (2006.01) |
| *A47J 41/00* | (2006.01) |
| *B65D 81/38* | (2006.01) |
| *B65D 23/10* | (2006.01) |
| *A47J 41/02* | (2006.01) |

(52) U.S. Cl.
CPC .......... *B65D 51/18* (2013.01); *A47J 41/0022* (2013.01); *A47J 41/02* (2013.01); *B65D 23/10* (2013.01); *B65D 43/22* (2013.01); *B65D 81/3846* (2013.01); *B65D 2251/0025* (2013.01); *B65D 2251/0084* (2013.01)

(58) Field of Classification Search
CPC ........ B65D 51/18; B65D 23/10; B65D 43/22; B65D 81/3846; B65D 2251/0025; B65D 2251/0084; B65D 2251/1058; B65D 43/165; B65D 81/3841; B65D 43/26; B65D 43/167; B65D 2543/00046; B65D 2251/1033; B65D 2251/1083; B65D 43/161; A47J 41/0022; A47J 41/02; A47J 41/0027; A45F 3/18; A47G 19/2288; A47G 19/2272
USPC .... 220/254.2, 822, 849, 203.23, 254.1, 634, 220/709, 715, 739; 222/210, 131; 215/12.1, 13.1, 229, 236, 237, 245, 389
See application file for complete search history.

(56) References Cited

U.S. PATENT DOCUMENTS

| | | | |
|---|---|---|---|
| 5,029,719 A | * | 7/1991 | Solomon .............. B65D 47/243 |
| | | | D7/619.1 |
| 5,094,363 A | | 3/1992 | Monahan et al. |
| (Continued) | | | |

FOREIGN PATENT DOCUMENTS

| | | | | |
|---|---|---|---|---|
| CN | 208017326 U | * | 10/2018 | ............. A47G 19/22 |
| CN | 208017326 U | | 10/2018 | |
| JP | 2006188281 A | | 7/2006 | |
| (Continued) | | | | |

OTHER PUBLICATIONS

International Search Report and Written Opinion filed in PCT/US2021/028233; dated Aug. 6, 2021; 10 pgs.

*Primary Examiner* — Jennifer Robertson
*Assistant Examiner* — John Martin Hoppmann
(74) *Attorney, Agent, or Firm* — Vedder Price P.C.

(57) ABSTRACT

The present application generally relates to devices and methods for transporting items, and it more specifically relates to insulated carriers for use in carrying temperature-controlled items such as beverages and food.

1 Claim, 69 Drawing Sheets

(56) References Cited

U.S. PATENT DOCUMENTS

2013/0248531 A1\* 9/2013 Lane ...................... B65B 43/38
 220/849
2016/0068313 A1 3/2016 Hart

FOREIGN PATENT DOCUMENTS

JP 2019112101 A 7/2019
KR 20110043129 A \* 4/2011 ............. A45D 33/24

\* cited by examiner

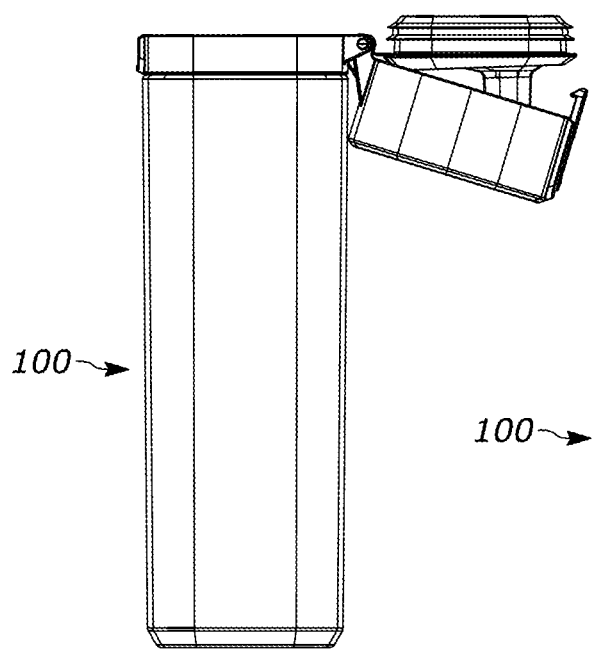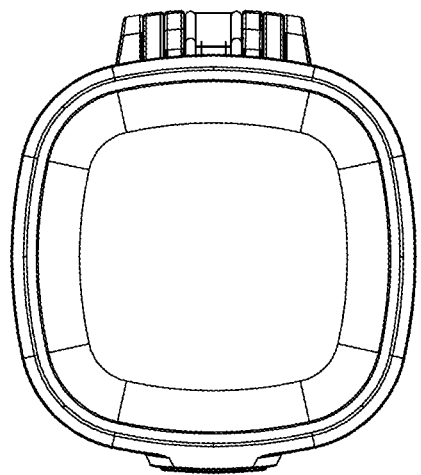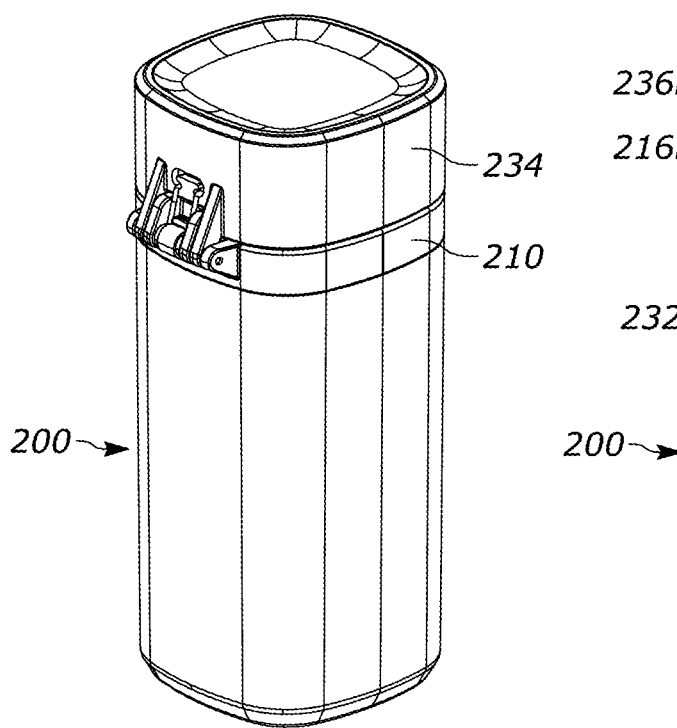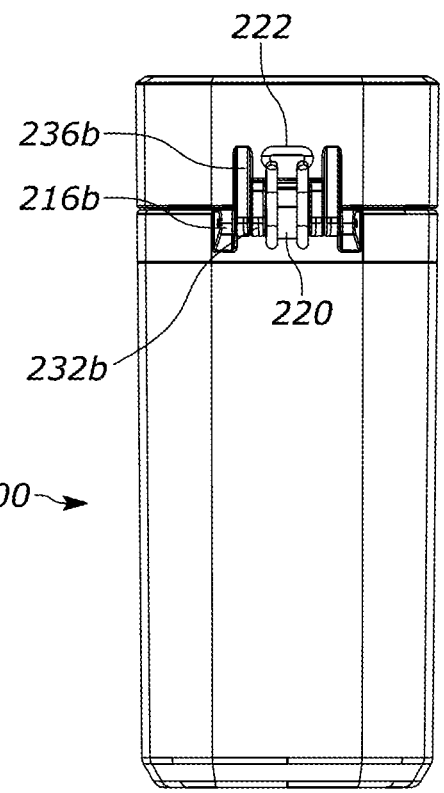
FIG. 43
FIG. 44
FIG. 45
FIG. 46

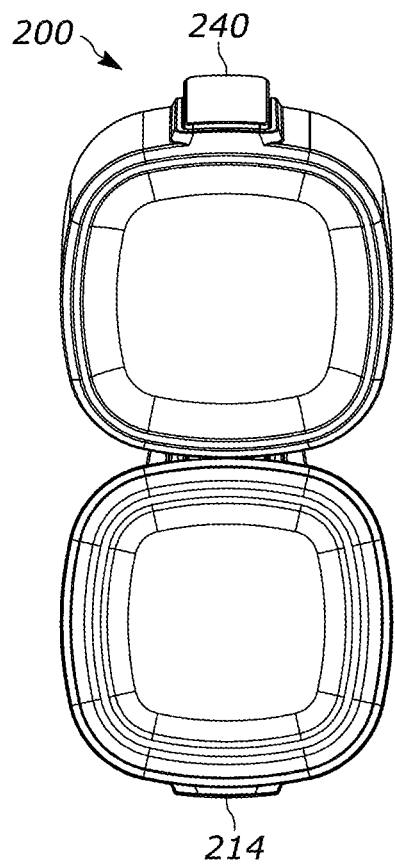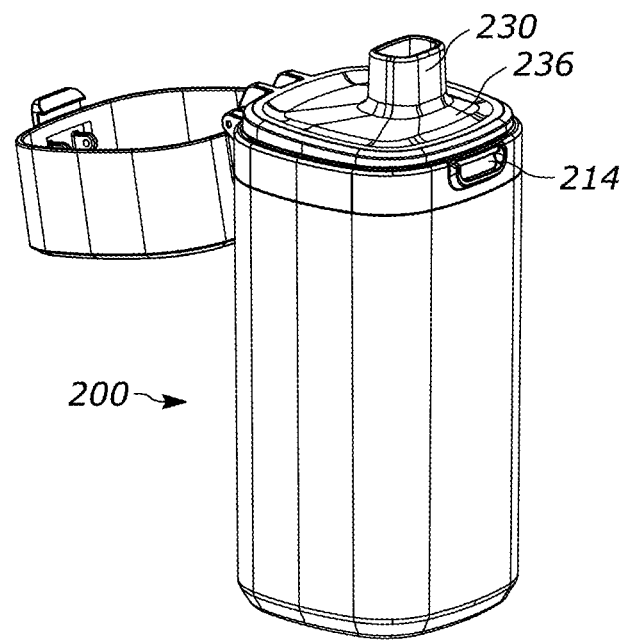
FIG. 55　　　　　　　　　　FIG. 56
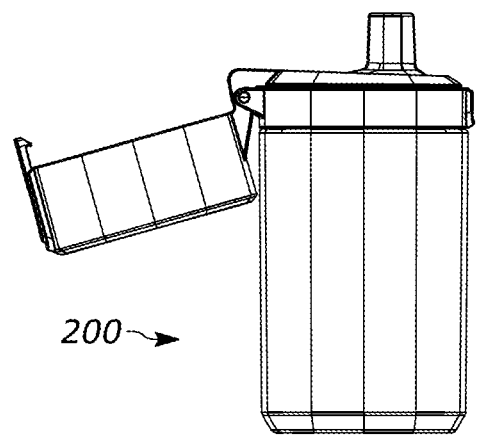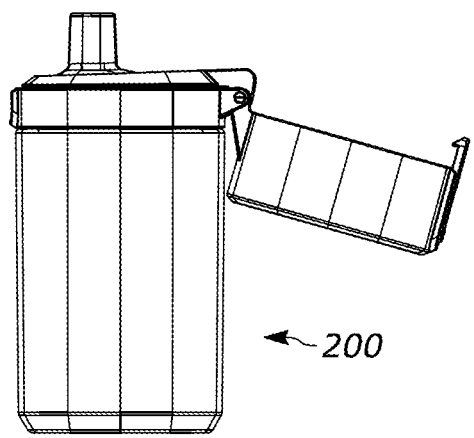
FIG. 57　　　　　　　　　　FIG. 58

LIDDED CONTAINER

CROSS-REFERENCE TO RELATED APPLICATION

This application claims benefit of U.S. Provisional Patent Application No. 63/012,838, filed Apr. 20, 2020 and U.S. Provisional Patent Application No. 63/037,949 filed Jun. 11, 2020, the entire disclosure of each of which is incorporated herein by reference.

FIELD OF THE INVENTION

The present invention generally relates to devices and methods for transporting items, and it more specifically relates to containers for use in carrying temperature-controlled beverages and/or food items.

BACKGROUND

Reusable insulated containers for food and beverages (e.g., vacuum insulated mugs, tumblers, water bottles, storage containers and the like) are frequently used to maintain a desired temperature of their contents. Such containers are particularly desirable for transporting food and beverages, such as to bring coffee from home to the office or to bring temperature-controlled food with an individual on a hike.

There are a number of factors that must be considered for such containers. First, the container must typically function to maintain the temperature of its contents despite having varying temperatures in the exterior environment—keeping hot items hot and/or cold items cold. Second, the container must be rugged enough to continue to function despite being dropped, shaken, or jostled while in use. Complicated containers with multiple separate parts create challenges in that such parts may be lost, misplaced, or damaged. Finally, such containers generally must be sealable (i.e., using a lid) to prevent spills and maintain insulation while still allowing ready access to their contents.

Existing designs for insulated food and beverage containers typically feature one of three types of lids.

First, known containers feature lids that are solid and do not include any openings or apertures through which the contents of the container may pass. To access the interior of the container such as to, fill the container with a beverage or to drink a beverage already in the container, the lid must be entirely removed. This creates a risk that the user may spill the beverage while trying to drink and allows a greater volume of air to enter the container than otherwise would be necessary, thereby raising the temperature of a beverage that is cooler than the ambient environment or lowering the temperature of a beverage that is warmer than the ambient environment.

Second, known containers include lids with one or more unobstructed openings through which a beverage can exit the container. Such lids are always open, allowing air to readily enter the container and liquid to readily escape from the container if it is tipped or dropped. While these designs avoid the need to entirely open the container in order to drink the beverage, they present serious disadvantages in that they do not prevent spills and have limited insulating properties.

Third, known containers include lids with openings that may be selectively sealed or unsealed, for example by inserting and removing an obstruction. Such designs, however, feature increased complexity and are prone to being damaged or wearing out. Designs that feature removable obstruction risk having the obstruction misplaced by the user, preventing the opening(s) from being sealed. Further, many designs of this type are difficult for a user to fully clean, as the lid features multiple connected parts and must be disassembled prior to cleaning and reassembled after cleaning.

For any design that features a removable lid, the removable lid is subject to becoming separated from the container and potentially lost. Therefore, a need exists to have an improved container and lid that permit the user to access the contents of the container without fully removing the lid, wherein the lid also provides a good seal to hold the contents in the container and insulate the contents from the environment.

SUMMARY

A need exists for improved devices for storing and transporting items, particularly those beverages that must be maintained in a temperature-controlled environment. The devices and related methods described in the present disclosure address the drawbacks of existing designs.

Embodiments disclosed in the present application provide such improved containers featuring both an outer lid and an inner lid. In particular, the disclosed embodiments provide an inner lid that serves to insulate the contents of the container and/or allow a user to consume a beverage in the container without spilling and an outer lid that serves to fully seal the container to prevent spills. The lids are rotatably attached to the container such that the lids cannot be lost during normal use, storage, or cleaning of the container.

The present disclosure further provides methods of using an improved container.

BRIEF DESCRIPTION OF THE DRAWINGS

Certain embodiments are shown in the drawings. However, it is understood that the present disclosure is not limited to the arrangements and instrumentality shown in the attached drawings.

FIGS. 27 through 44 are various alternative views of the first embodiment of a container in accordance with the present disclosure;

FIGS. 45 through 67 are various alternative views of the second embodiment of a container in accordance with the present disclosure;

DETAILED DESCRIPTION

Figure 1:
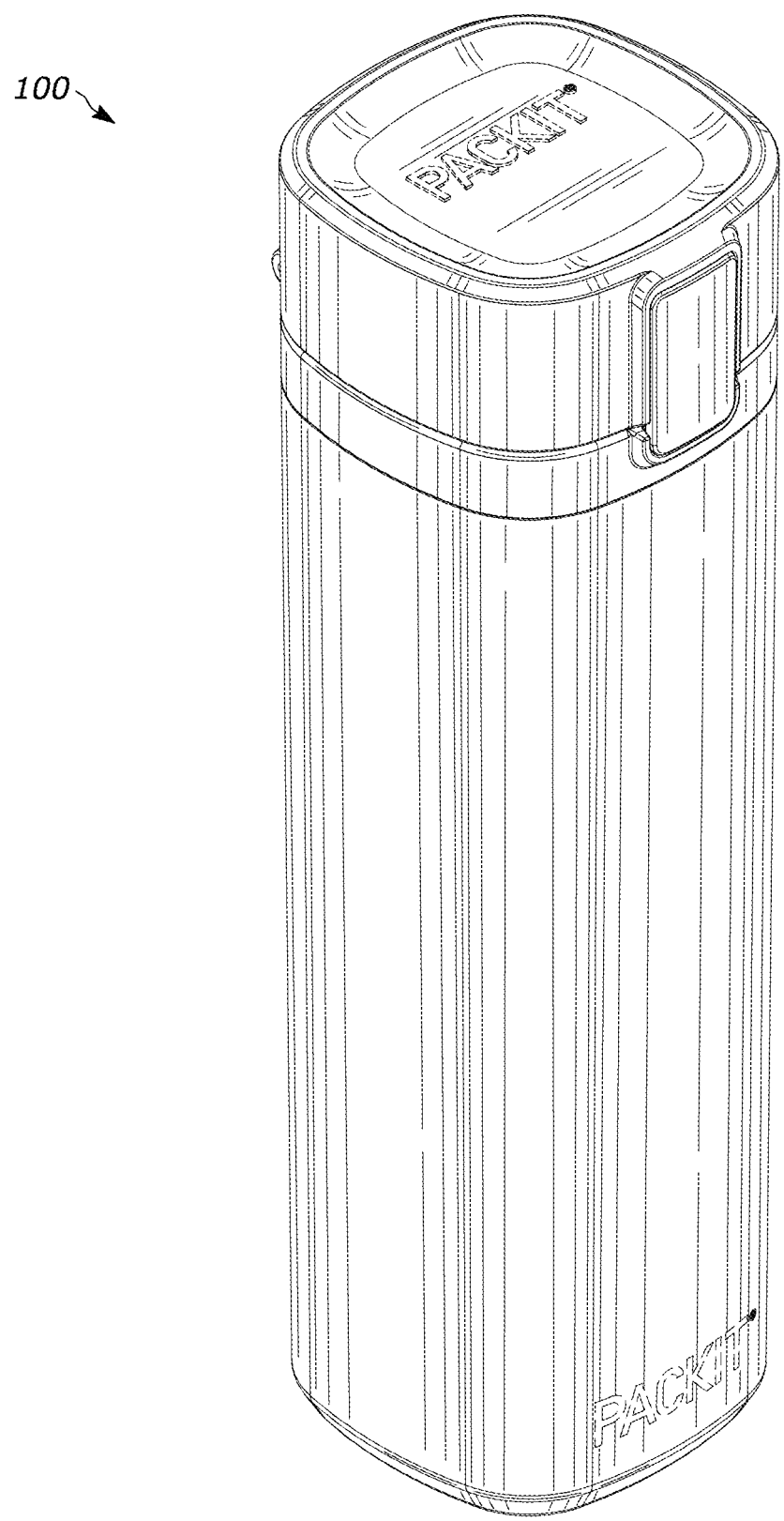
FIG. 1 is a perspective view of a first embodiment of a container in accordance with the present disclosure with the lid in a closed position.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one of ordinary skill in the art to which this disclosure relates.

Large Container

Figure 2:
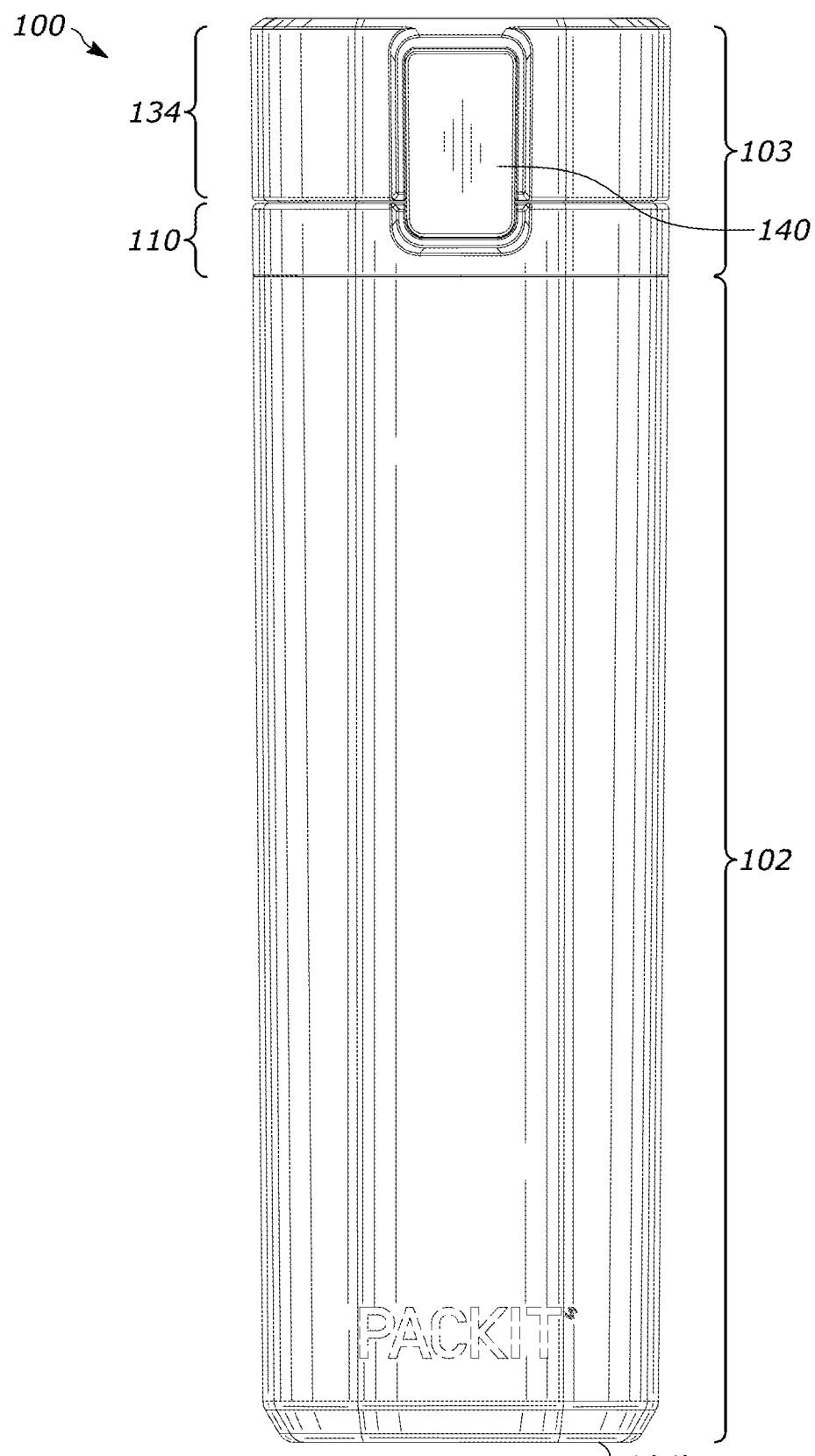
FIG. 2 is a front elevation view of the first embodiment of a container in accordance with the present disclosure with the lid in the closed position.
Figure 3:
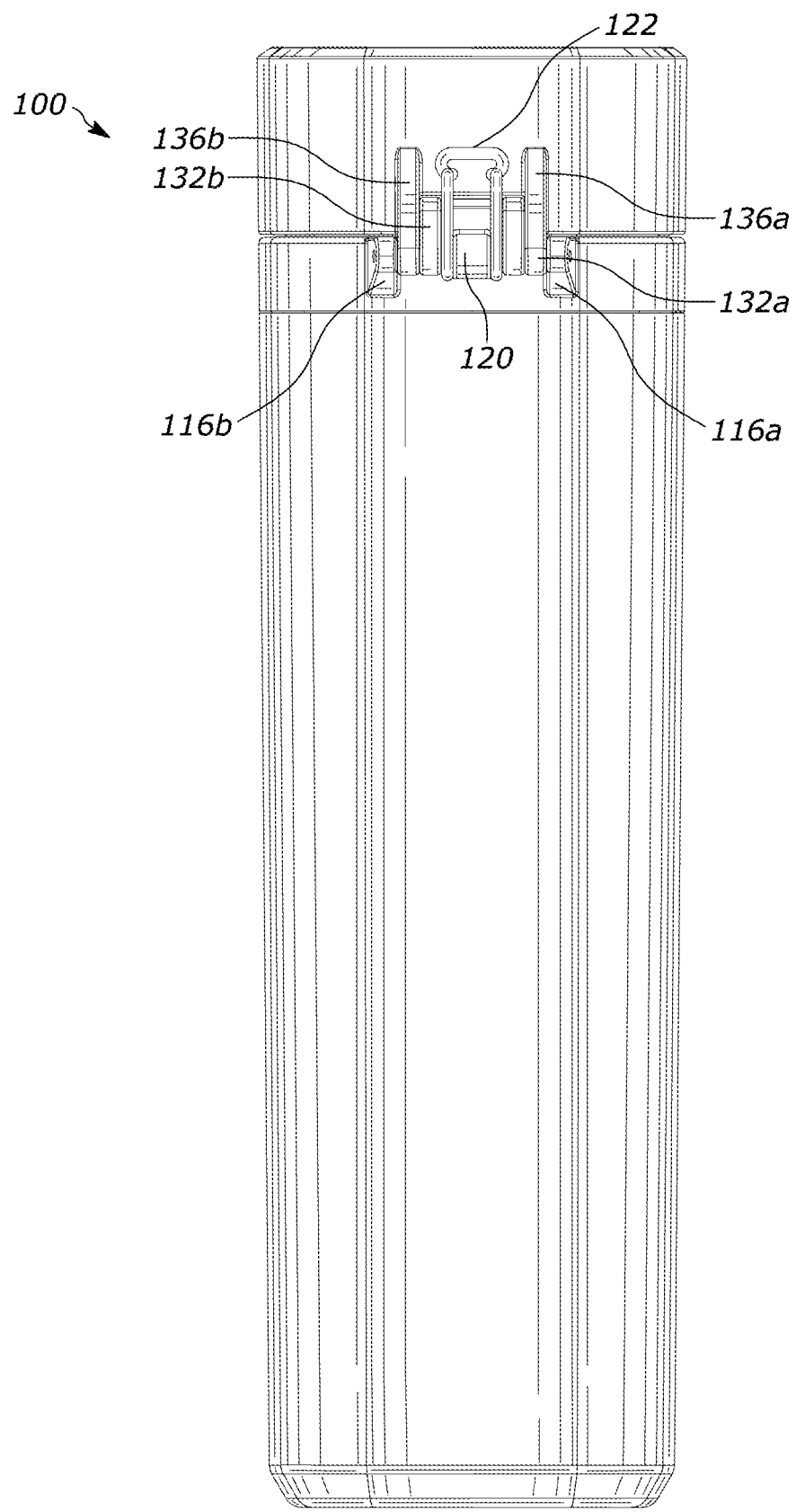
FIG. 3 is a rear elevation view of the first embodiment of a container in accordance with the present disclosure with the lid in the closed position.
Figure 4:
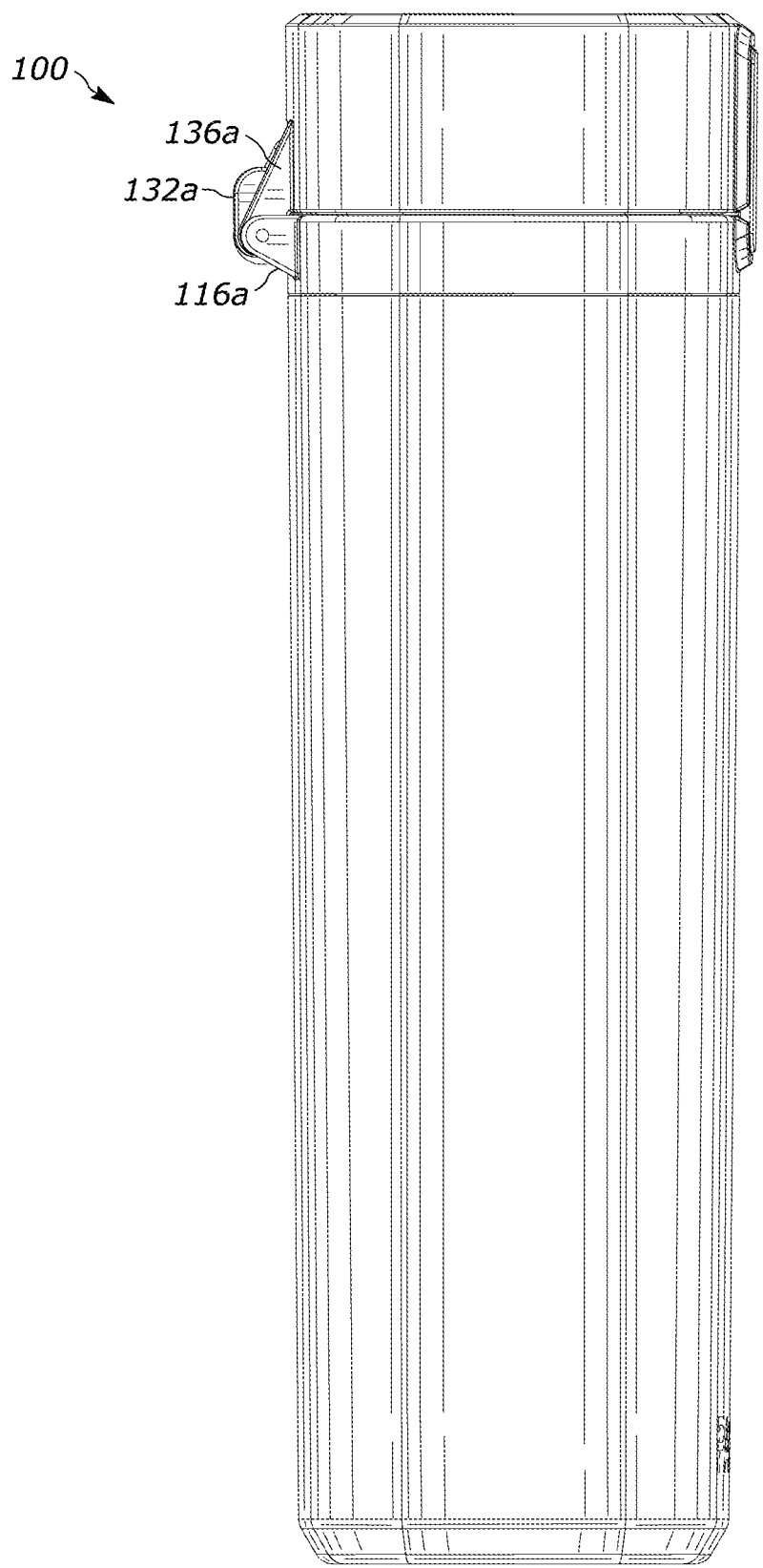
FIG. 4 is a right elevation side view of the first embodiment of a container in accordance with the present disclosure with the lid in the closed position.
Figure 5:
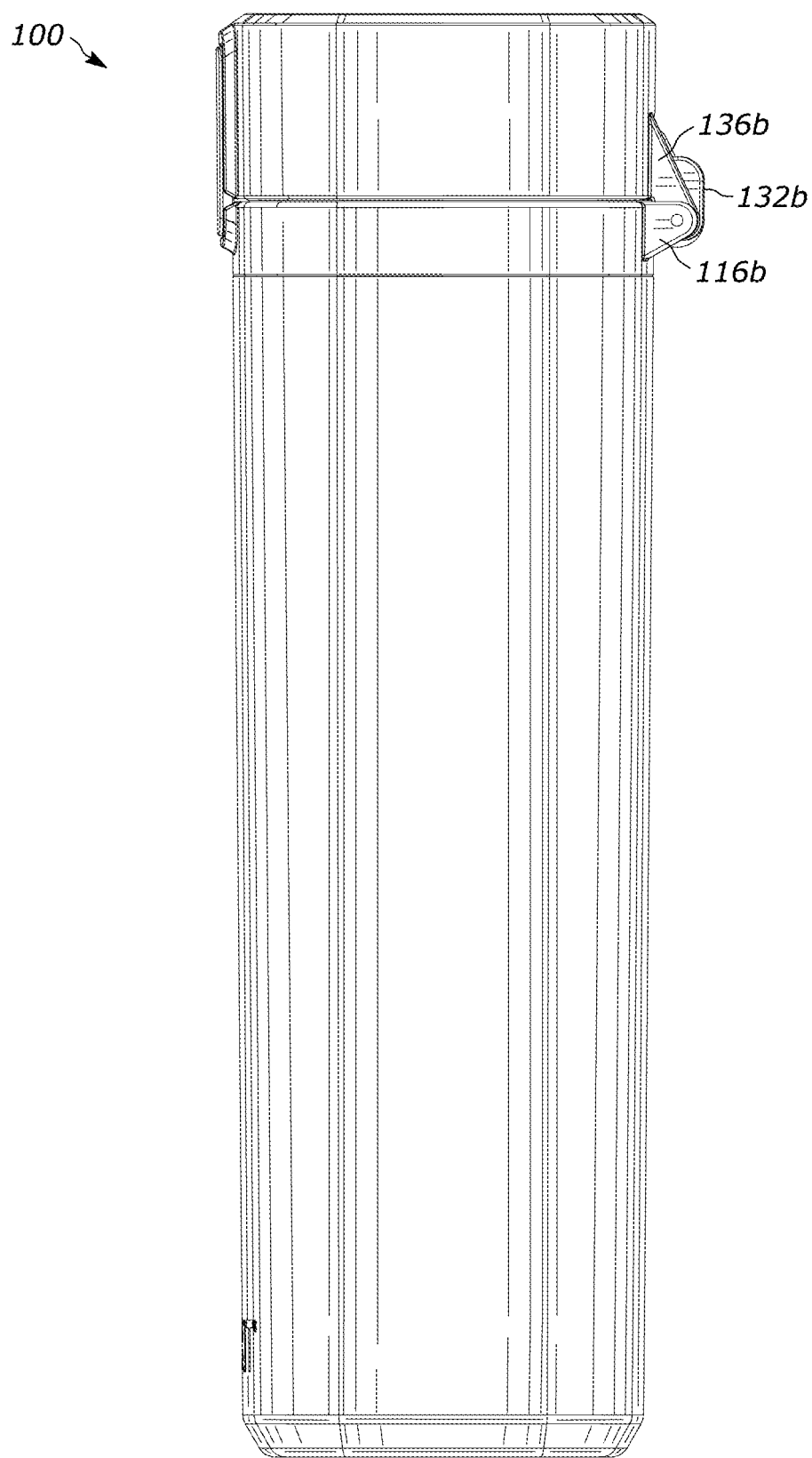
FIG. 5 is a left elevation side view of the first embodiment of a container in accordance with the present disclosure with the lid in the closed position.
Figure 6:
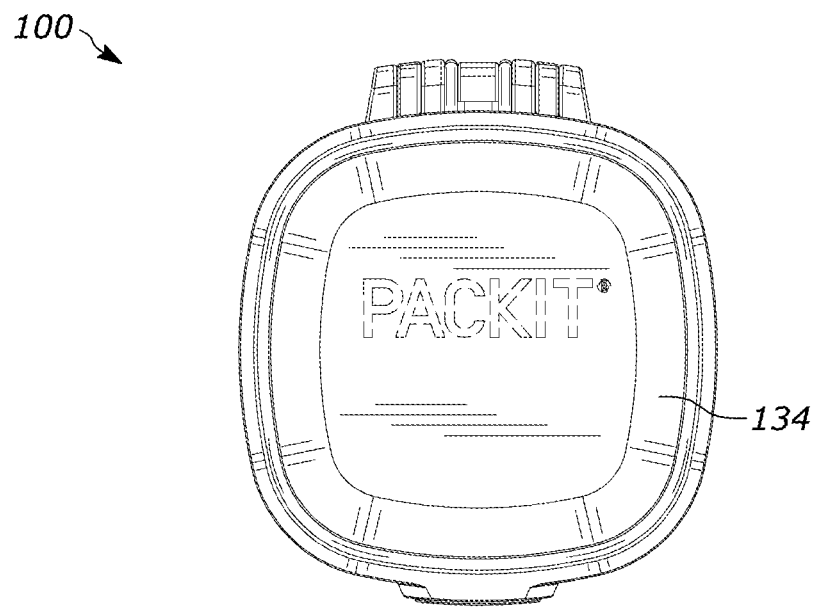
FIG. 6 is a top plan view of the first embodiment of a container in accordance with the present disclosure with the lid in the closed position.
Figure 7:
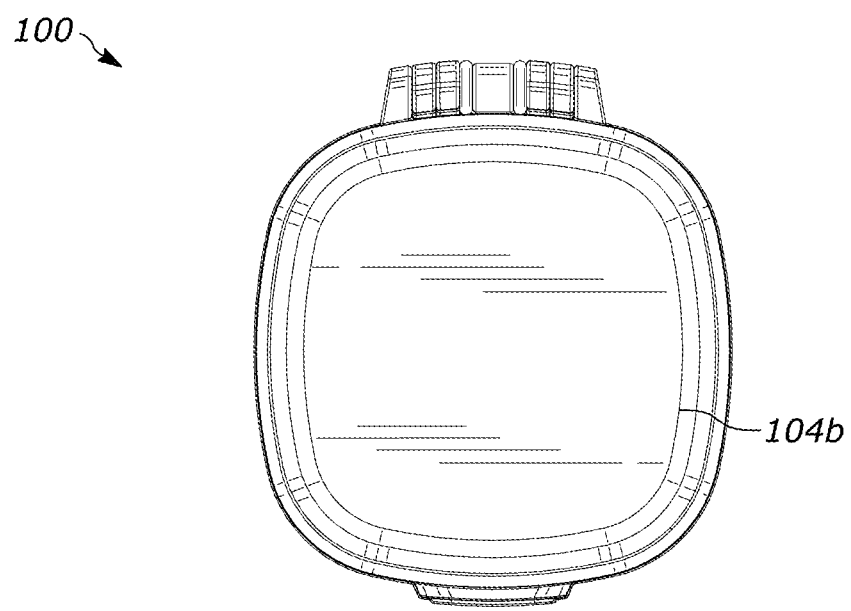
FIG. 7 is a bottom plan view of the first embodiment of a container in accordance with the present disclosure with the lid in the closed position.
Figure 8:
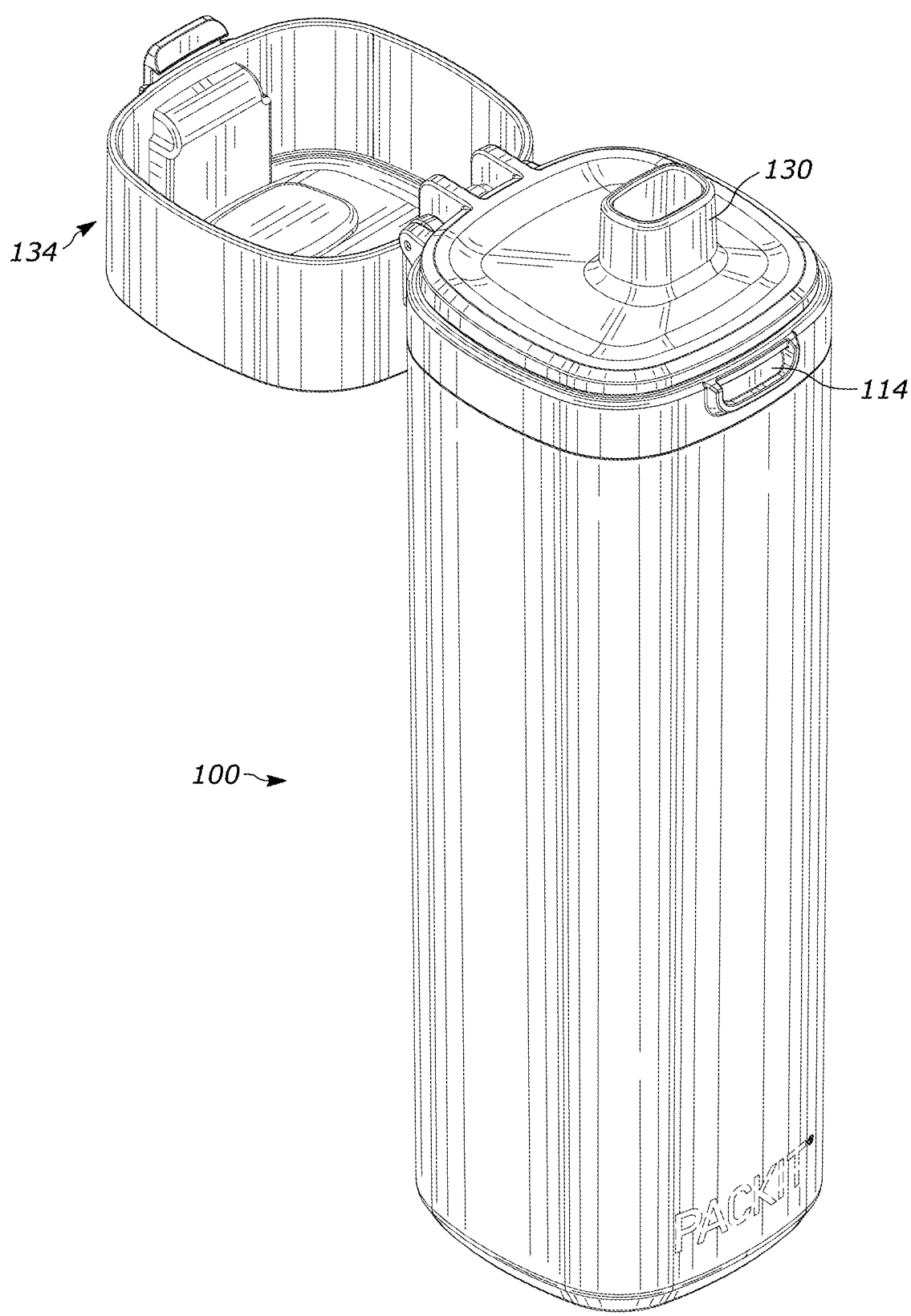
FIG. 8 a perspective view of the first embodiment of a container in accordance with the present disclosure with the lid in an opened position.
Figure 25:
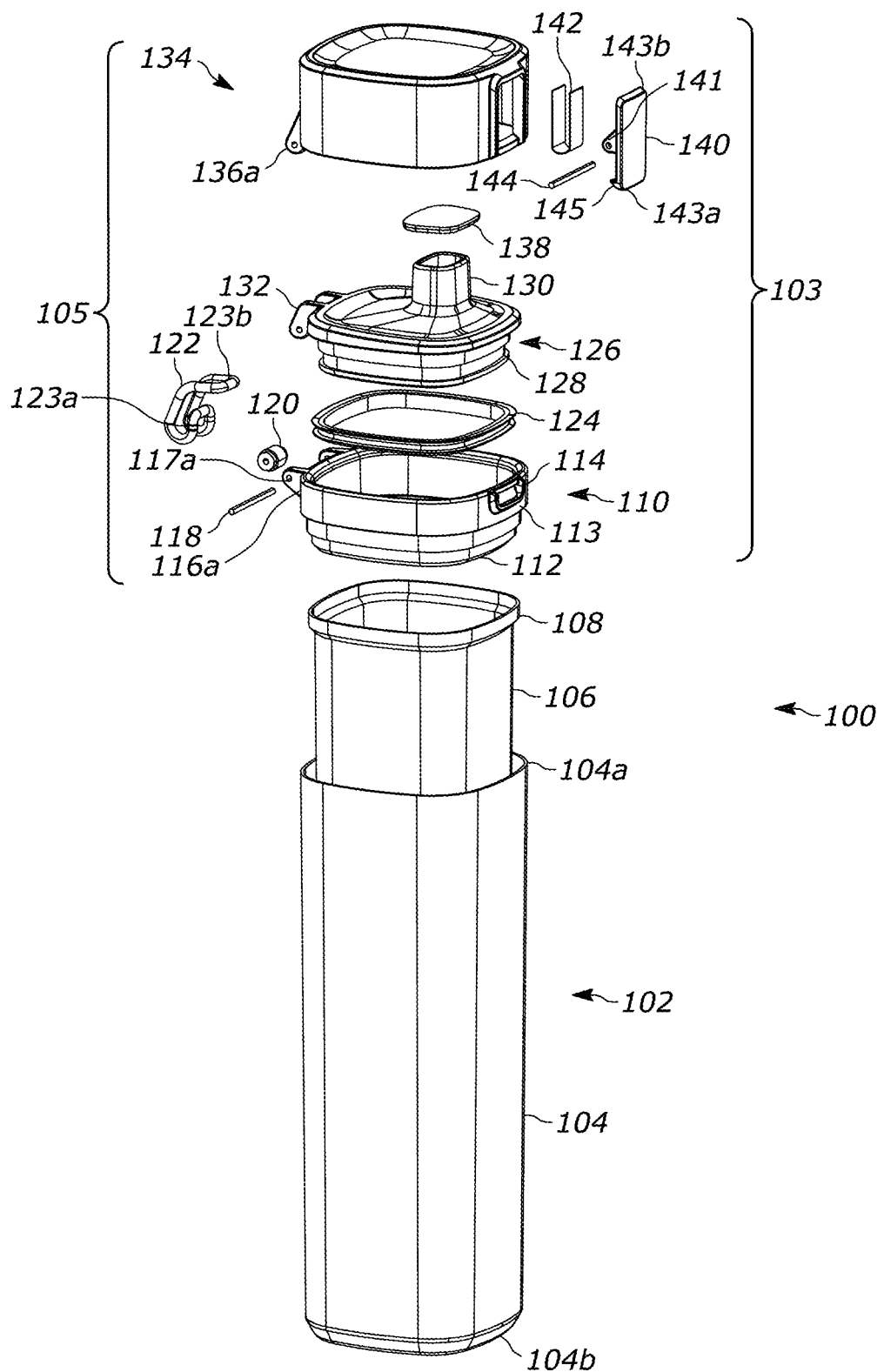
FIG. 25 is an annotated exploded view of the first embodiment of a container in accordance with the present disclosure.
Figure 27:
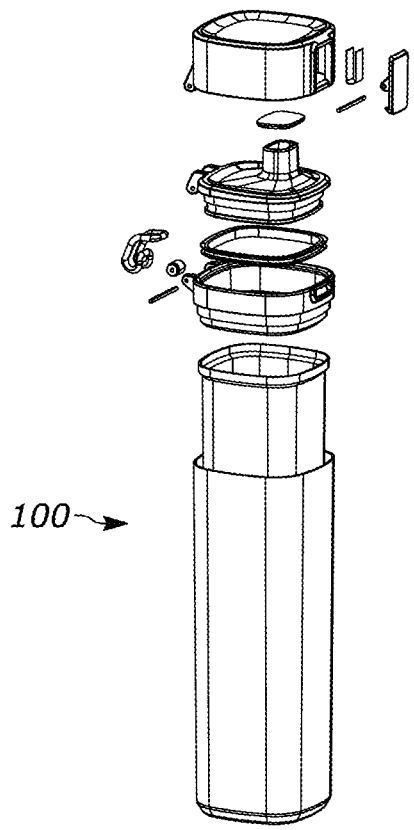
Figure 28:
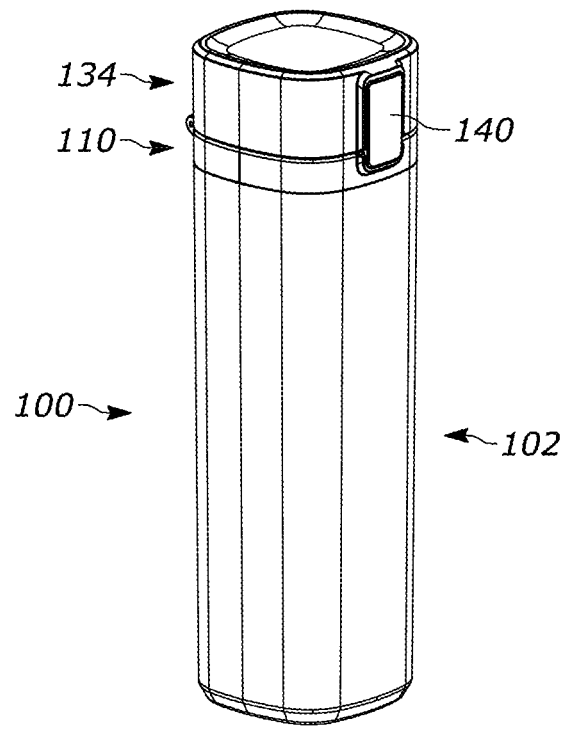
Figure 29:
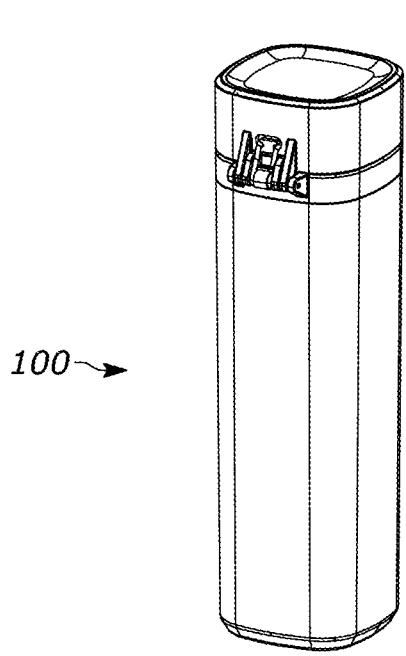
Figure 30:
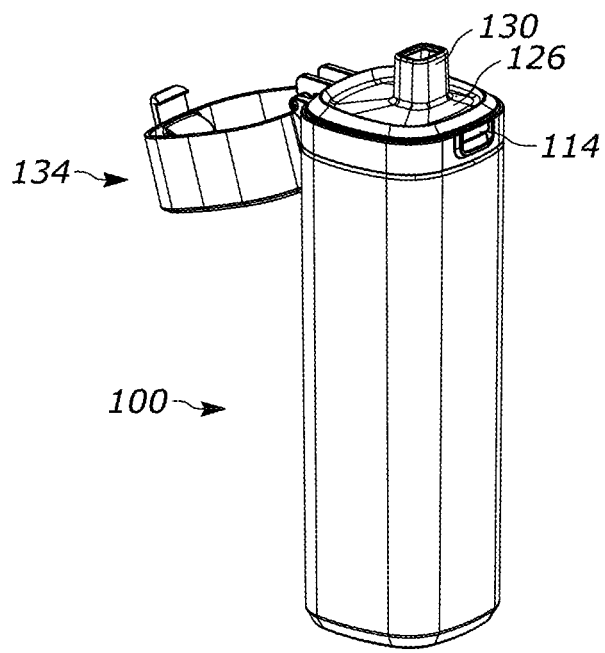
Figure 31:
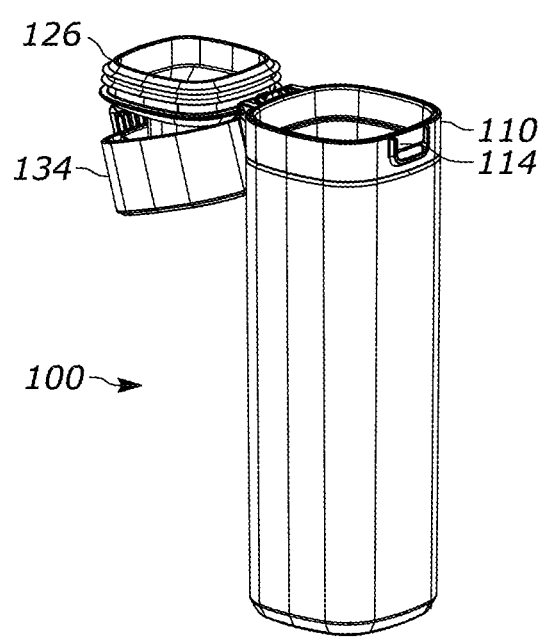
Figure 32:
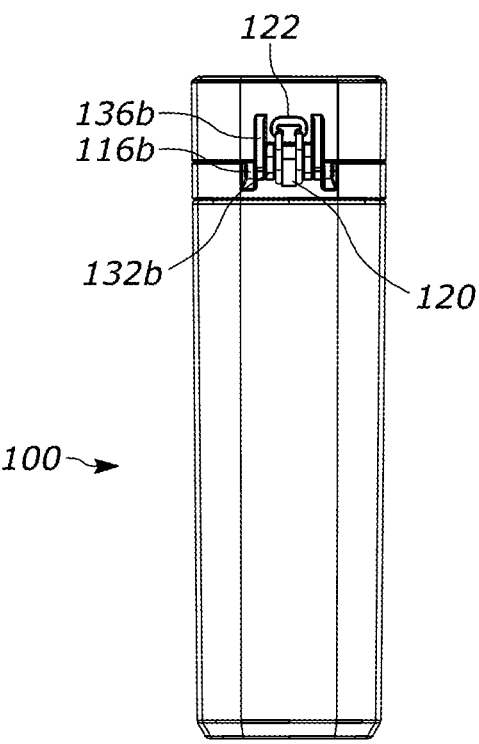
Figure 33:
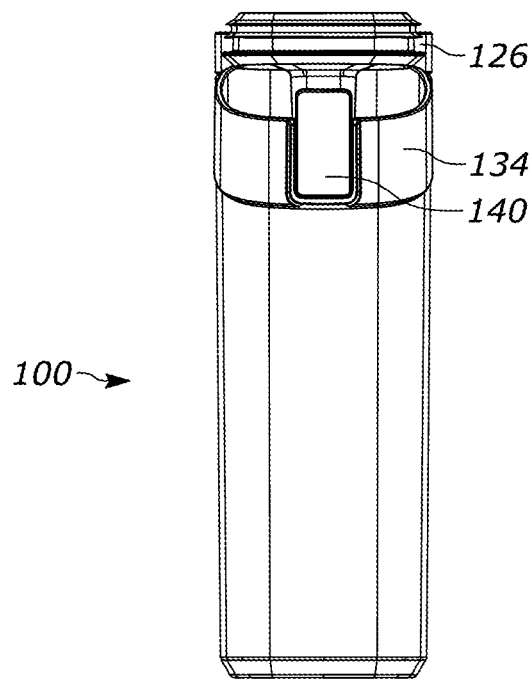
Figure 34:
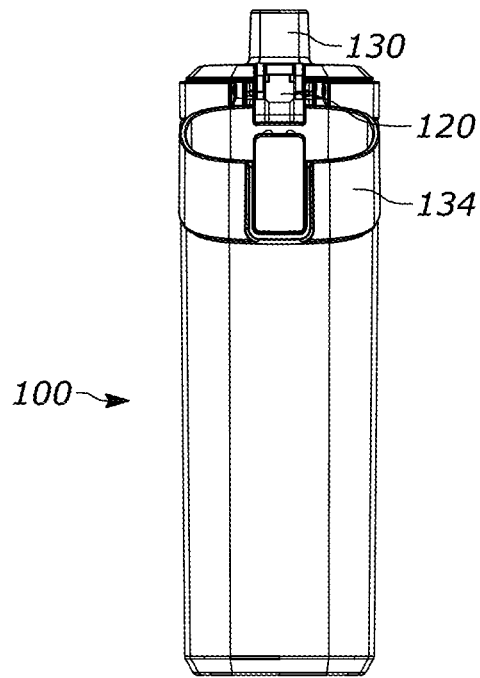
Figure 35:
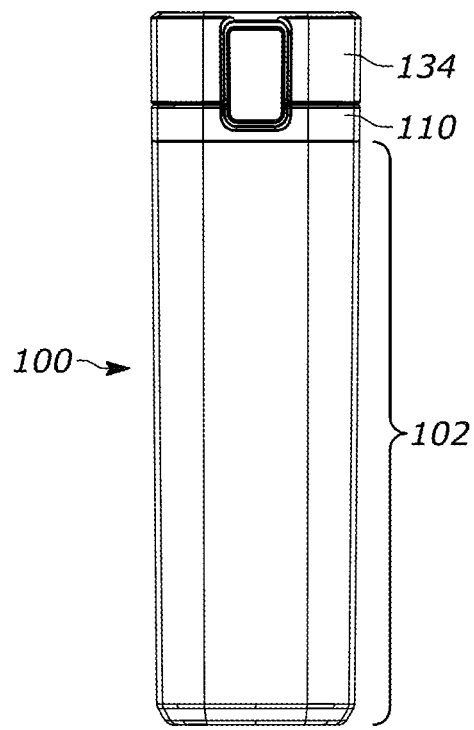
Figure 36:
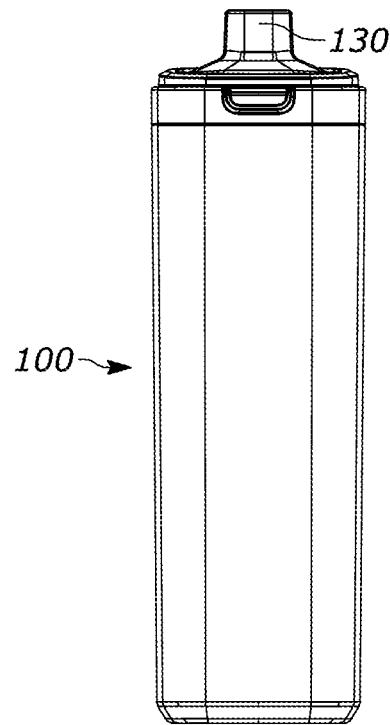
Figure 37:
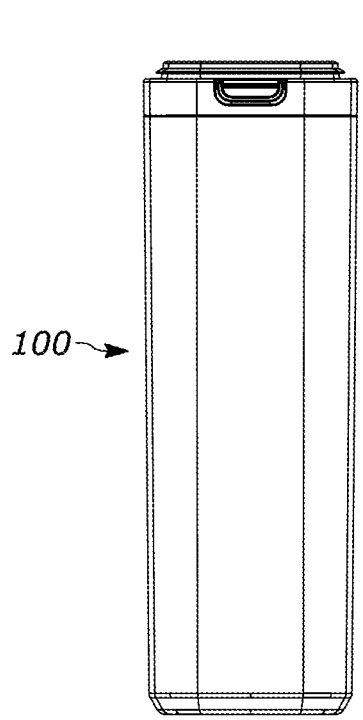
Figure 38:
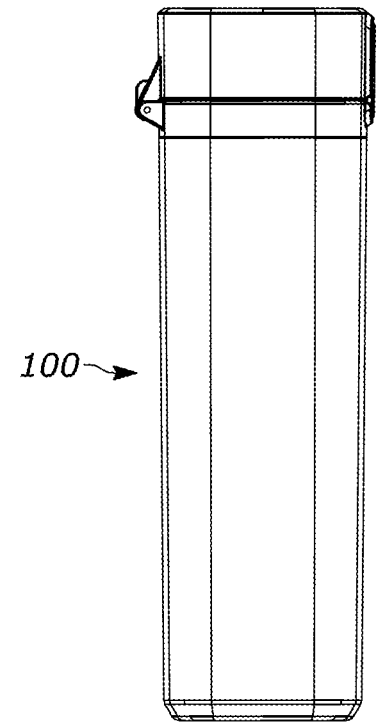
Figures 39, 40:
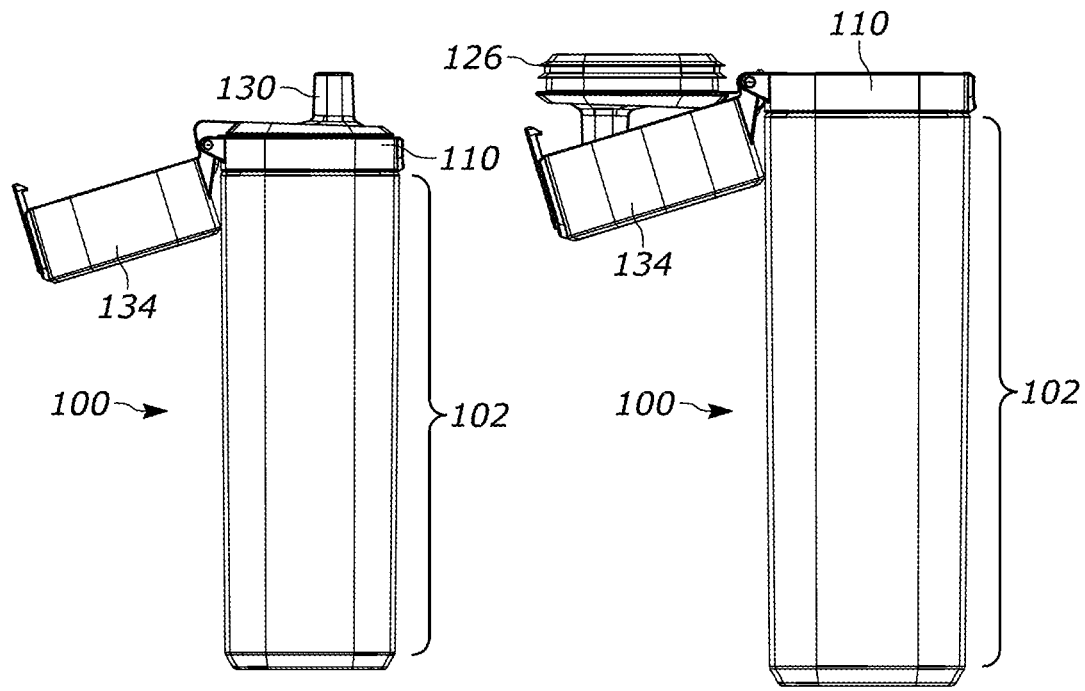
Figures 41, 42:
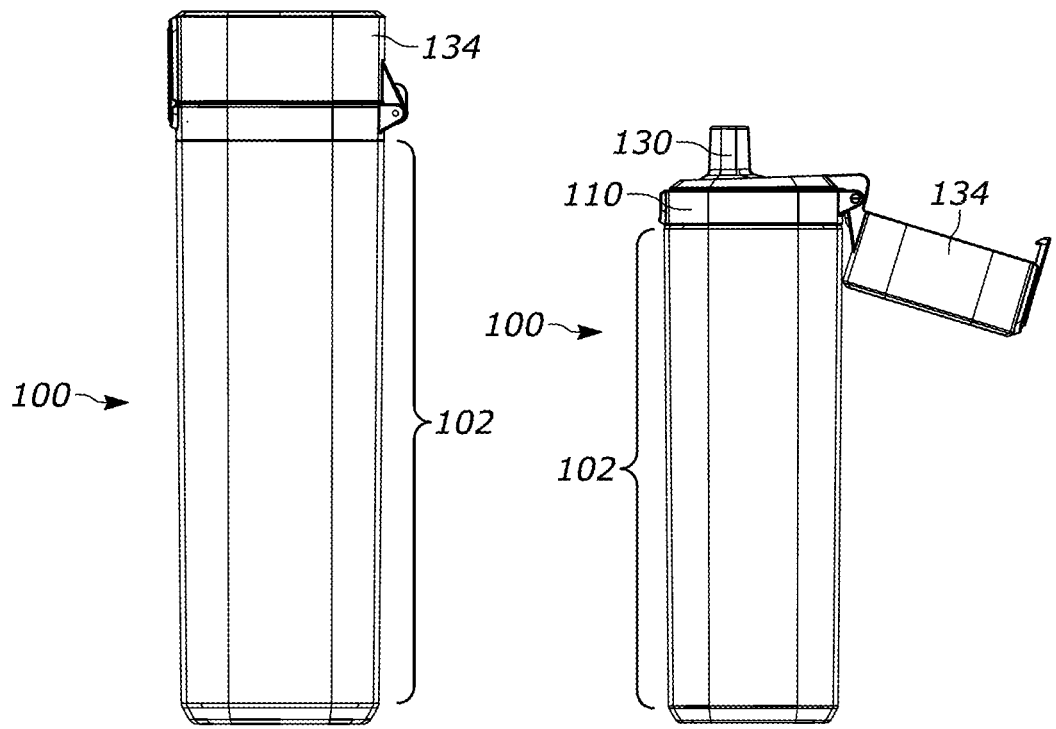
Figure 89C:
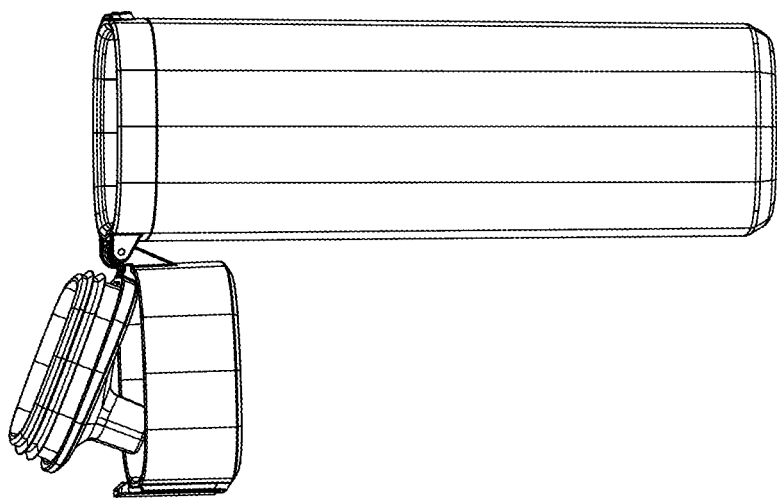
FIG. 89C is a perspective view of a container in accordance with the first embodiment of the present disclosure with both the outer and inner lids opened.
Figure 89B:
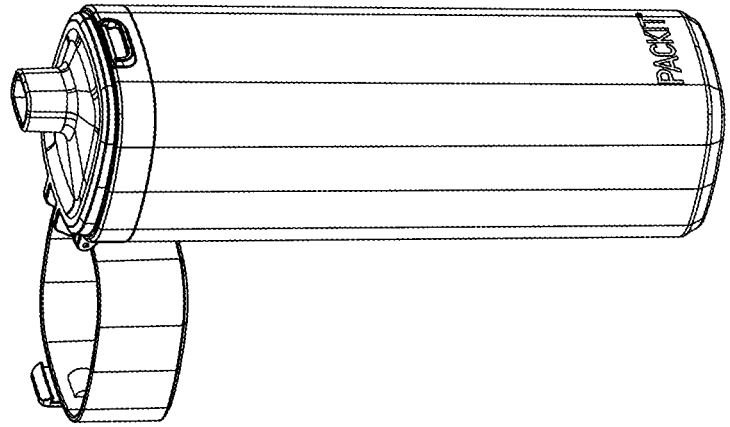
FIG. 89B is a perspective view of a container in accordance with the first embodiment of the present disclosure with the outer lid opened and the inner lid closed.
Figure 89A:
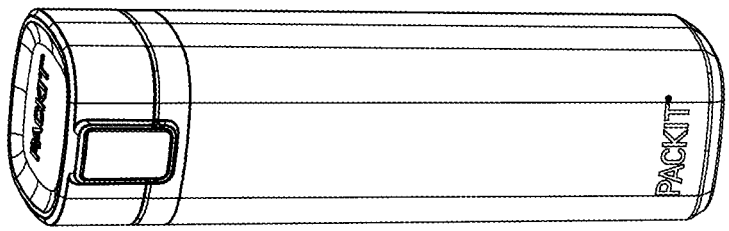
FIG. 89A is a perspective view of a container in accordance with the first embodiment of the present disclosure with both the outer and inner lids closed.

FIGS. 1 through 8, 25, 27 through 44, and 89 illustrate a first embodiment of a container 100 featuring an improved closure or lid.

In the embodiment shown, the container 100 has a main body 102 that is generally shaped as a prism with rounded corners. A top end 104a of the main body 102 is open, while the opposite bottom end 104b is closed. The interior of the main body 102 is hollow such that the main body 102 may hold contents (such as food or beverage) securely therein. As will be clear to one of ordinary skill in the art, other shapes (including but not limited to cylinders and prisms) may also be used for the main body 102. Although the main body 102 is shown without a handle, it is also contemplated that a handle (e.g., such as a U-shaped or L-shaped protrusion) may be provided to allow a user to more easily carry the container 100.

As shown, the main body 102 has a multi-wall construction whereby an outer wall 104 is concentrically nested with an inner wall 106, each of which is closed at its bottom end and open at its top end. Together, the outer wall 104 and the inner wall 106 form a double walled main body. In the embodiment shown, the inner wall 106 features a protruding rim 108 that contacts the inner surface of the outer wall 104 when the inner wall 106 is nested therein. The protruding rim 108 is then sealed against the top end 104a of the outer wall such that a sealed volume is defined between the inner wall 106 and the outer wall 104. In an embodiment, the outer wall 104 and the inner wall 106 are each made of metal, such as stainless steel. In alternative embodiments, other materials such as glass or plastic may be used. The seal between the outer wall 104 and the inner wall 106 may be formed, for example, by soldering, brazing, welding, epoxying, applying adhesive, or co-forming the outer wall 104 and the inner wall 106. In an embodiment, the outer wall 104 and the inner wall 106 are formed from a single piece of material (rather than separate pieces of material joined together). In an embodiment, the sealed volume disposed between the outer wall 104 and the inner wall 106 is at least partially evacuated prior to sealing the outer wall 104 to the inner wall, such that the outer wall 104, the inner wall 106, and the sealed volume therebetween cooperatively form an insulating wall for the main body 102 such that changes in the temperature outside the main body 102 are not immediately felt by the contents of the main body 102, and vice versa. The sealed volume may be evacuated using techniques that are known in the art to provide for vacuum insulation for the interior of the main body 102. In an alternative embodiment, the sealed volume may instead be filled with an insulating material, such as an insulating gel, foam, or gas.

In an embodiment, the bottom end 104b features a non-skid base surface. In an embodiment, a protrusion or foot may extend from the bottom end of the inner wall 106 and contact the inner surface of the outer wall 104 proximate the bottom end 104b. In an embodiment, the outer surface of the outer wall 104 features a textured or "grippy" surface. In an embodiment, the outer surface of the outer wall 104 is reflective to improve insulation. In an alternative embodiment, the outer surface of the outer wall 104 is painted with one or more aesthetically desirable colors, patterns, or designs.

As shown in FIGS. 1 through 8, 25, 27 through 44, and 89, the main body 102 is closed by a lid assembly 103 comprising outer lid 134, inner lid 126, and collar 110. As discussed in greater detail herein, the outer lid 134 serves to completely seal the container 100 while the inner lid 126 provides selective access to the contents (e.g., such that a user may drink a beverage located within the container 100 while maintaining a degree of insulation and spill prevention). In an embodiment, the structural components of the lid assembly 103 are made of metal, plastic, glass, or similar materials. In an embodiment, the outer lid 134 is made from an opaque material. In an embodiment, the inner lid 126 is made from a translucent or transparent material. In an embodiment, the inner lid 126 is made of Tritan™ plastic.

In the embodiment shown, the collar 110 is joined to the main body 102 proximate the top end 104a and provides an attachment point for the outer lid 134 and the inner lid 126. As shown, the collar 110 comprises a tapered lower portion 112 that rests inside the inner wall 106 and a top portion 113 that sits substantially flush with the outer wall 104. The collar 110 may be sealed to the inner wall 106 and/or the outer wall 104, for example, by soldering, brazing, welding, epoxying, applying adhesive, or co-forming with the outer wall 104 and/or the inner wall 106. In an alternative embodiment, the collar 110 is integrally formed with the outer wall 104 and/or the inner wall 106 from a single piece of material (rather than separate pieces of material joined together). In such embodiments, the tapered lower portion 112 of the collar 110 may be omitted. The collar 110 surrounds an opening, such that the volume within the inner wall 108 (i.e., where the contents of the container 100 may be located) is accessible through the collar 110.

A pair of outer hinge supports 116a, 116b extend from the exterior of a rear surface of the collar. As shown, each outer hinge support 116a, 116b comprises an opening 117a, 117b respectively for receiving a pin 118 that extends between the outer hinge supports 116a, 116b. In an alternative embodiment, each of the body coupling portion contains an indentation (rather than an opening) and each indentation retains a respective end of the pin 118. A pair of middle hinge supports 136a, 136b extend from the exterior of a rear surface of the outer lid 134 and a pair of inner hinge supports 132a, 132b extend from the exterior of a rear surface of the inner lid 126. A retainer 122 is positioned such that a curved first end 123a is rotatably connected to the pin 118 and an opposite second end 123b is in contact with the rear surface of the outer lid 134. As shown, the retainer 122 is formed a from resilient member such as a deformed O-ring or elastic band. A spacer 120 with a central portion having a larger radius than the ends of the spacer 120 is centrally disposed on the pin 118 in the interior portion of the retainer 122. The retainer 122 is secured to the ends of the spacer 120, such that the ends of the retainer 120 are separated by the larger central portion of the spacer 120. As will be clear to one of ordinary skill in the art, the order and arrangement of the hinge supports may be varied (e.g., the middle hinge supports on the outer lid may instead be located centrally on the pin of the inner hinge supports on the inner lid) such that it is centrally disposed on the pin 118.

The hinge assembly 105 (formed from the hinge supports 116, 136, 132, the retainer 122, the spacer 120, and the pin 118) permits a user to selectively open just the outer lid 134 or both the outer lid 134 and the inner lid 126. Each of the outer lid 134 and the inner lid 126 are rotatably connected to the pin 118. In the embodiment shown, when fully opened, the outer lid 134 rests against and is supported by the retainer 122 such that the bottom edge of the outer lid 134 forms a reflex angle (i.e., an angle of greater than 180 degrees) with the opening of the collar 110. This reflex angle enables a user to drink from the container without contacting the outer lid 134, as discussed in greater detail below. In an embodiment, the retainer 122 functions as a spring and is connected to the outer lid 134 such that the outer lid 134 is tensioned towards the fully opened position. In this manner, absent pressure on the outer lid 134 (e.g., from a user's hand or from the locking clip 140), the outer lid 134 will remain in the fully opened position. This further enables the container to be easily cleaned, such as in a dishwasher, as the outer lid 134 will not obstruct access to the container 100 unless sealed in the closed position (e.g., through use of the locking clip 140).

The outer lid 134 is configured to close over the entire open end of the collar 110 (including the inner lid 126). The outer lid 134 may be secured to the collar 110 in a closed position through the use of the locking clip 140. The locking clip 140 is rotatably connected to the front face of the outer lid 134 by a locking pin 144. The ends of the locking pin 144 are held by corresponding openings in the front side of the outer lid 134, and the locking pin 144 passes through one or more openings in a locking hinge support portion 141 which extends from an inner surface of the locking clip 140. A locking spring 142, which in the embodiment shown is formed from a U-shaped deformable resilient strip, is located between the locking clip 140 and the outer lid 134. The locking spring 142 serves to bias the locking clip 140 such that the top end 143b of the locking clip 140 is pushed away from the outer lid 134 and the lower end 143a of the locking clip 140 is pushed towards the outer lid 134. A protrusion 145 extends away from the inner surface of the locking pin 144 at the lower end 143a.

The front face of the collar 110 includes a locking slot 114 or lock receiving member configured to receive and releasably retain the lower end 143a of the locking clip 140. As shown, the locking slot 114 comprises an indentation with an upper wall. In use, the protrusion 145 on the locking clip 140 is secured within the locking slot 114. The locking spring 142 pushes the protrusion into the locking slot until it is released by a user pressing against the top end 143b of the locking clip 140. In an embodiment, the lower side of the protrusion 145 and/or the upper side of the locking slot wall is curved or angled such that as the outer lid 134 is closed, the protrusion is lifted over the locking slot wall and into the retaining slot.

The inner lid 126 comprises an inner rim 128 configured to hold a deformable resilient seal 124, which may be one or more O-rings or similar structures. When the inner lid 126 is in a closed position, the inner rim 128 is located within the collar 110 and the seal 124 is pressed against the outer surface of the inner rim 128 and the inner surface of the collar 110, thereby sealing the inner lid 126 against the collar 110. The inner lid 126 further comprises a spout 130 with an opening therein adapted to allow the contents of the container 100 (e.g., a beverage) to be accessed without opening the inner lid 126. The outer lid 134 comprises a deformable resilient pad 138 positioned on the inner surface of the outer lid 134, such that when the outer lid 134 is closed the pad 138 presses against the spout 130. In the embodiment shown, the locking clip 140 applies downward pressure to the outer lid 134 such that the pad 138 seals the opening of the spout 130, preventing the contents of the container 100 from passing through the spout 138 when the outer lid 134 is closed.

To access the contents of the container 100, a user first opens the outer lid 134 by pressing the top end 143b of the locking clip 140, thereby moving the lower end 143a of the locking clip 140 away from the collar 110 and lifting the protrusion 145 out of the locking slot 114. The retainer 122 then pulls the outer lid 134 into the fully opened position, moving the pad 138 out of contact with the spout 130. In this configuration, a user may access the contents of the container 100, such as by drinking from the spout 130 or pouring liquid in the container 100 out through the spout 130. When finished, the user moves the outer lid 134 back to a closed position by pressing it against the collar 110, causing the protrusion 145 to reengage with the locking slot 114 and sealing the pad 138 against the opening of the spout 130.

In order to refill the container, a user first opens the outer lid 134 as described above. Next, the user opens the inner lid by pulling on the spout 130 such that the seal 124 disengages and the inner lid rotates on the hinge pin 118 to the opened position. In an embodiment, when fully opened, the angle formed by the inner lid 126 and the collar 110 is less than the angle formed by the outer lid 134 and the collar 110, such that the pad 138 is not in contact with the spout 130 when both lids are opened. This allows for the container to be easily cleaned, for example by placing it in a dishwasher. In the embodiment shown, the inner lid 126 forms a 180 degree angle with the collar 110 when fully opened. As shown, the inner hinge supports 132a, 132b comprise a rear surface that contacts and rests against the rear wall of the collar 110 when the inner lid 126 is in the fully opened position.

With both lids opened, a user can pour liquid into the container or easily clean the entire container. Because all parts of the container (including both the inner lid 126 and the outer lid 134) remain connected together, there is no risk that a user may lose pieces of the container (either when it is opened or when it is being cleaned).

Advantageously, the embodiment shown permits the entire container to easily closed merely by closing the outer lid 134. As the outer lid 134 closes, contact between the lower surface of the outer lid 134 (e.g., pad 138) and the upper surface of the inner lid 126 (e.g., spout 130) causes the inner lid to move to a closed position. As the outer lid 134 is fully closed, the inner lid 126 is sealed with the collar 110. This enables a user to readily confirm that both the outer lid 134 and the inner lid 126 are sealed merely by visually checking to confirm that the locking clip 140 is engaged with the locking slot 114 or by listening for a "click" as the locking clip snaps into place, as the locking clip 140 cannot engage until both lids are fully closed. This is particularly beneficial for a parent or teacher who desires to confirm that a child has closed the container, and also makes it easier for a child to seal the container.

Small Container

Figure 9:
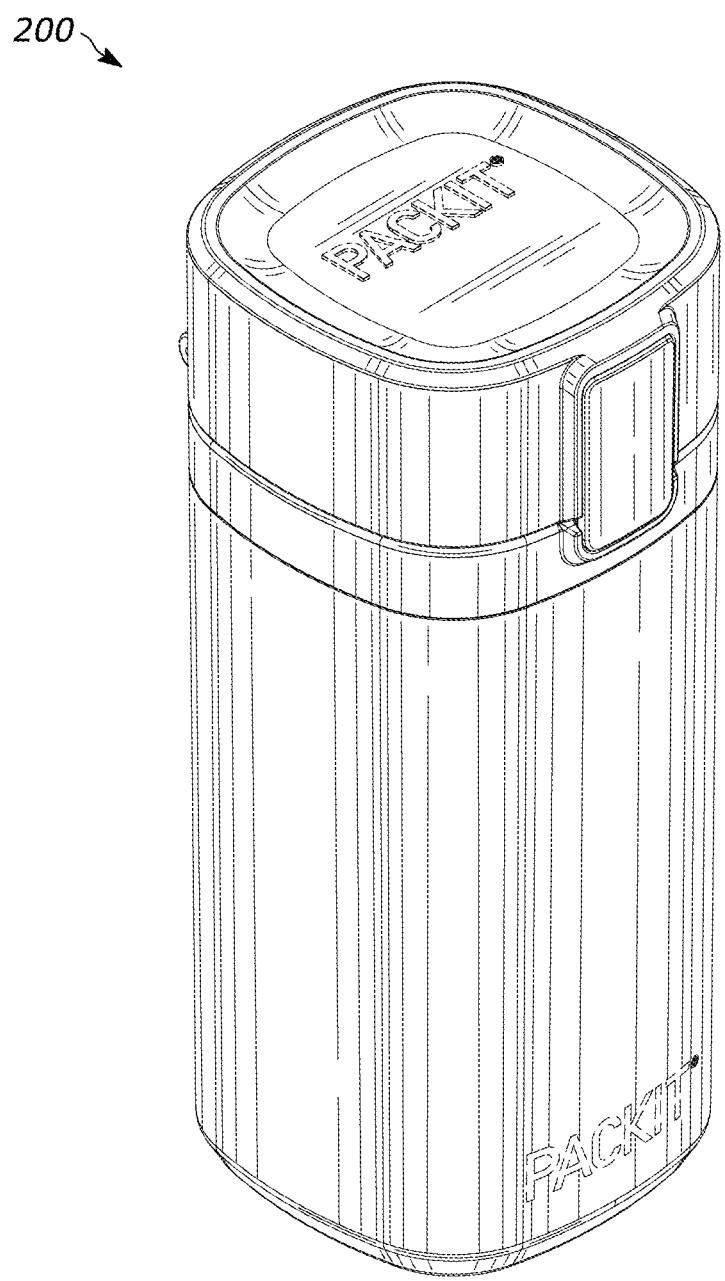
FIG. 9 is a perspective view of a second embodiment of a container in accordance with the present disclosure with the lid in a closed position, the only difference from the embodiment shown in FIG. 1 being the reduced height of the container.
Figure 10:
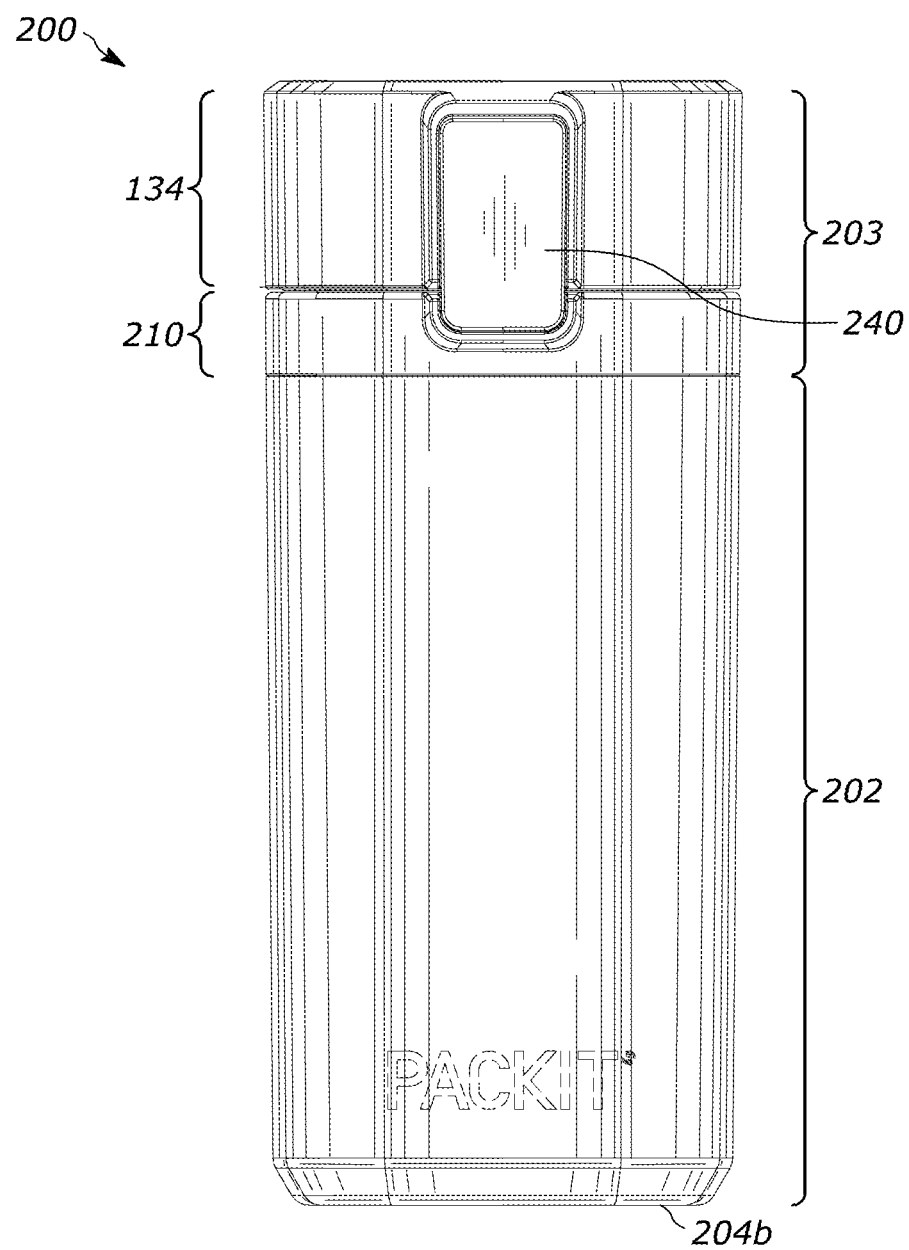
FIG. 10 is a front elevation view of the second embodiment of a container in accordance with the present disclosure with the lid in the closed position.
Figure 11:
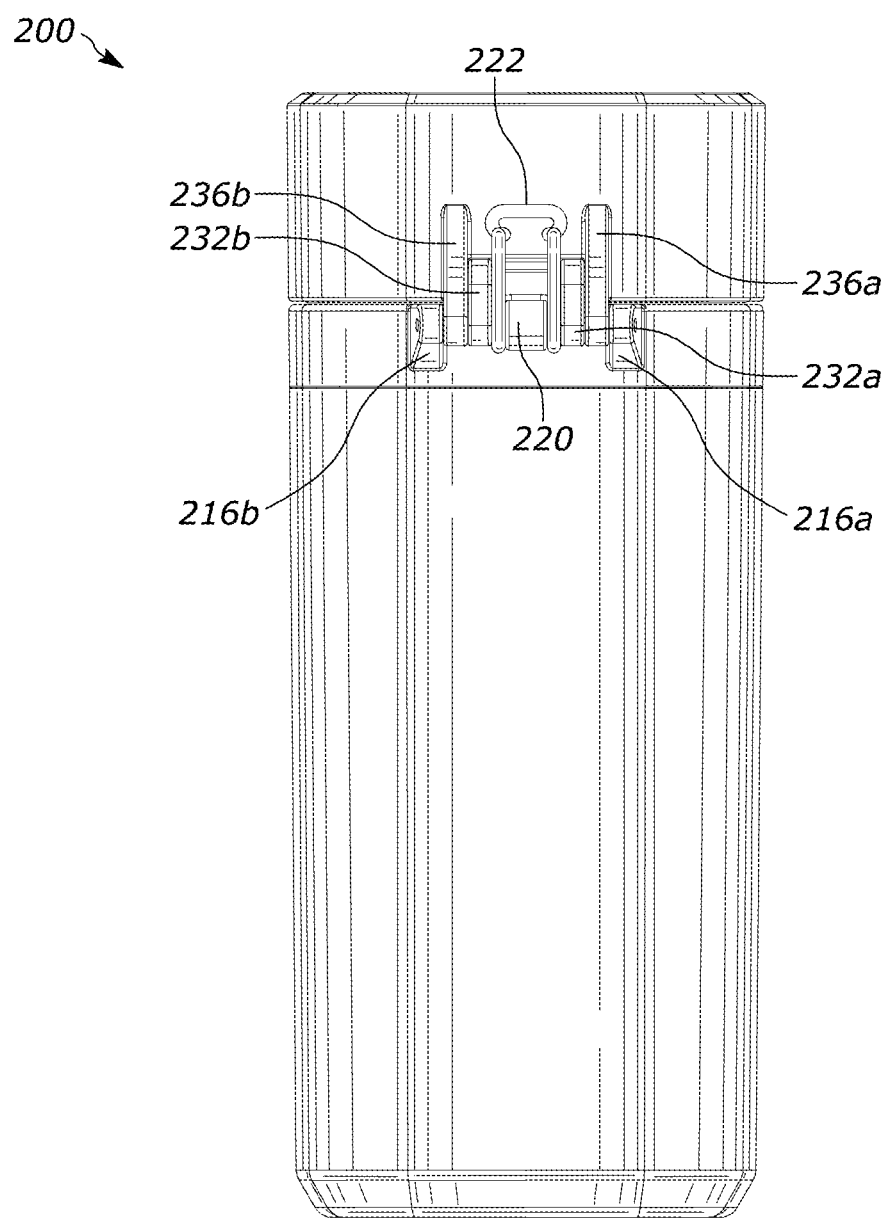
FIG. 11 is a rear elevation view of the second embodiment of a container in accordance with the present disclosure with the lid in the closed position.
Figure 12:
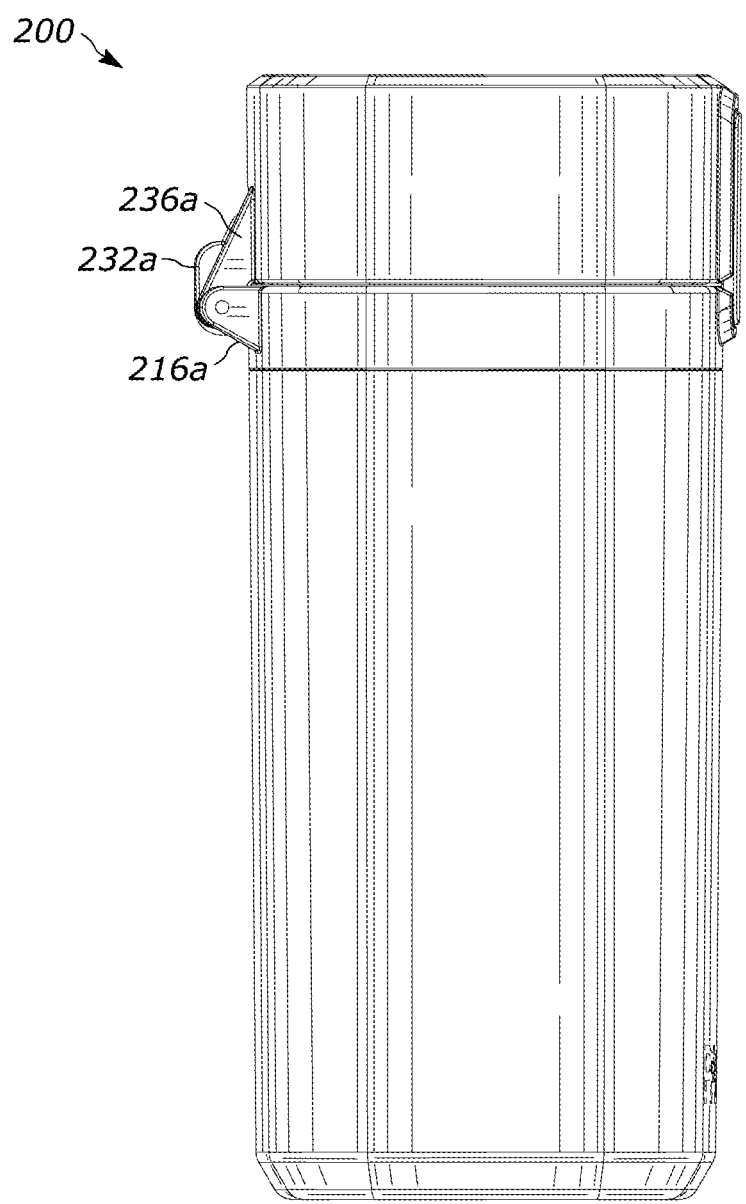
FIG. 12 is a right elevation side view of the second embodiment of a container in accordance with the present disclosure with the lid in the closed position.
Figure 13:
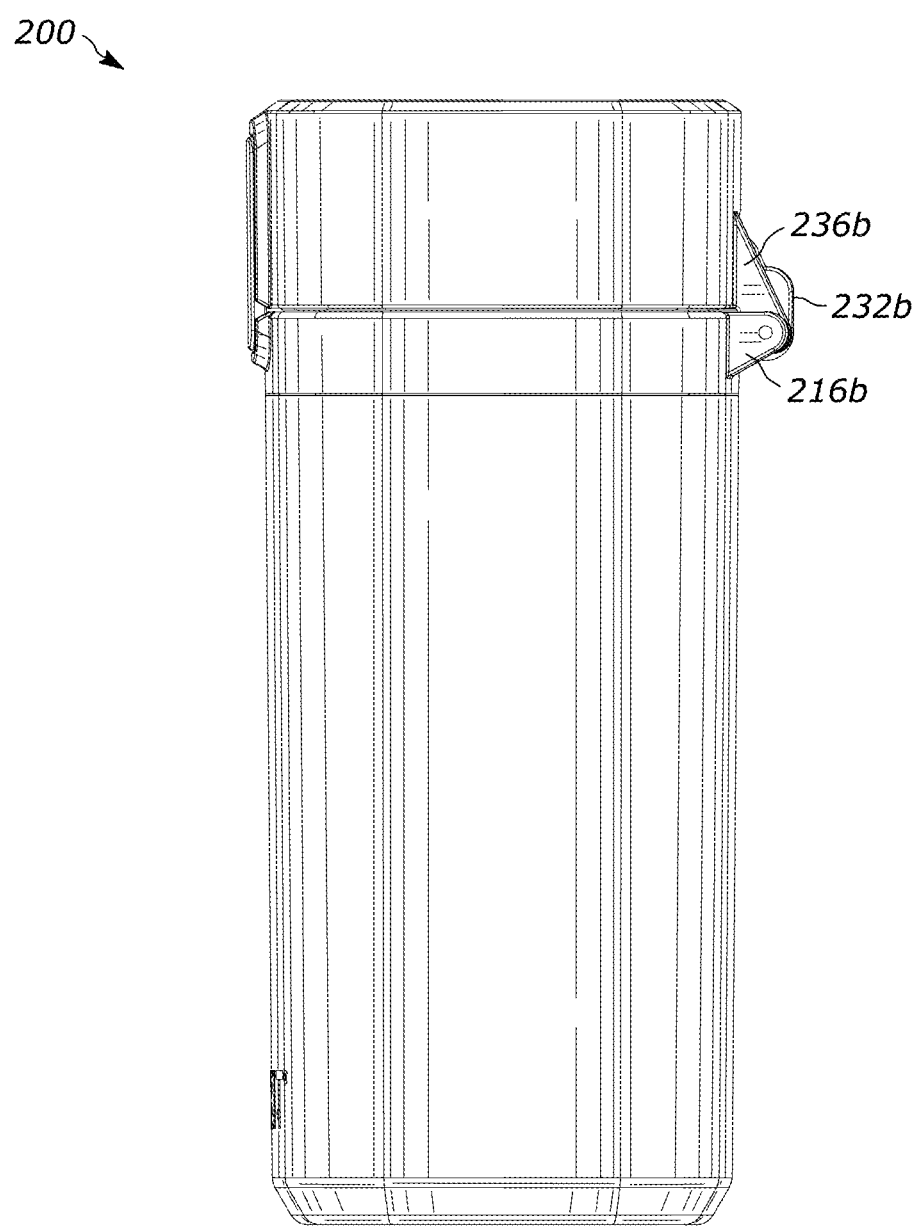
FIG. 13 is a left elevation side view of the second embodiment of a container in accordance with the present disclosure with the lid in the closed position.
Figure 14:
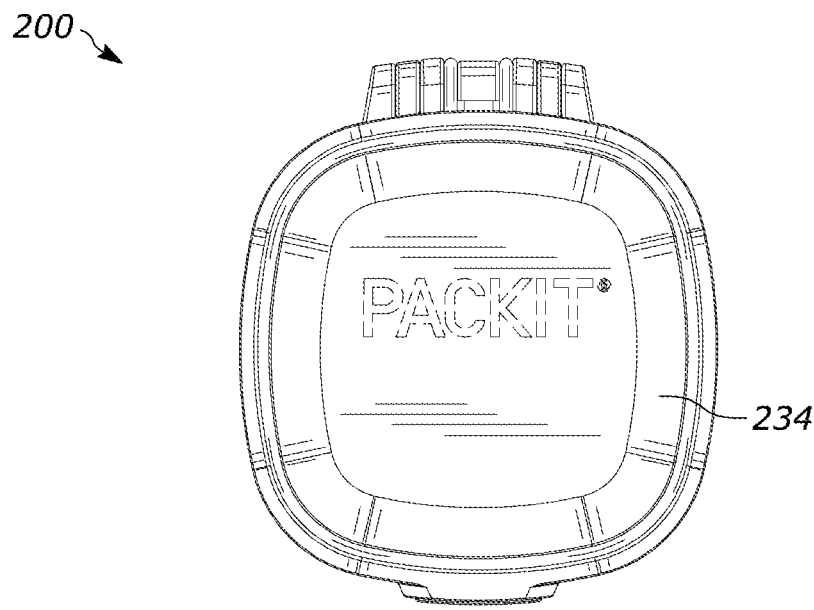
FIG. 14 is a top plan view of the second embodiment of a container in accordance with the present disclosure with the lid in the closed position.
Figure 15:
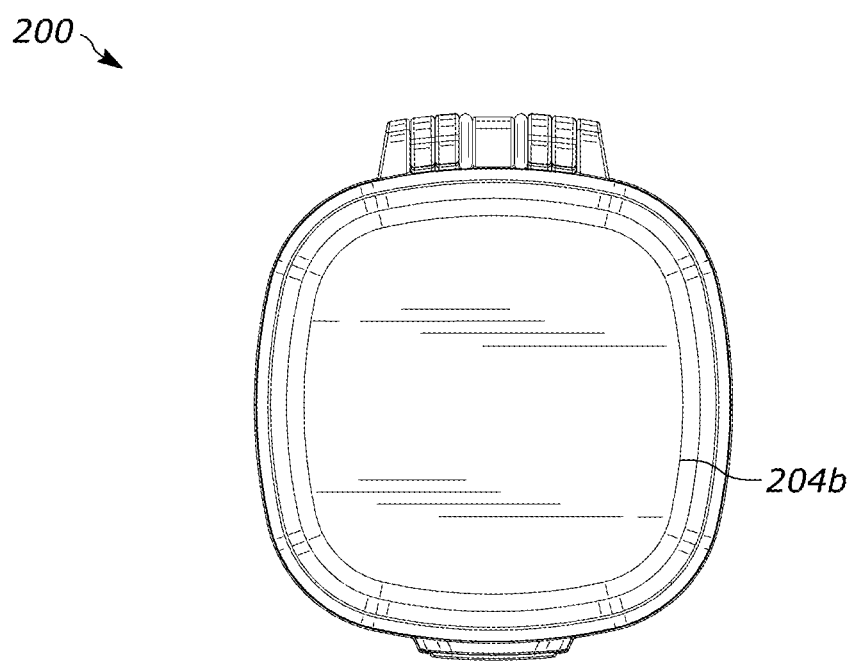
FIG. 15 is a bottom plan view of the second embodiment of a container in accordance with the present disclosure with the lid in the closed position.
Figure 16:
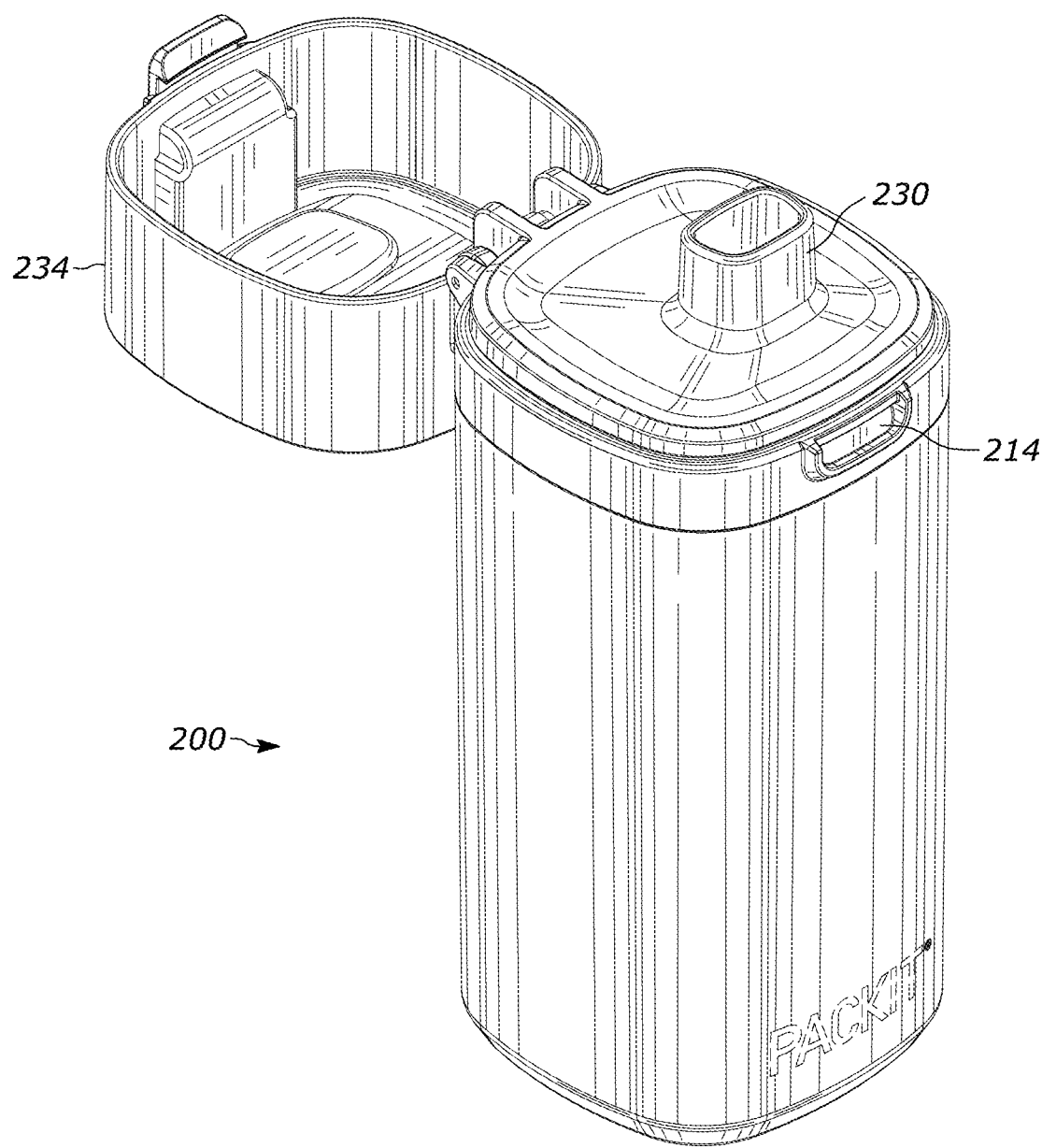
FIG. 16 a perspective view of the second embodiment of a container in accordance with the present disclosure with the lid in an opened position.
Figure 47:
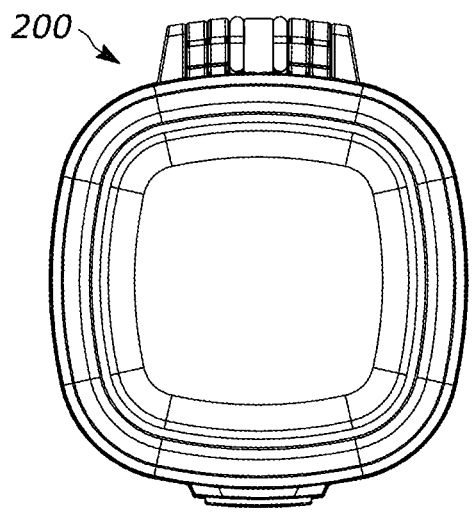
Figure 48:
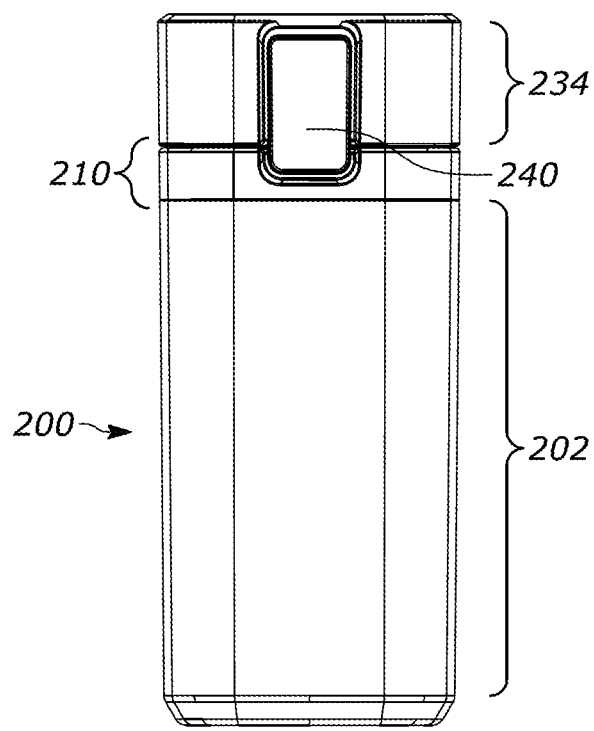
Figure 49:
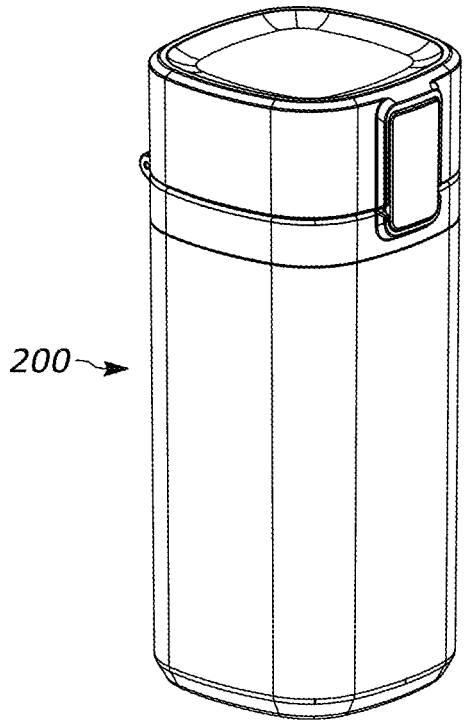
Figure 50:
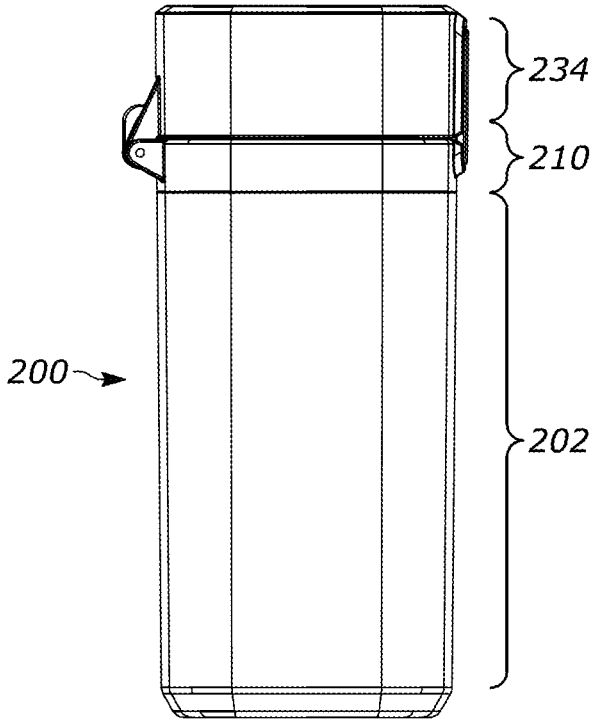
Figure 51:
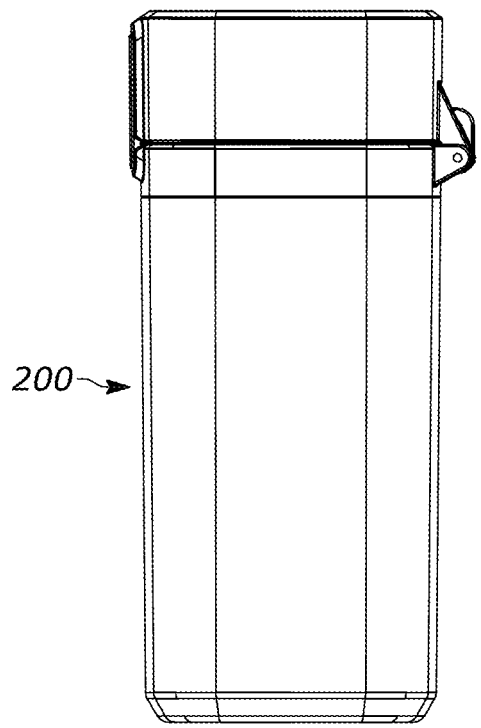
Figure 52:
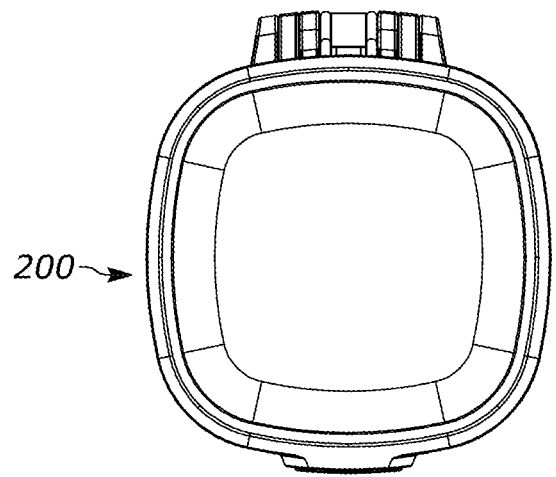
Figure 53:
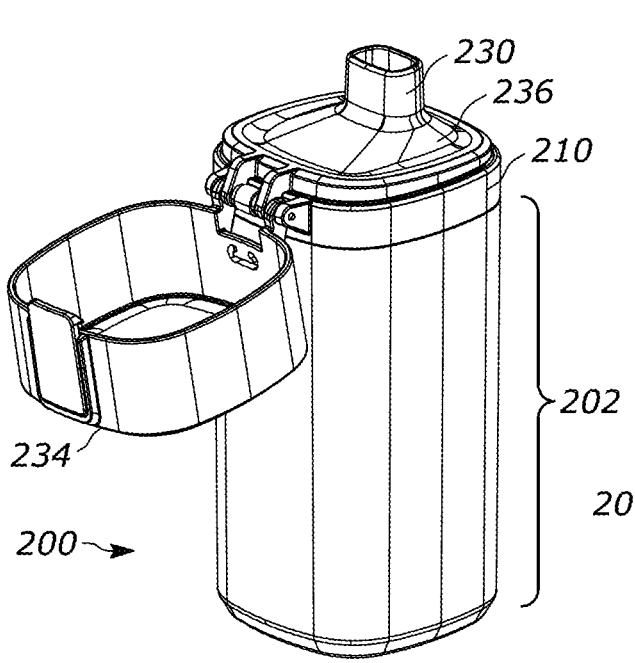
Figure 54:
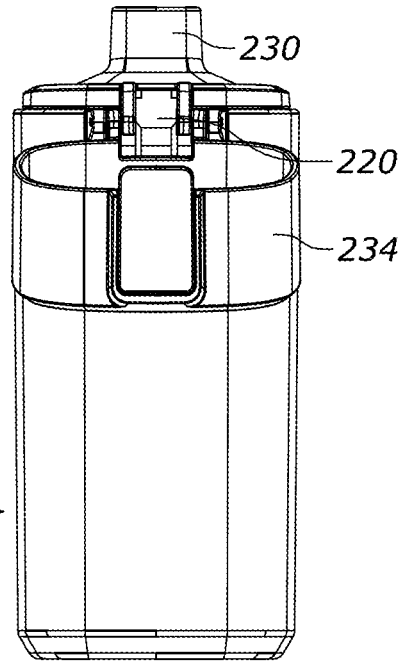
Figure 59:
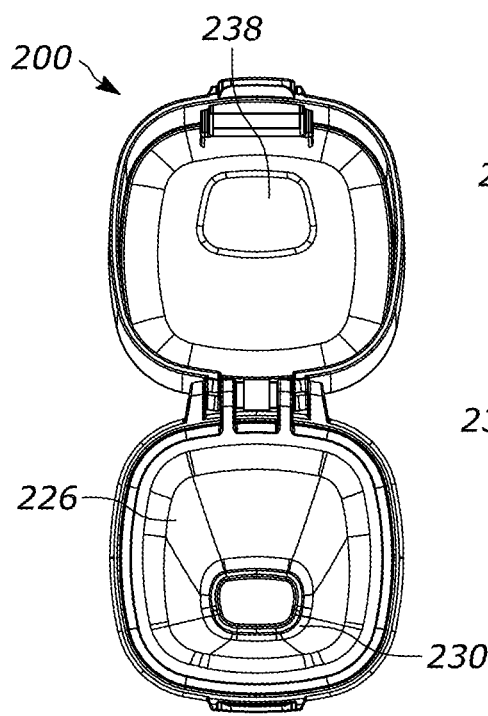
Figure 60:
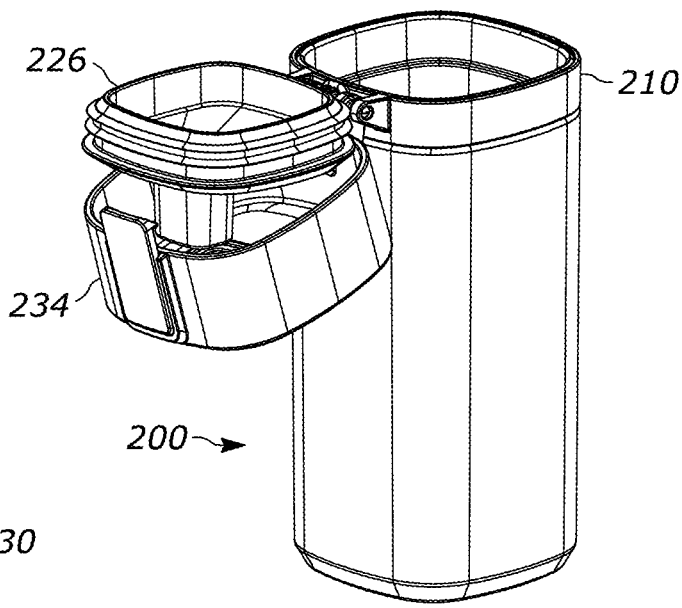
Figure 61:
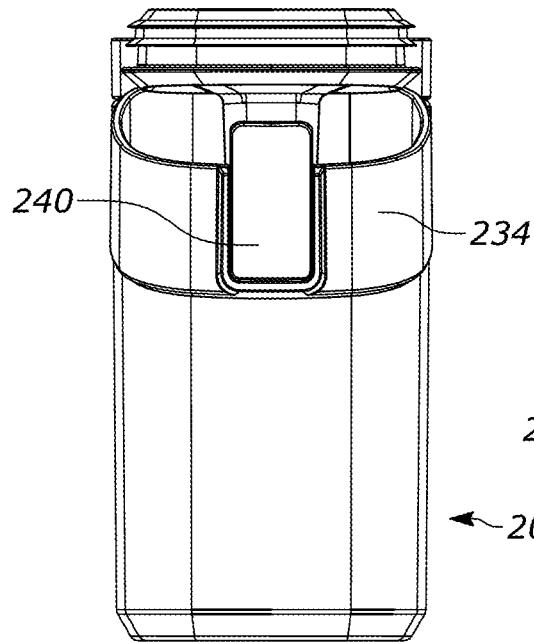
Figure 62:
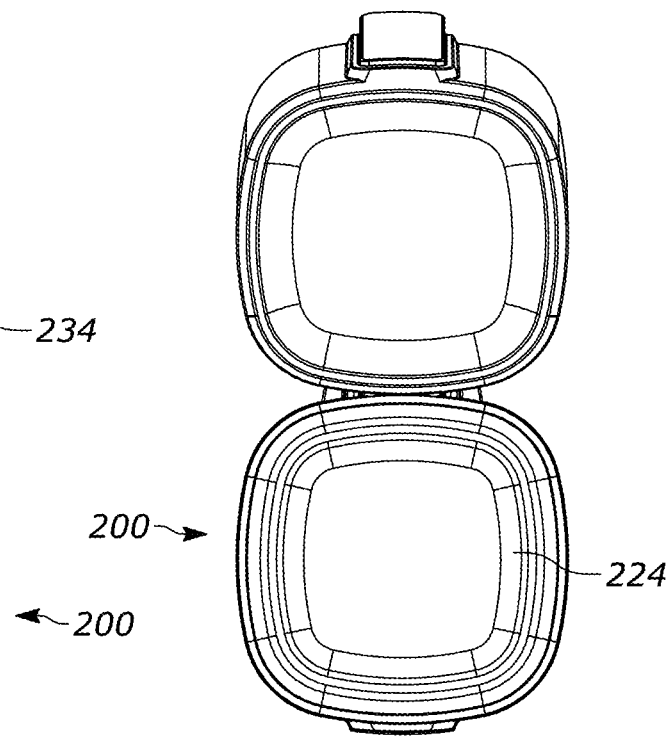
Figure 63:
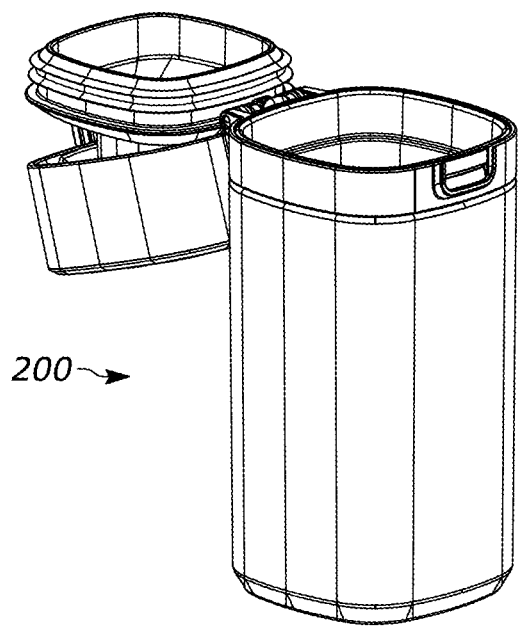
Figure 64:
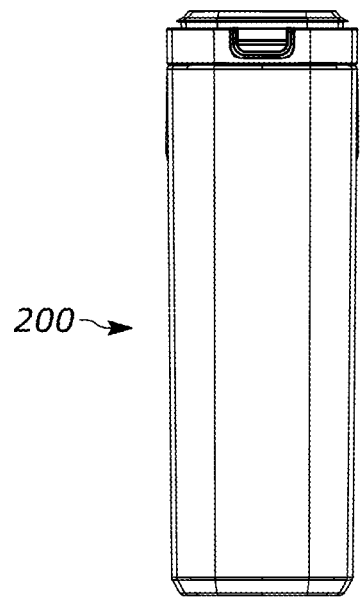
Figure 65:
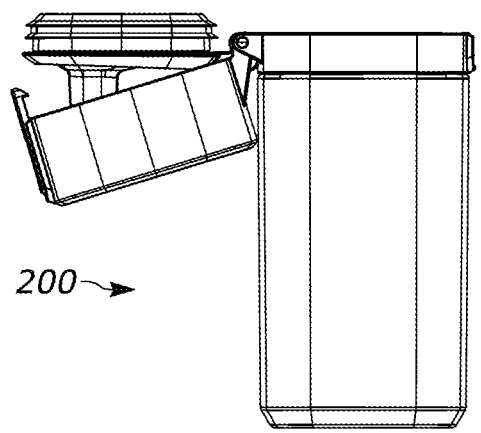
Figure 66:
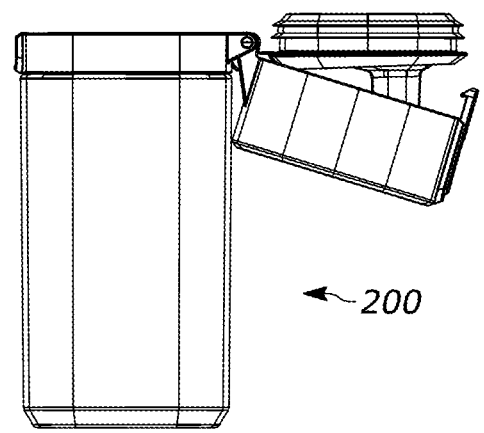
Figure 67:
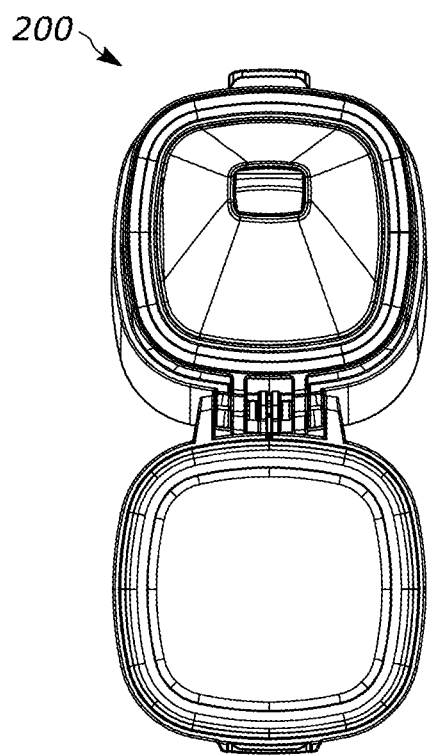
Figure 90C:
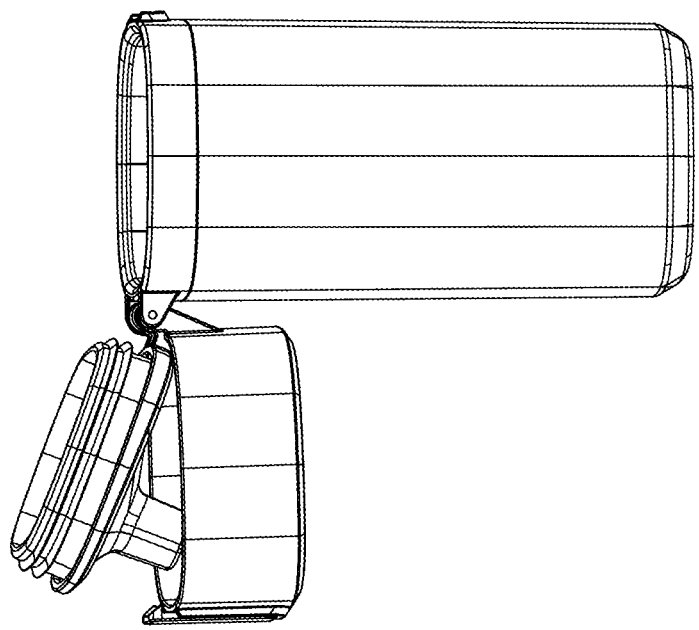
FIG. 90C is a perspective view of a container in accordance with the second embodiment of the present disclosure with both the outer and inner lids opened.
Figure 90B:
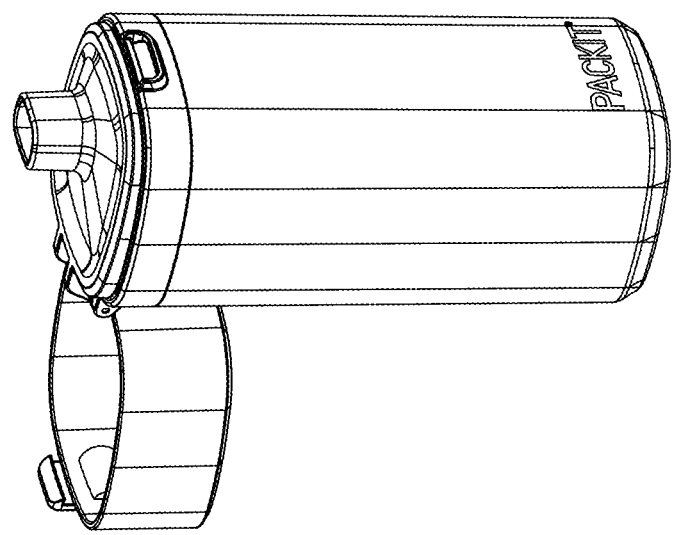
FIG. 90B is a perspective view of a container in accordance with the second embodiment of the present disclosure with the outer lid opened and the inner lid closed.
Figure 90A:
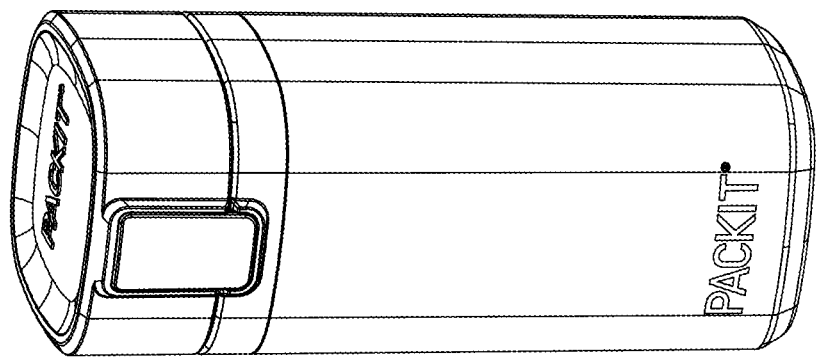
FIG. 90A is a perspective view of a container in accordance with the second embodiment of the present disclosure with both the outer and inner lids closed.

FIGS. 9 through 16, 45 through 67, and 90 illustrate a second embodiment of a container featuring an improved closure or lid. The second embodiment is generally similar to the first embodiment discussed above, except that the sizes and proportions of various components is changed. In particular, the main body of the second embodiment is smaller (i.e., shorter) than the main body 104 of the first embodiment.

Container with Sealed Inner Lid

Figure 17:
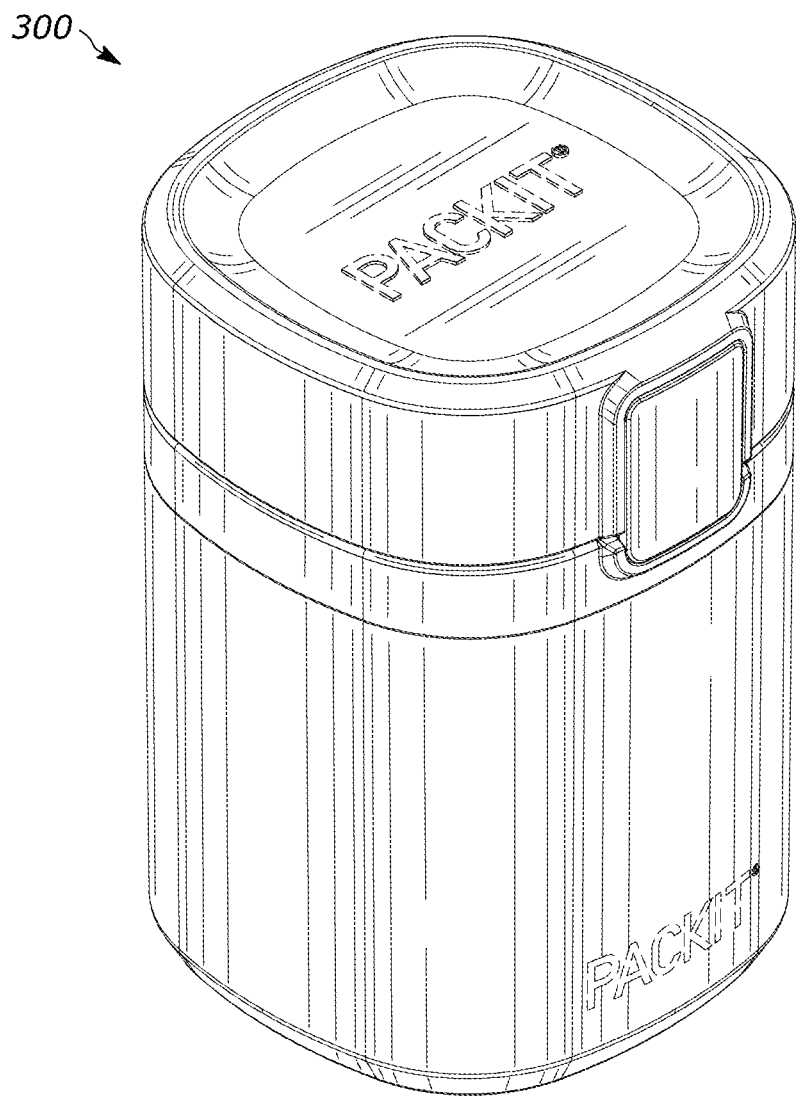
FIG. 17 is a perspective view of a third embodiment of a container in accordance with the present disclosure with the lid in a closed position.
Figure 18:
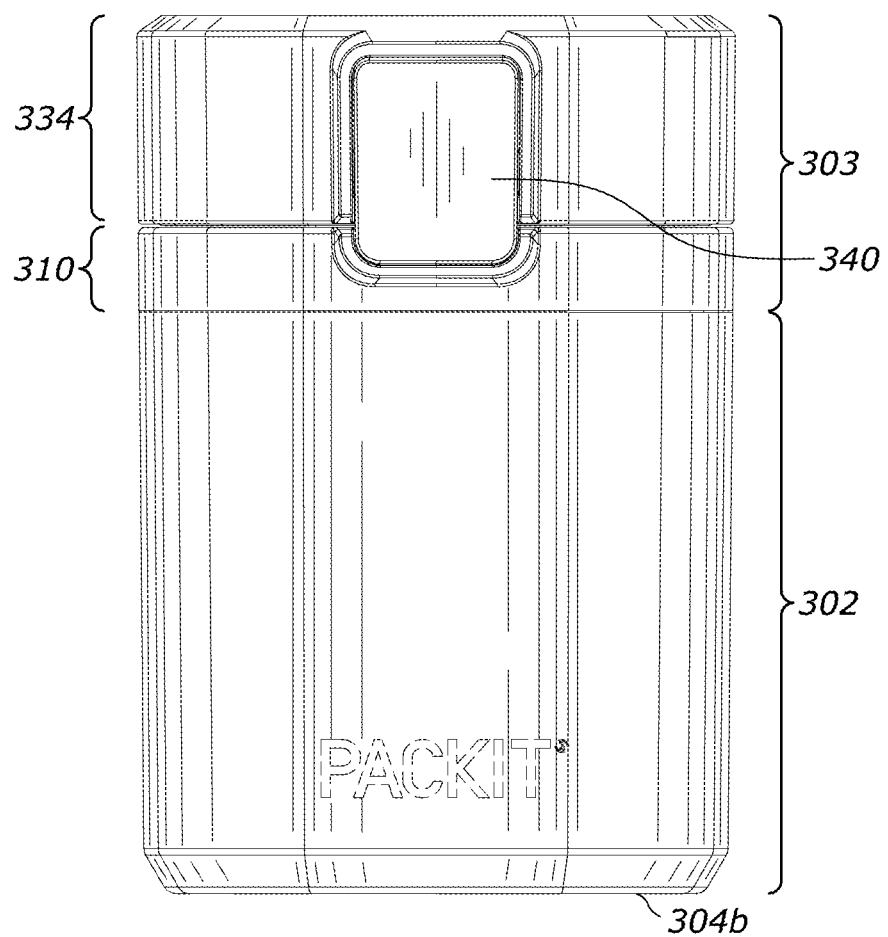
FIG. 18 is a front elevation view of the third embodiment of a container in accordance with the present disclosure with the lid in the closed position.
Figure 19:
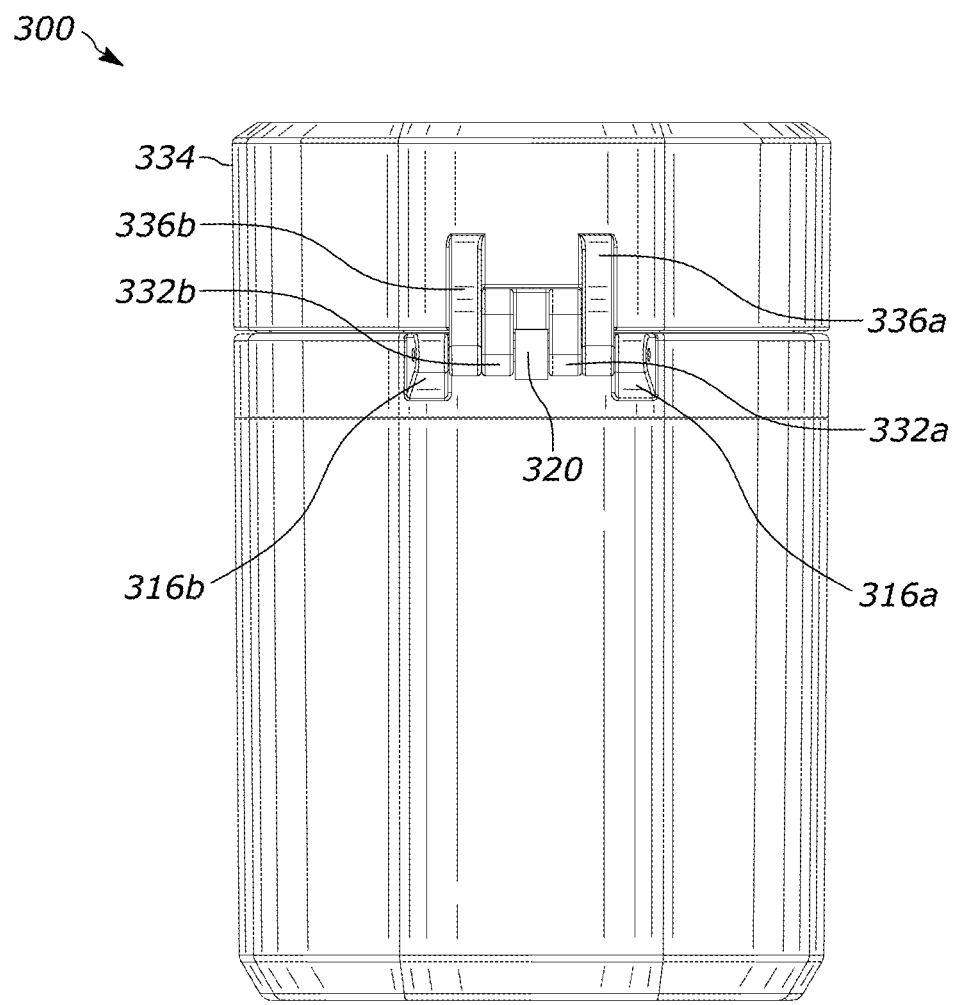
FIG. 19 is a rear elevation view of the third embodiment of a container in accordance with the present disclosure with the lid in the closed position.
Figure 20:
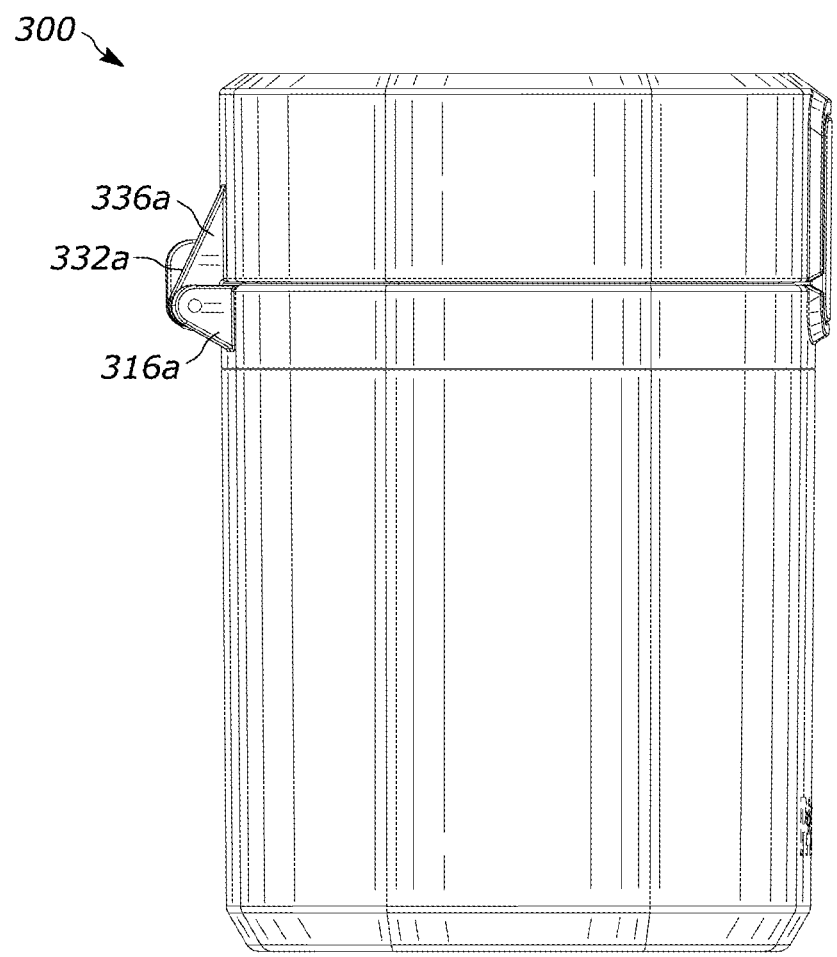
FIG. 20 is a right elevation side view of the third embodiment of a container in accordance with the present disclosure with the lid in the closed position.
Figure 21:
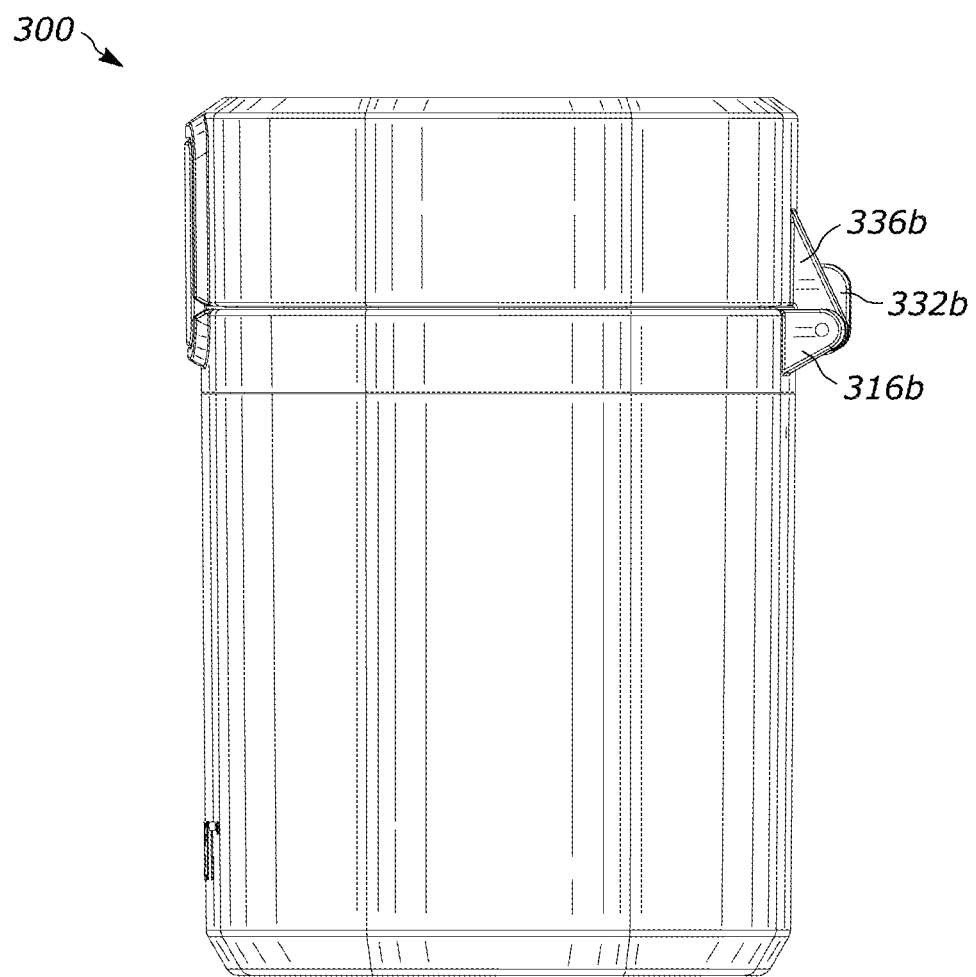
FIG. 21 is a left elevation side view of the third embodiment of a container in accordance with the present disclosure with the lid in the closed position.
Figure 22:
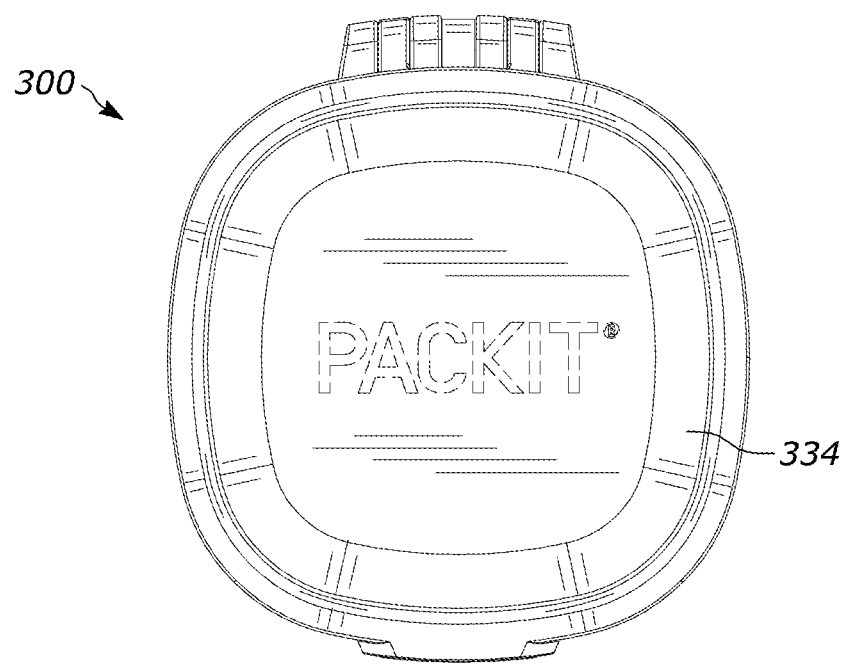
FIG. 22 is a top plan view of the third embodiment of a container in accordance with the present disclosure with the lid in the closed position.
Figure 23:
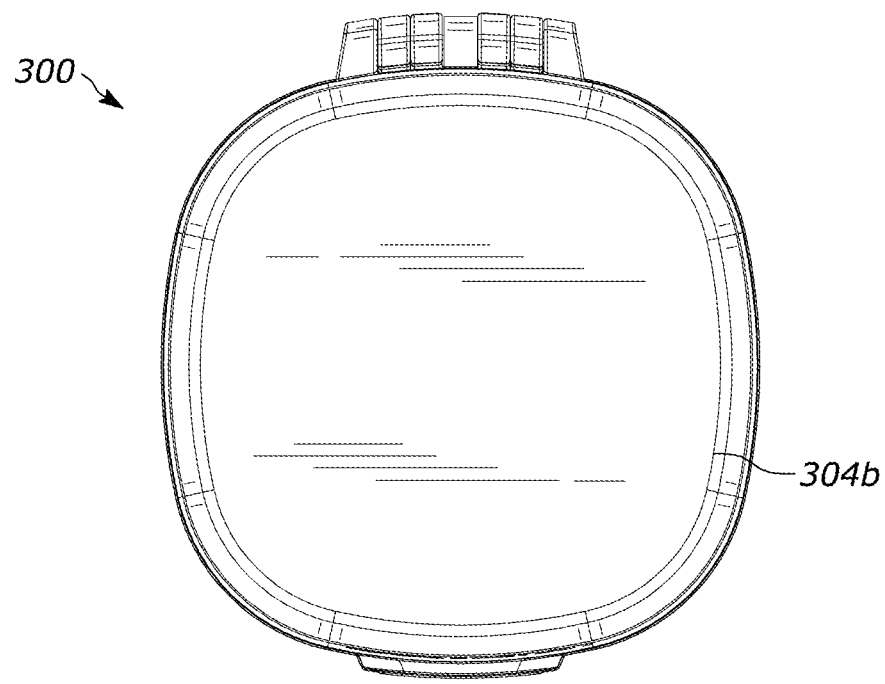
FIG. 23 is a bottom plan view of the third embodiment of a container in accordance with the present disclosure with the lid in the closed position.
Figure 24:
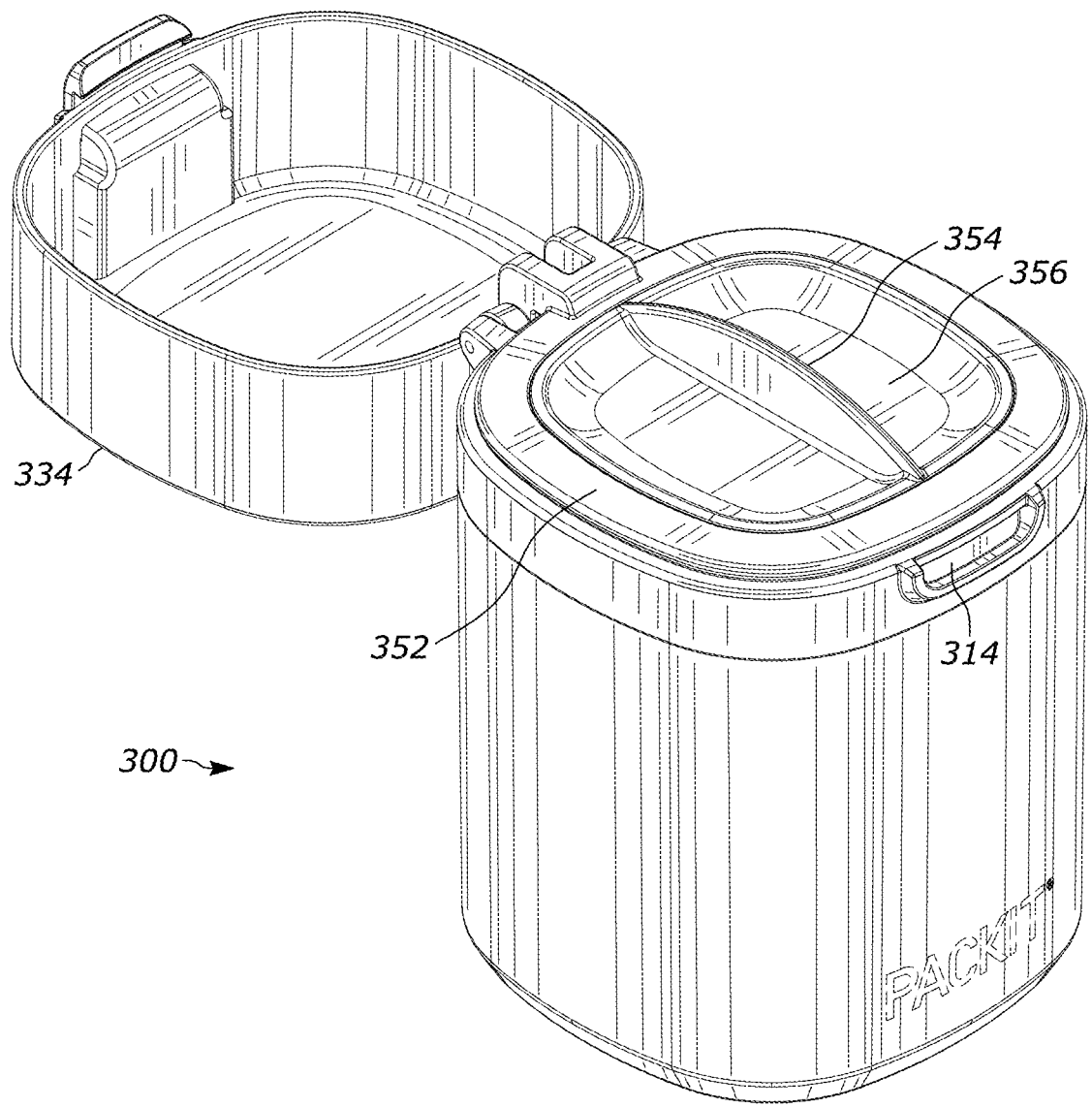
FIG. 24 a perspective view of the third embodiment of a container in accordance with the present disclosure with the lid in an opened position.
Figure 26:
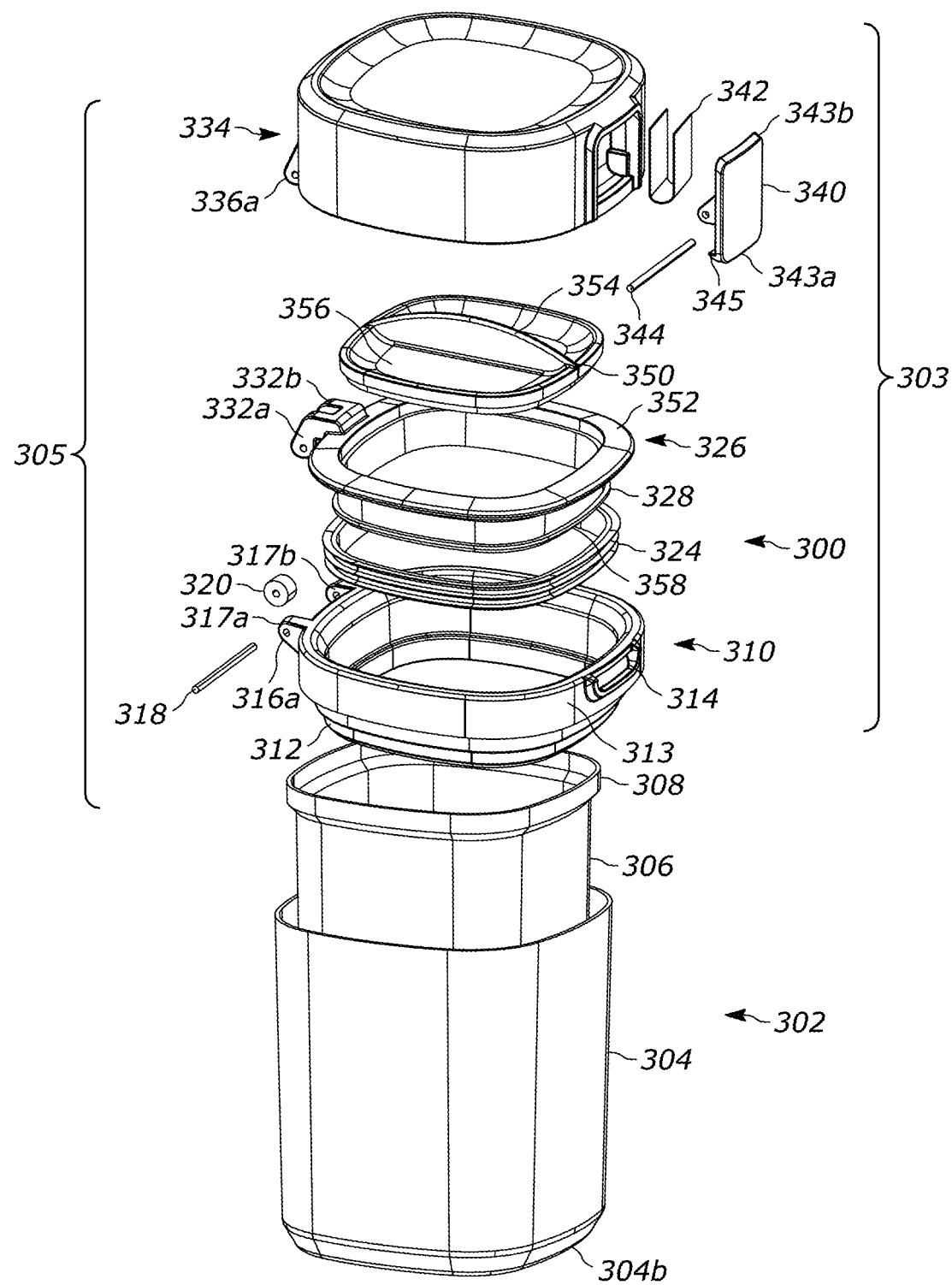
FIG. 26 is an annotated exploded view of the third embodiment of a container in accordance with the present disclosure.
Figure 68:
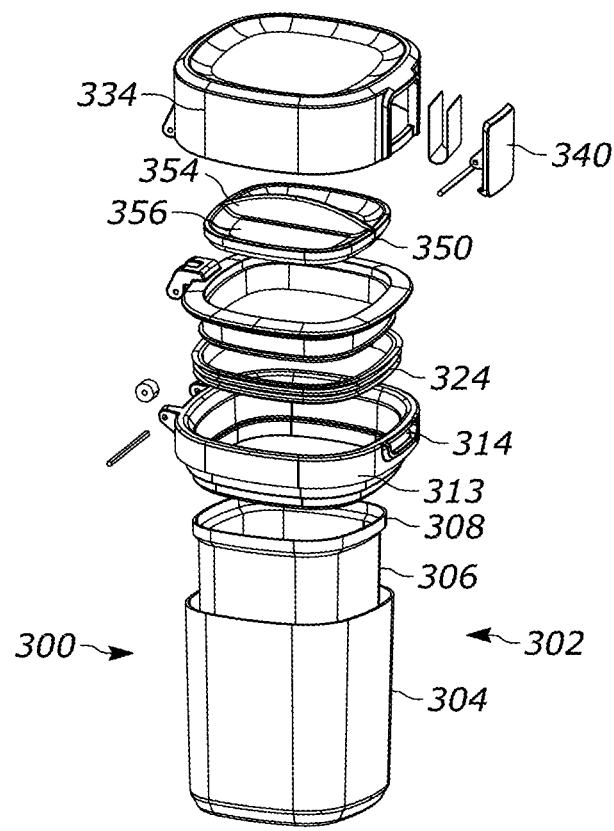
FIGS. 68 through 88 are various alternative views of the third embodiment of a container in accordance with the present disclosure.
Figure 69:
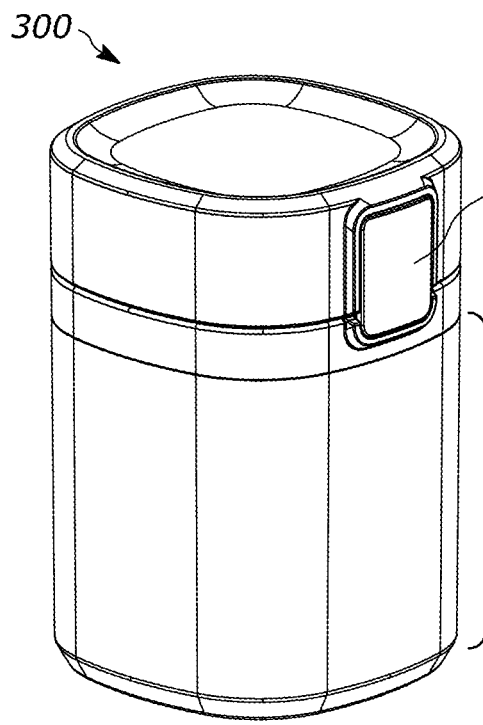
Figure 70:
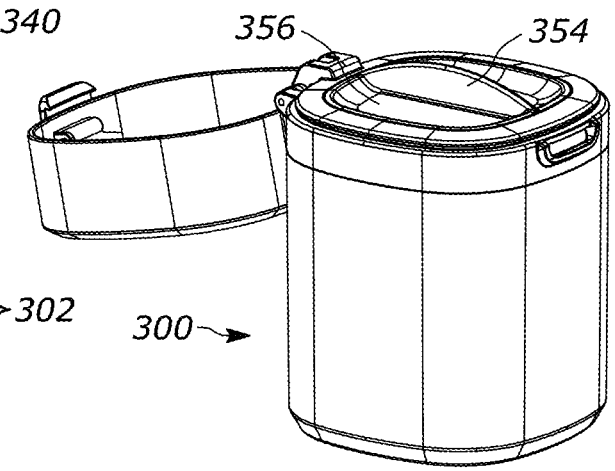
Figure 71:
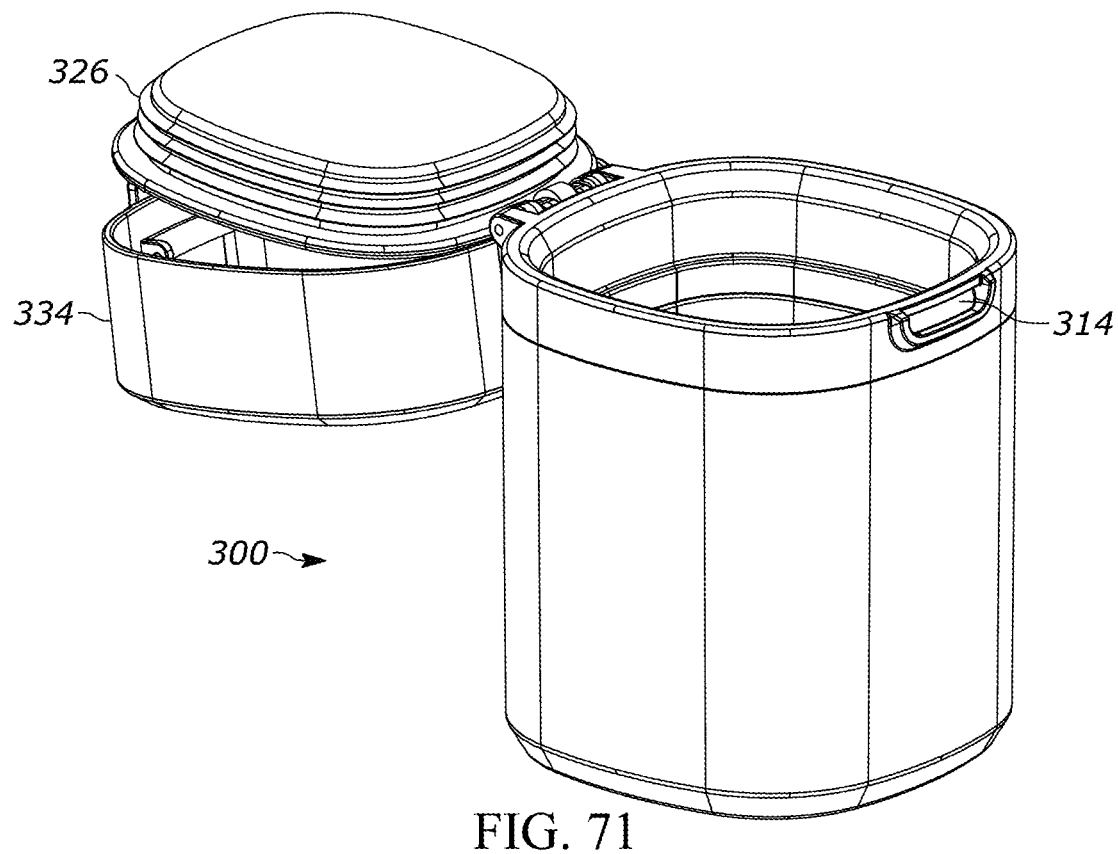
Figure 72:
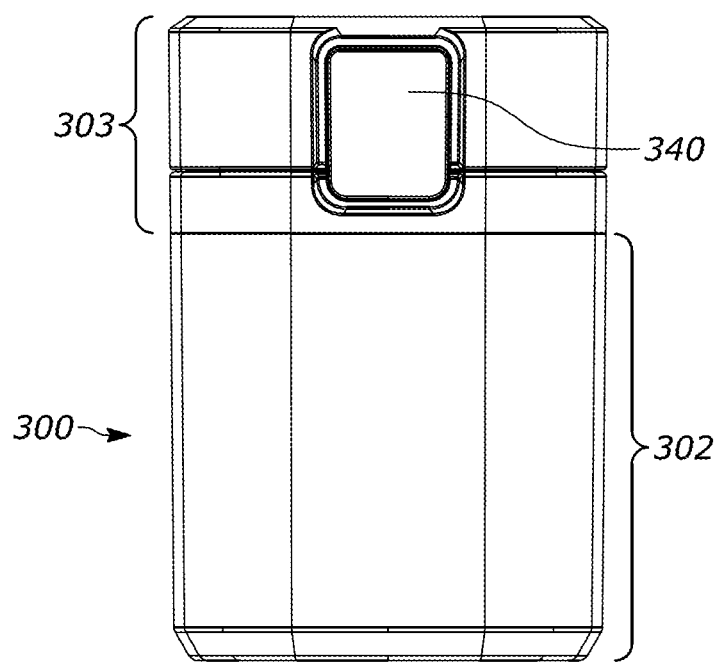
Figure 73:
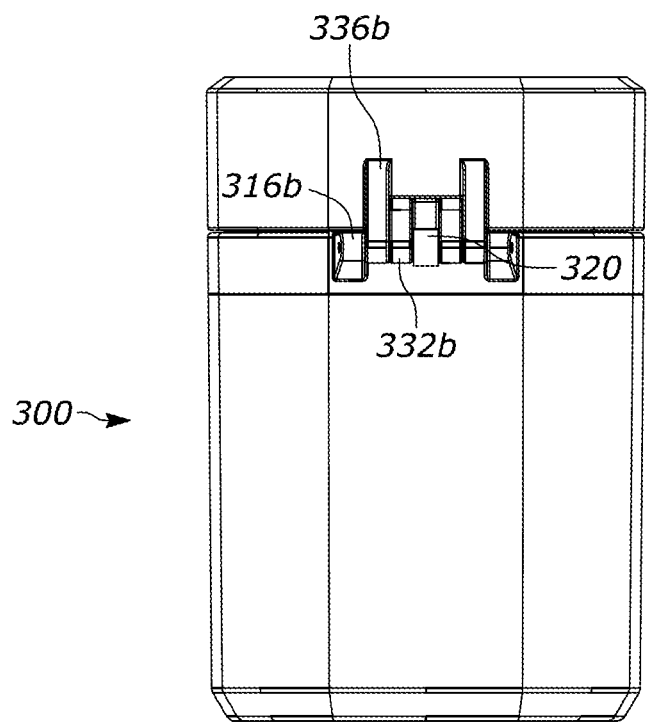
Figure 74:
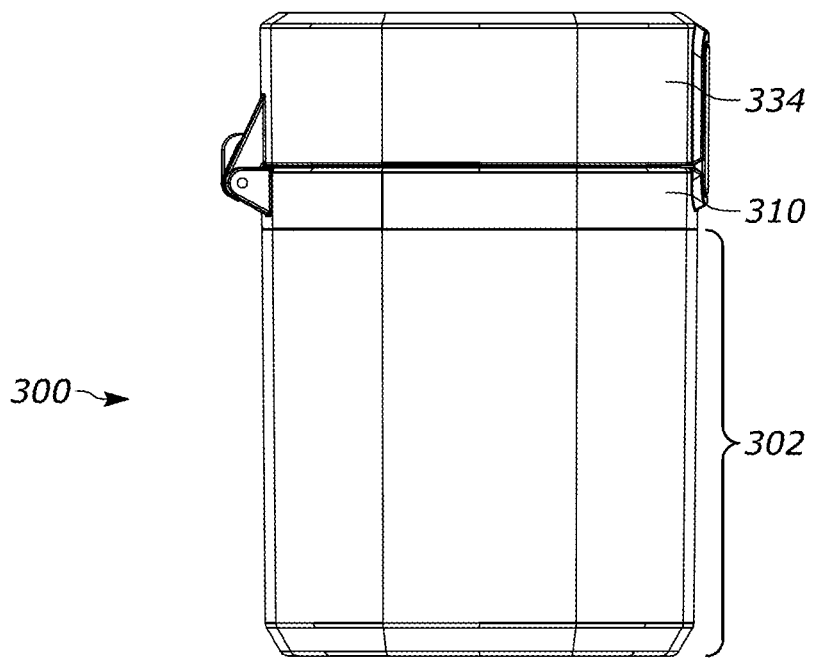
Figure 75:
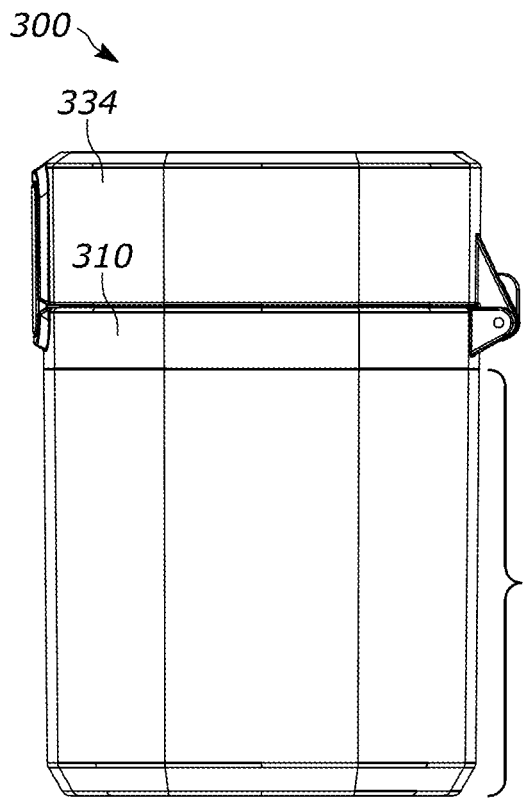
Figure 76:
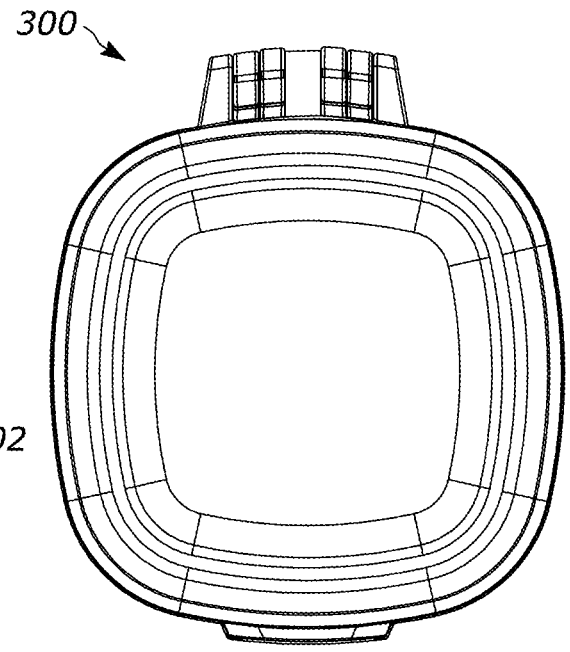
Figure 77:
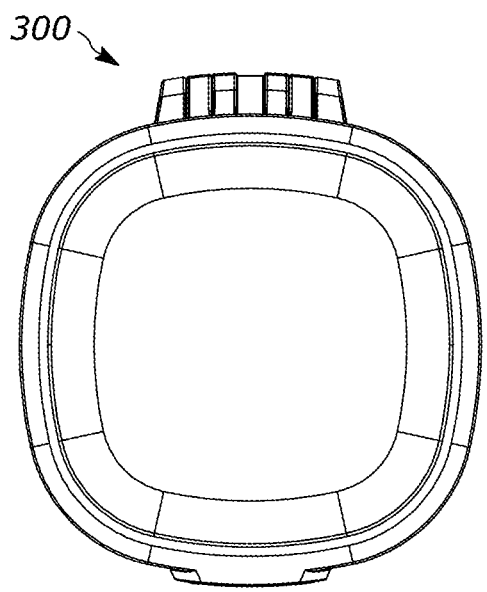
Figure 78:
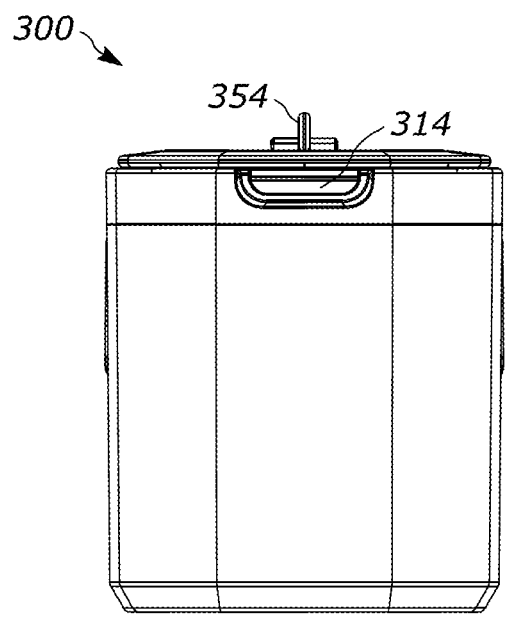
Figure 79:
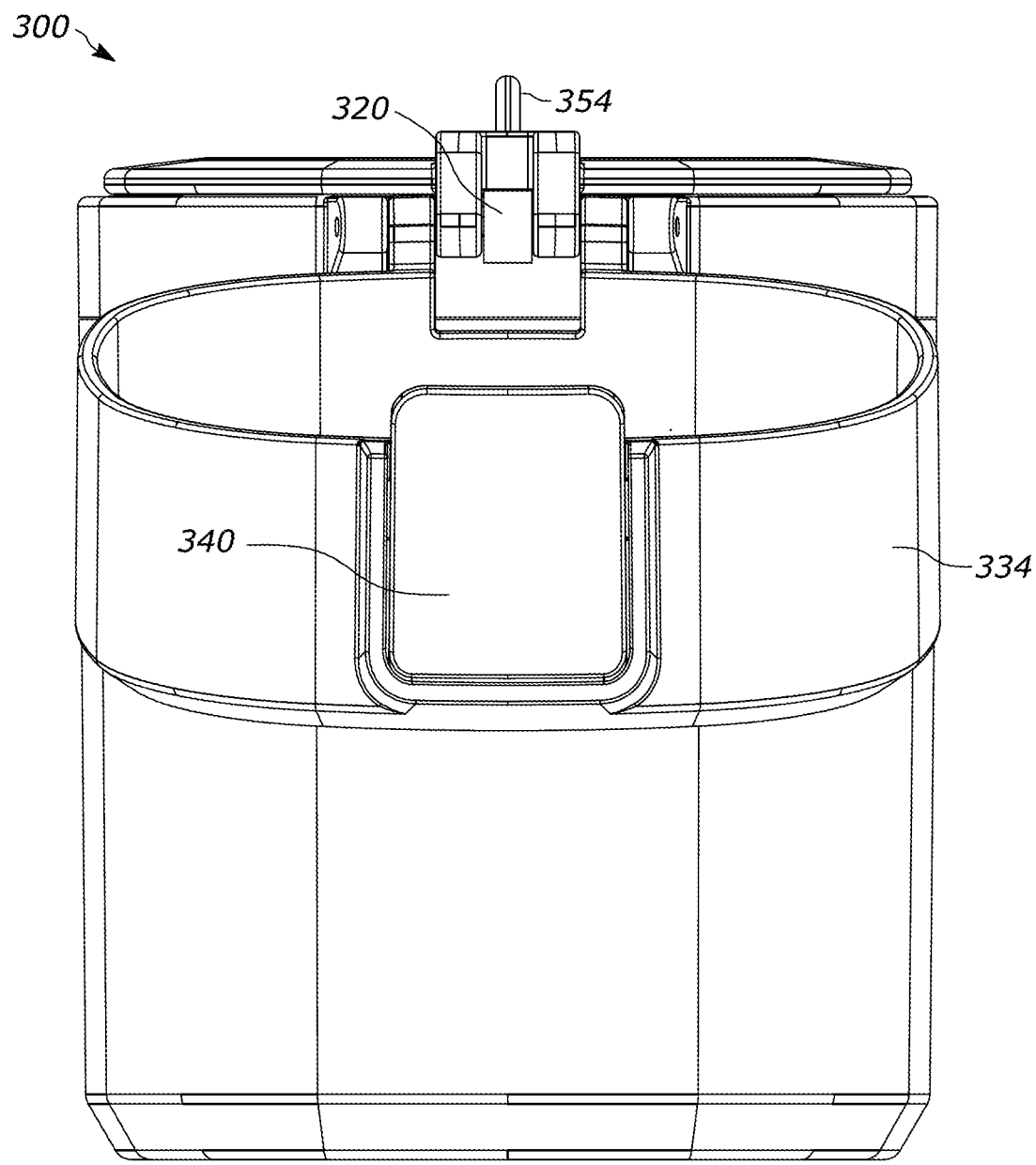
Figure 80:
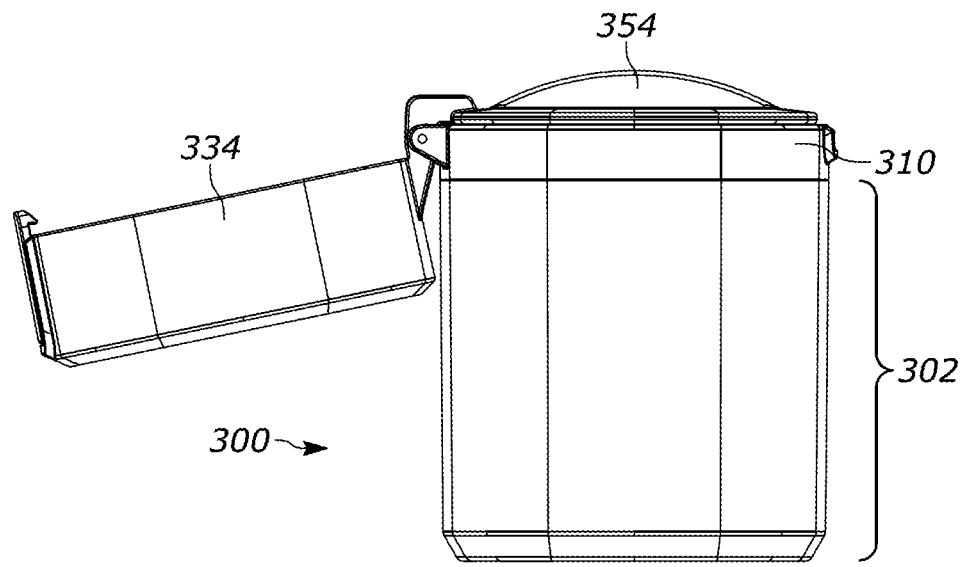
Figure 81:
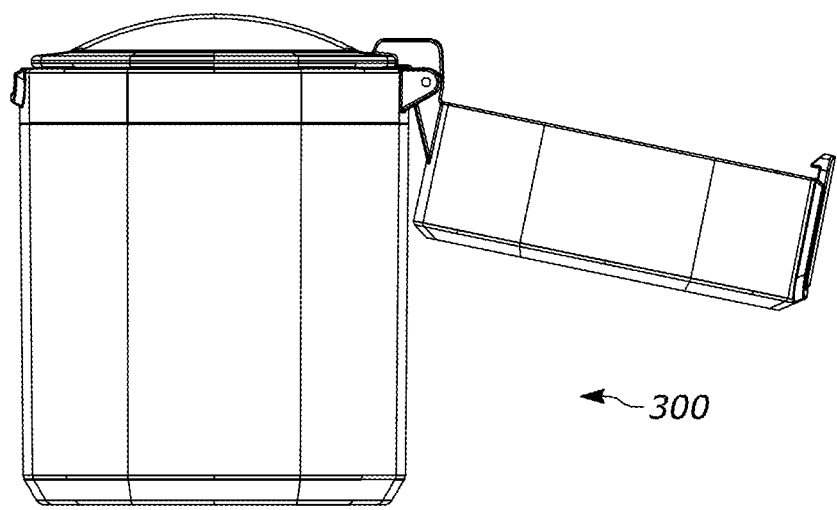
Figure 82:
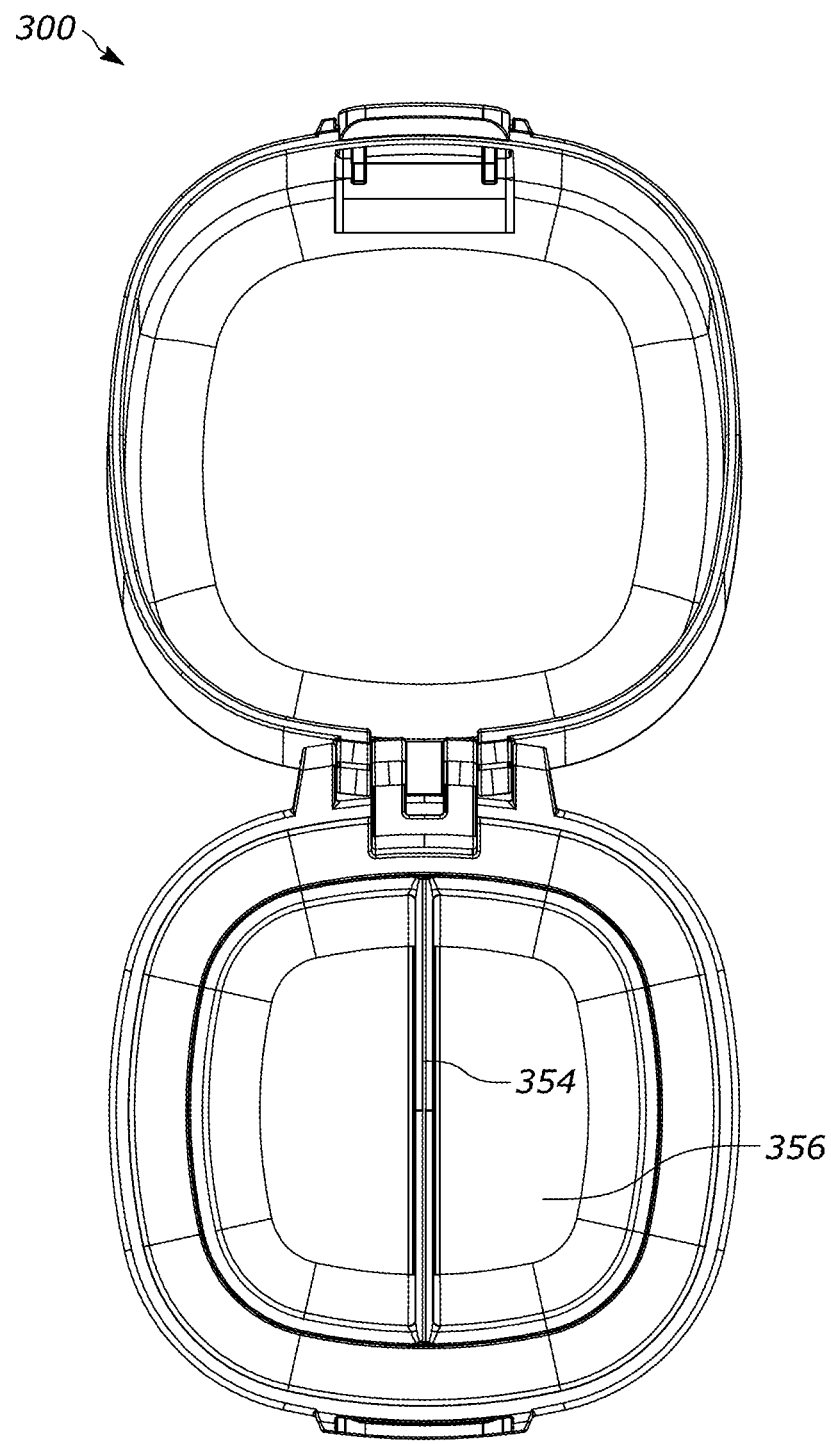
Figure 83:
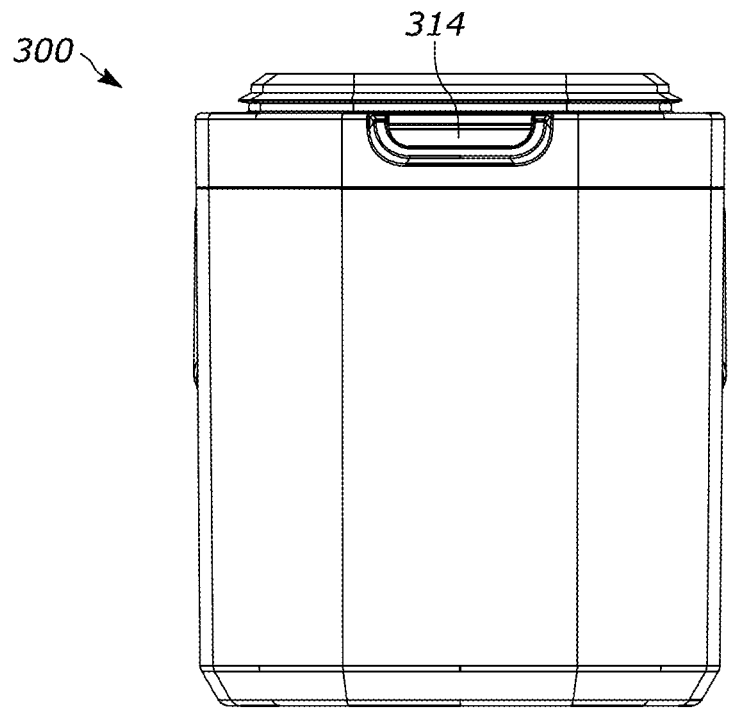
Figure 84:
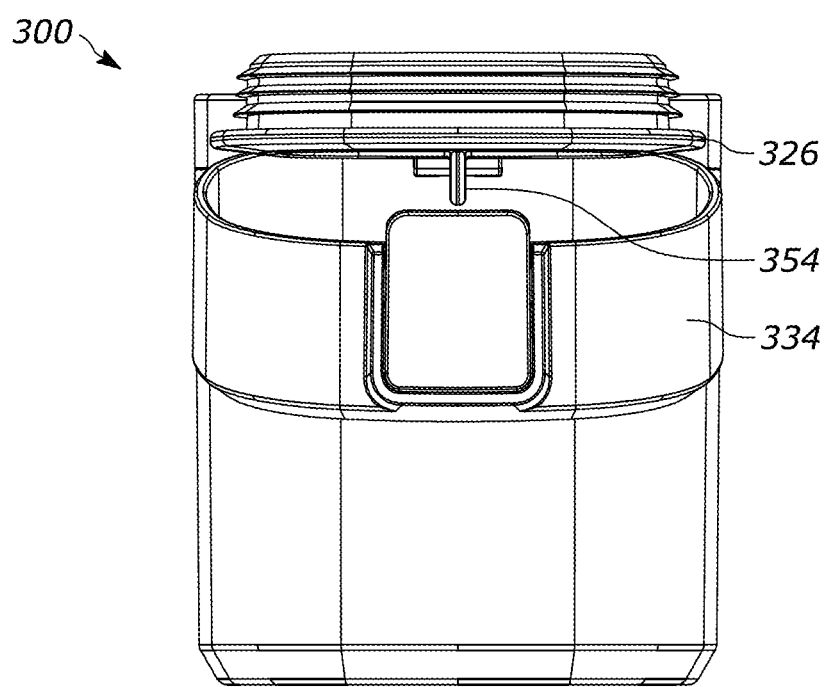
Figure 85:
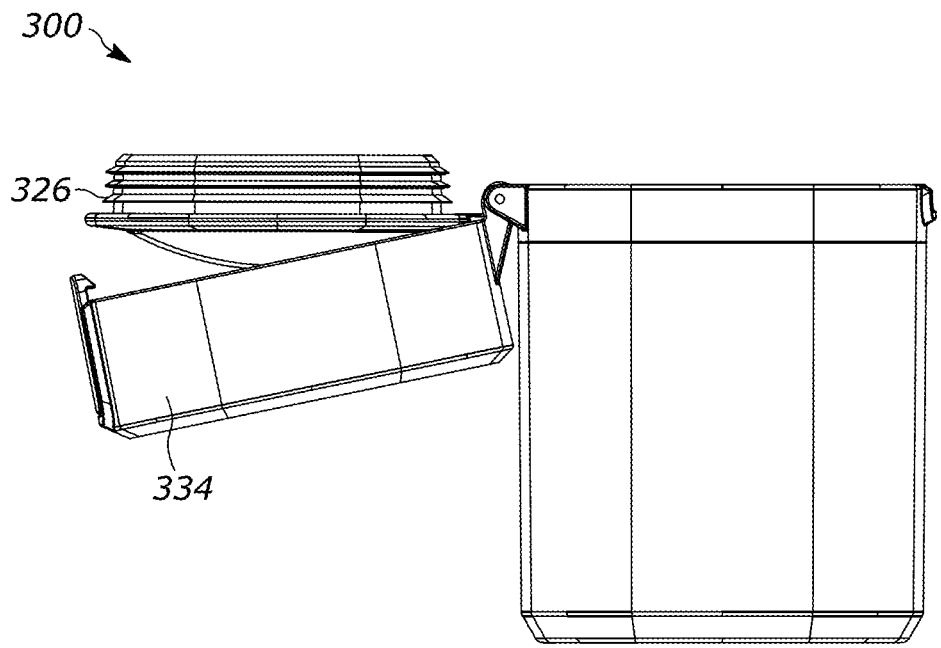
Figure 86:
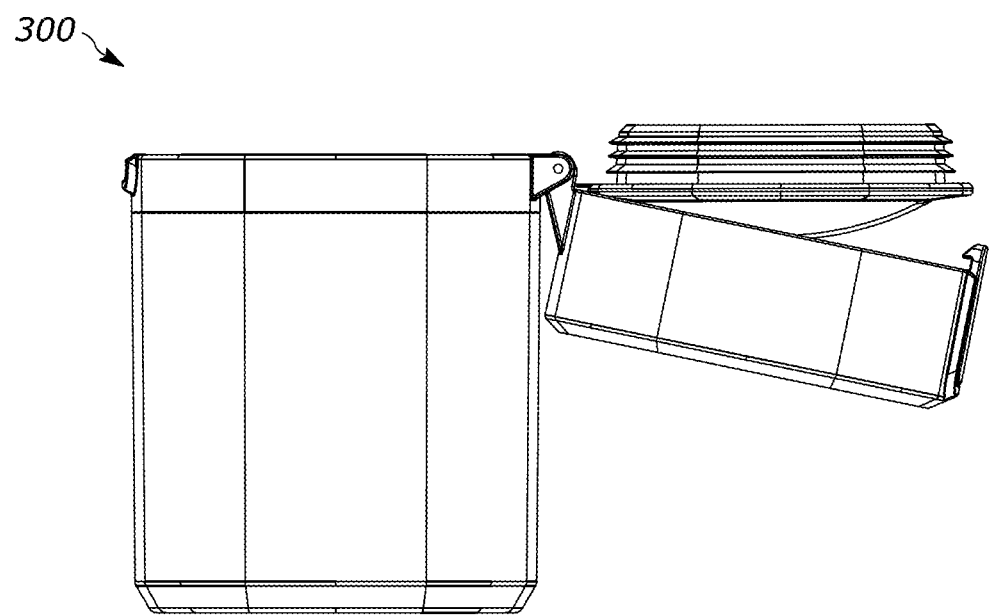
Figure 87:
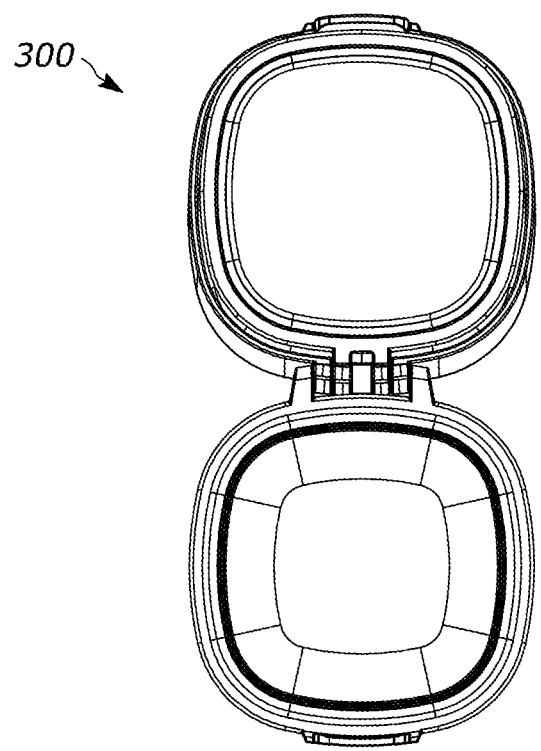
Figure 88:
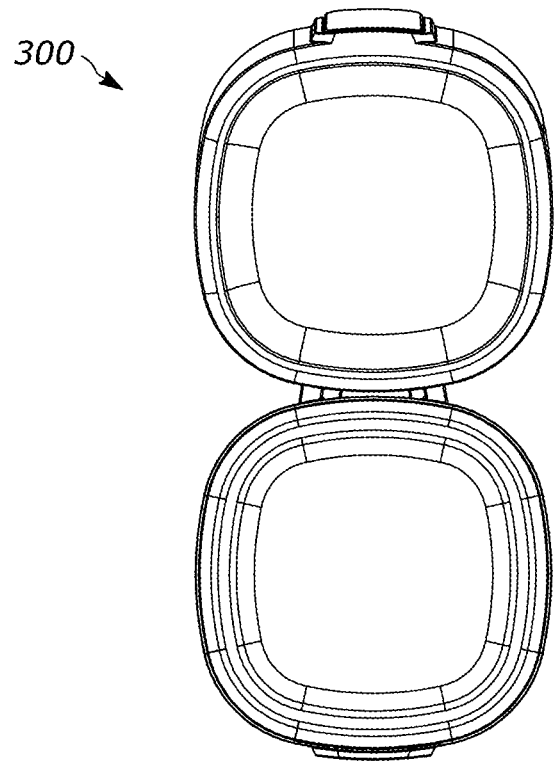
Figure 91C:
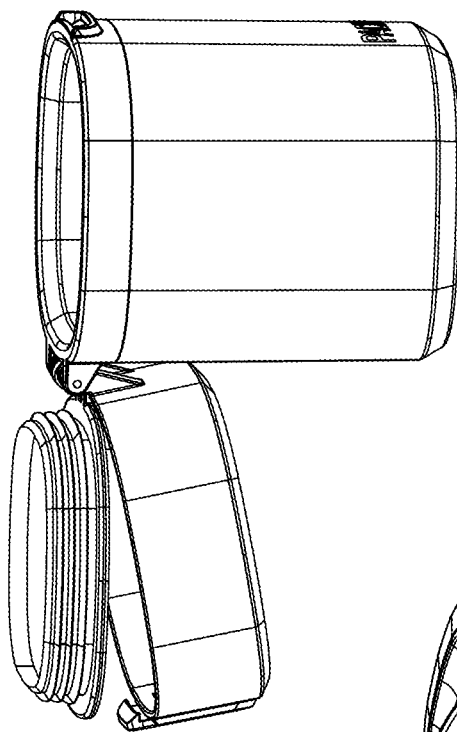
FIG. 91C is a perspective view of a container in accordance with the third embodiment of the present disclosure with both the outer and inner lids opened.
Figure 91B:
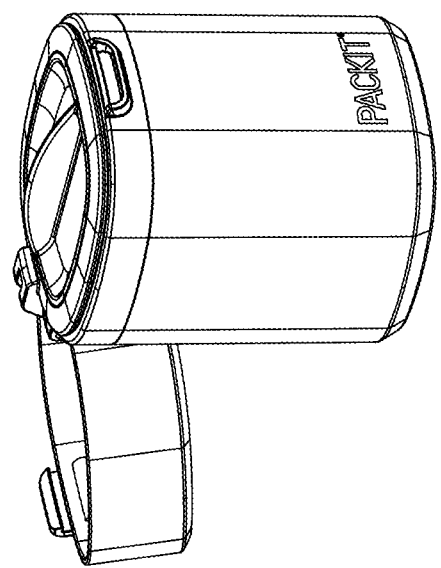
FIG. 91B is a perspective view of a container in accordance with the third embodiment of the present disclosure with the outer lid opened and the inner lid closed.
Figure 91A:
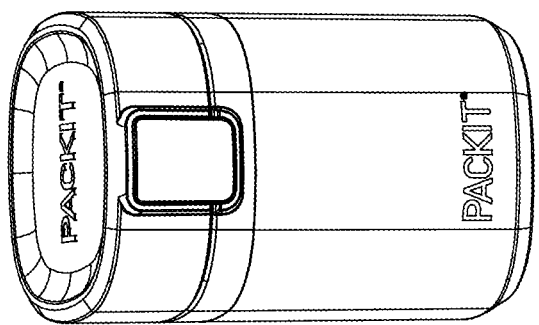
FIG. 91A is a perspective view of a container in accordance with the third embodiment of the present disclosure with both the outer and inner lids closed.

FIGS. 17 through 24, 26, 68 through 88, and 91 illustrate a third embodiment of a container 300 featuring an improved closure or lid. The container of the third embodiment is specially adapted to contain items such as food or soup that are consumed using the hands or utensils (rather than being a liquid to be drank). Like numbers are used to refer to similar components as the first embodiment.

As shown, the inner lid 326 comprises two components: a lower section 352 (including an inner rim 328 that is generally similar to inner rim 128) and an upper section 350. In an embodiment, the inner lid 326 is made of Tritan™ plastic. As shown, the upper section 350 comprises a ridge 354 on that is adapted for a user to grab to open the inner lid 326. The upper portion further comprises a roof 356, while the lower portion 352 further comprises a floor 358. The upper portion 350 is joined to the lower portion 352, for example, by soldering, brazing, welding, epoxying, adding adhesive, or co-forming. In an embodiment, upper portion 350 and lower portion 352 are formed from a single piece of material (rather than two separate pieces joined together). In an embodiment, the sealed volume disposed between the roof 356 and the floor 358 is at least partially evacuated prior to sealing upper portion 350 and lower portion 352, such that upper portion 350 and lower portion 352, and the sealed volume therebetween cooperatively form an insulating wall for the inner lid 326 such that changes in the temperature outside the main body 302 are not immediately felt by the contents of the main body 302, and vice versa. The sealed volume may be evacuated using techniques that are known in the art. In an alternative embodiment, the sealed volume may instead be filled with an insulating material, such as an insulating gel, foam, or gas.

The retainer 320 as shown is of a constant radius. Unlike the first and second embodiments discussed above, in the embodiment shown, no retainer is used to bias the top lid 334 towards the fully opened position. Thus, when opening the outer lid 334, a user must manually move the outer lid 334 into the fully opened position. In alternative embodiments, a retainer or retaining band (e.g., a deformed O-ring or elastic band) is used to bias the top lid to the fully opened position.

In an alternative embodiment, a second lock (not shown) is used to secure the inner lid 126 to the collar 110 when the inner lid 126 is in a closed position. This provides greater security that the inner lid 126 will not open unintentionally. In an embodiment, a protrusion formed from a resilient, semi-flexible or flexible material extends downward from the inner lid 126 and overlaps at least a portion of the collar 110. The protrusion may be formed with a U-shape with a tab (configured for easy operation by a finger) at its lower end and an opening in a central portion thereof. A receiving portion formed of a matching channel and protrusion formed on the collar 110 receives and retains the protrusion. To release the second lock, a user may lift the tab away from the collar, thereby freeing the inner lid 126. Alternative structures for the second lock are also contemplated.

Fourth Embodiment

Figure 92:
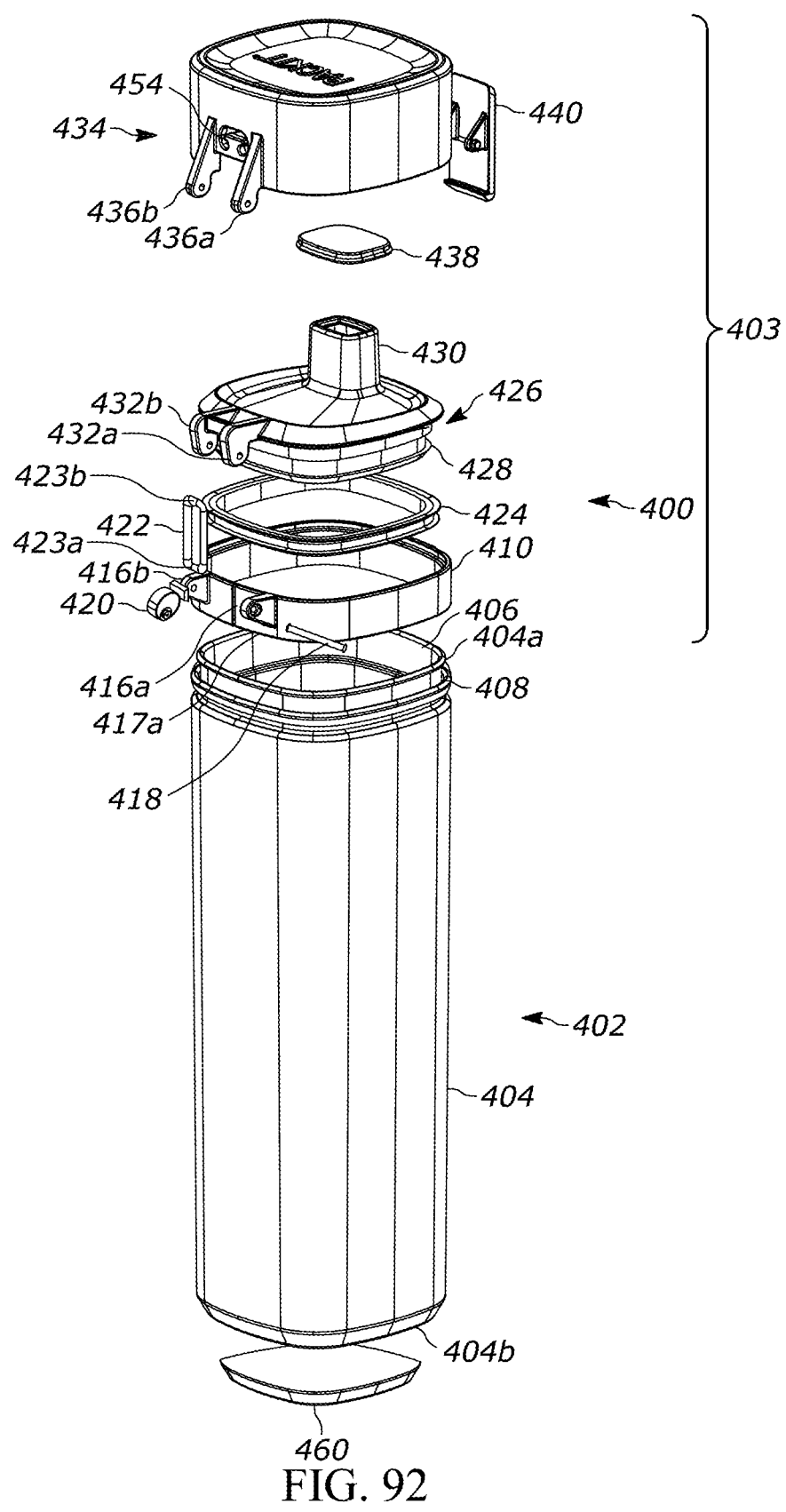
FIG. 92 is an rear exploded view of a fourth embodiment of a container in accordance with the present disclosure.
Figure 93:
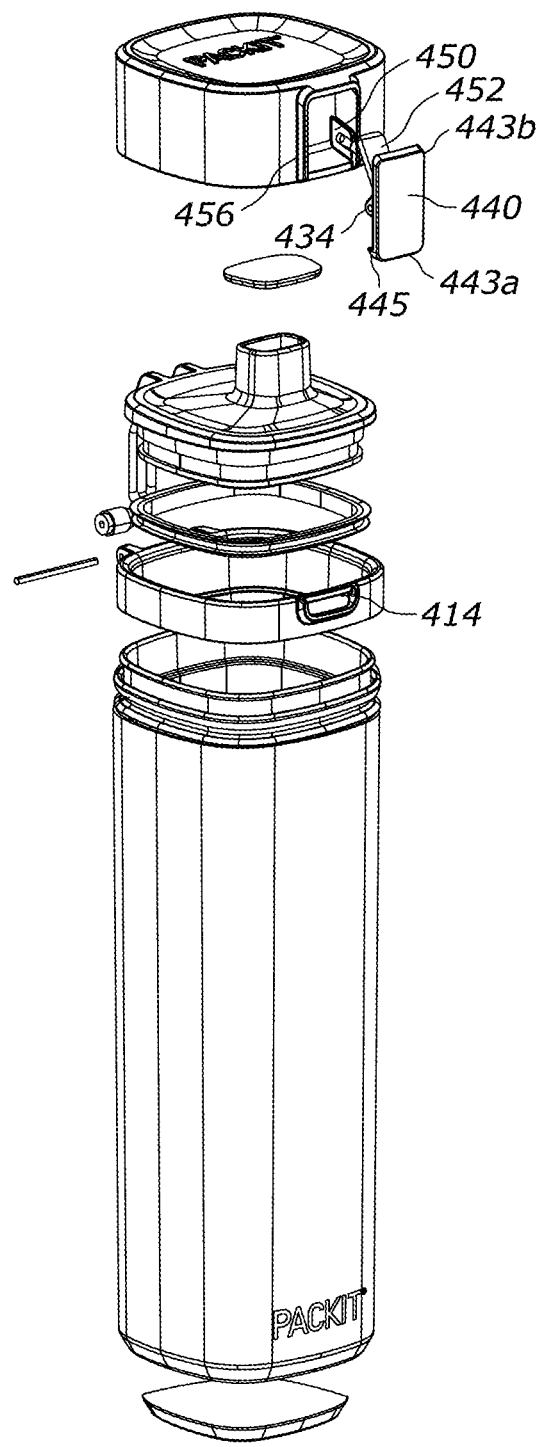
FIG. 93 is an front exploded view of a fourth embodiment of a container in accordance with the present disclosure.
Figure 94:
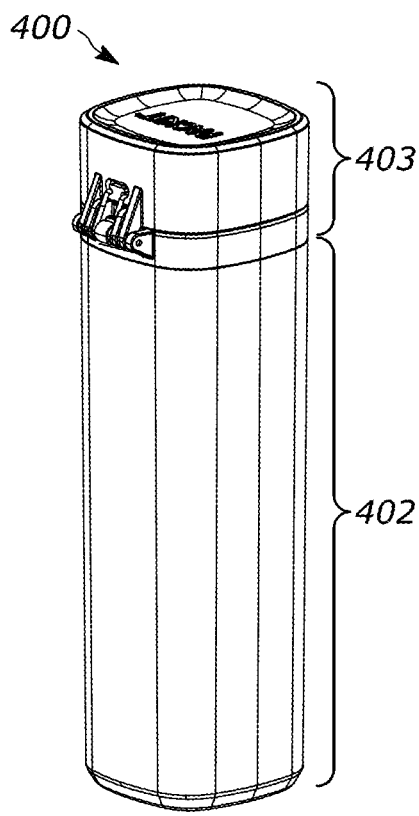
FIG. 94 is a perspective view of the fourth embodiment of a container in accordance with the present disclosure with the lid in a closed position.
Figure 95:
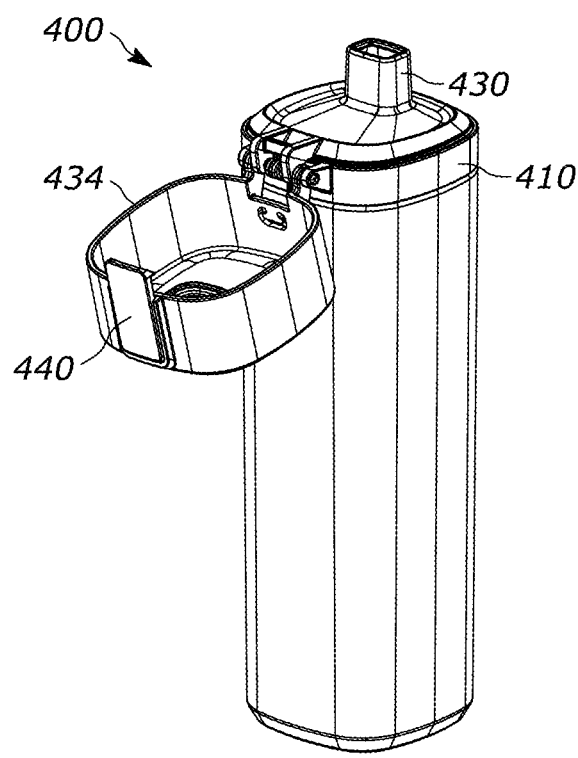
FIG. 95 is a perspective view of the fourth embodiment of a container in accordance with the present disclosure with the lid in an open position.
Figure 96:
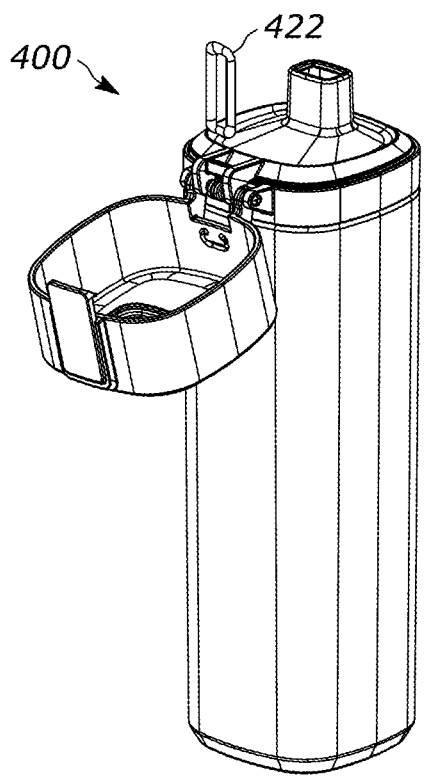
FIG. 96 is a perspective view of the fourth embodiment of a container in accordance with the present disclosure with the lid in an open position and the retainer removed.
Figure 97:
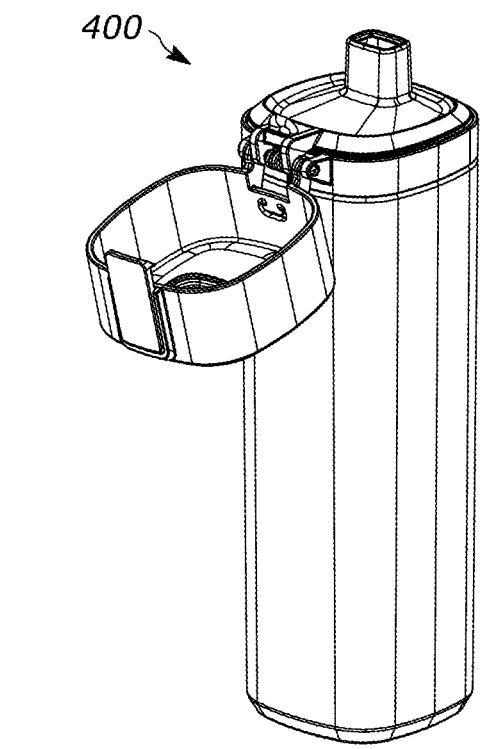
FIG. 97 is a perspective view of the fourth embodiment of a container in accordance with the present disclosure with the lid in an open position and the retainer in place.
Figure 98:
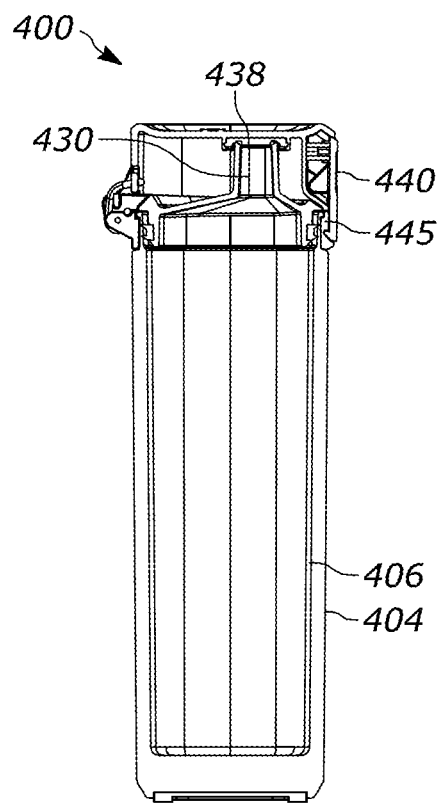
FIG. 98 is a cross-sectional side view of the fourth embodiment of a container in accordance with the present disclosure with the lid in a closed position.
Figure 99:
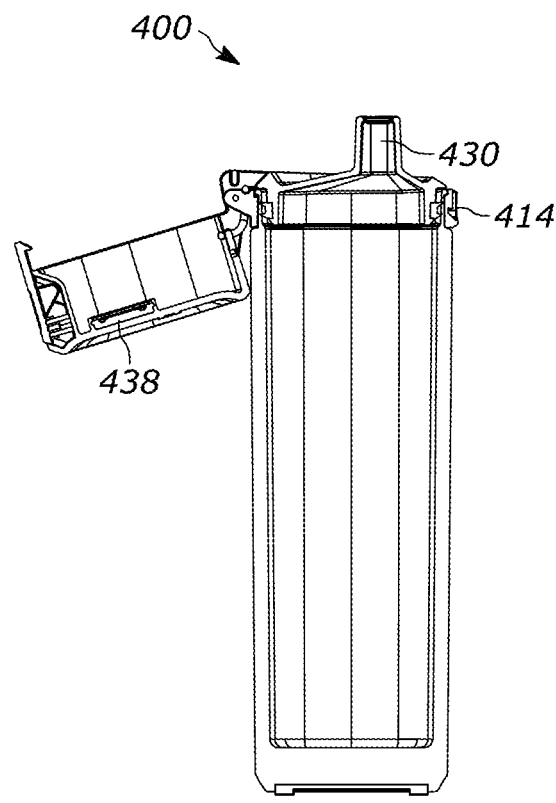
FIG. 99 is a cross-sectional side view of the fourth embodiment of a container in accordance with the present disclosure with the lid in an open position and the spacer and retainer in place.
Figure 100:
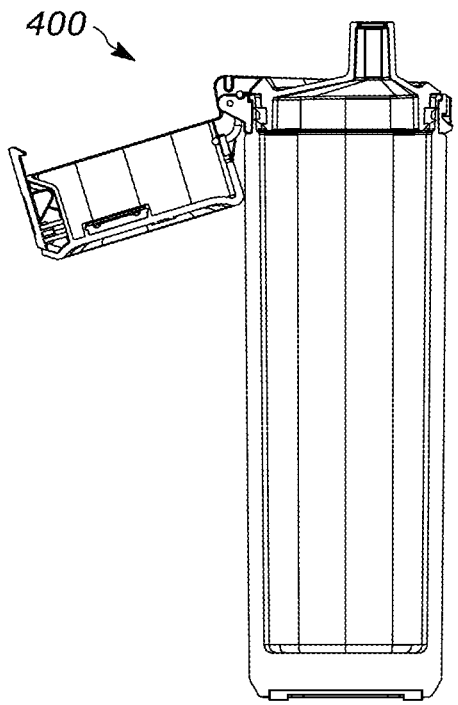
FIG. 100 is a cross-sectional side view of the fourth embodiment of a container in accordance with the present disclosure with the lid in an open position and the spacer removed.
Figure 101:
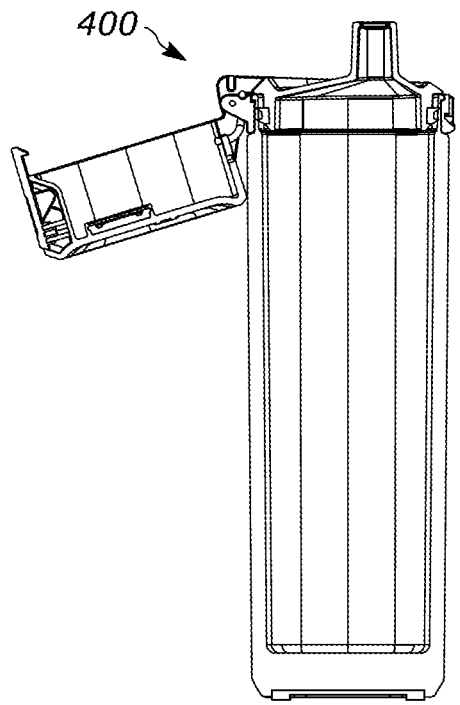
FIG. 101 is a cross-sectional side view of the fourth embodiment of a container in accordance with the present disclosure with the lid in an open position and the spacer detached from the retainer and rotated away from the inner lid.
Figure 102:
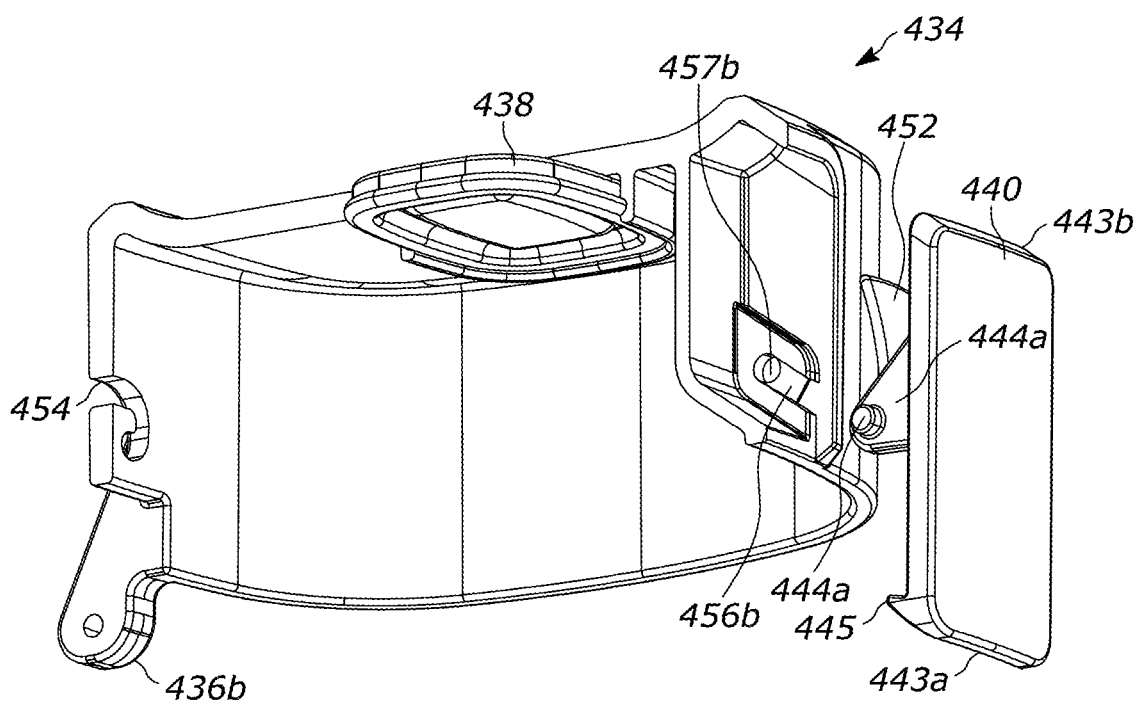
FIG. 102 is a cross-sectional perspective view of the fourth embodiment of the outer lid of a container in accordance with the present disclosure with the locking clip detached.
Figure 103:
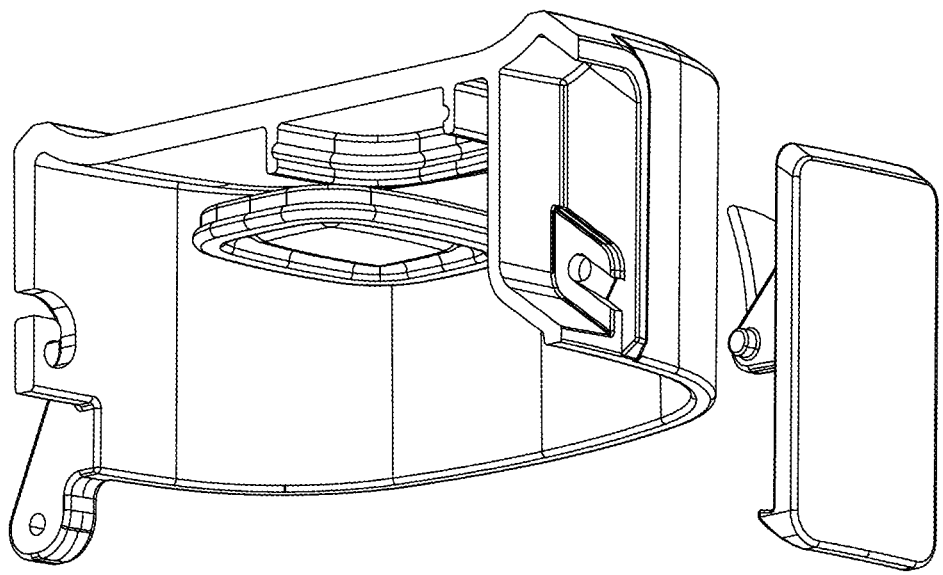
FIG. 103 is a cross-sectional perspective view of the fourth embodiment of the outer lid of a container in accordance with the present disclosure with the locking clip and resilient pad detached.
Figure 104:
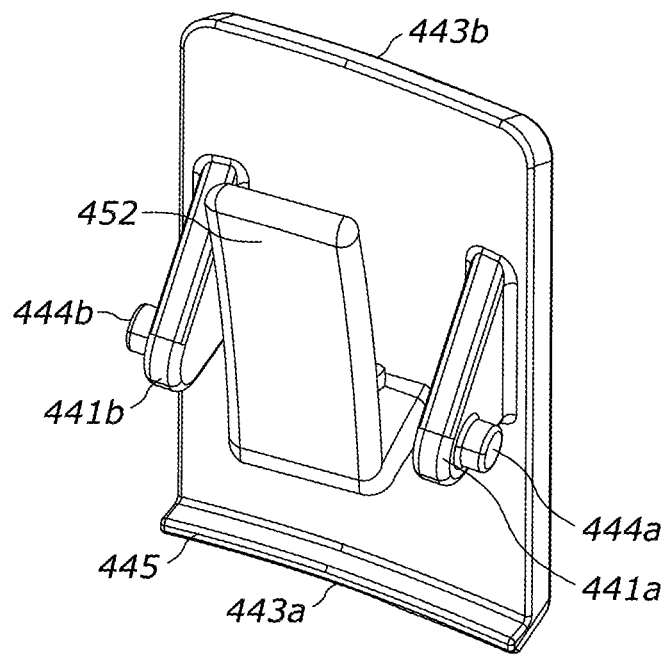
FIG. 104 is a perspective view of the locking clip of FIG. 102.
Figure 105:
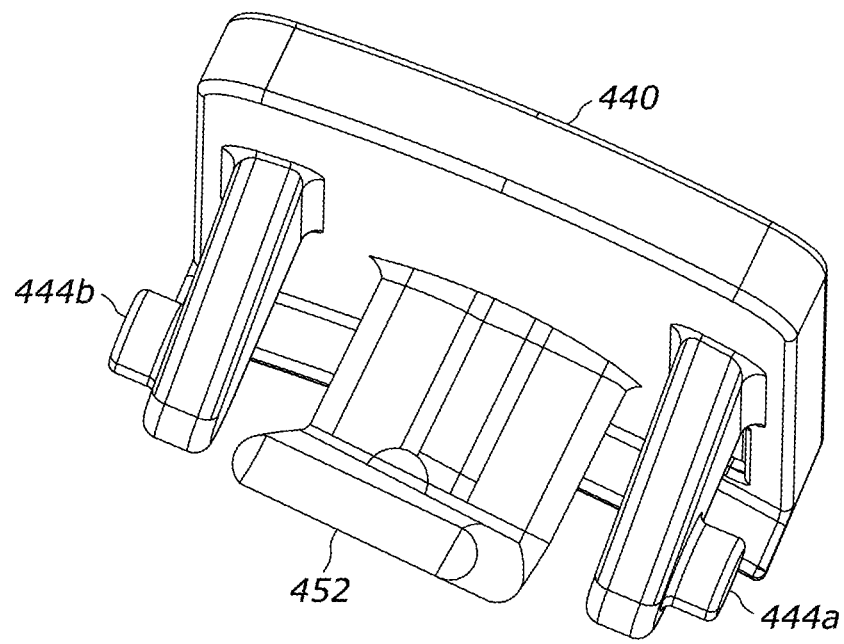
FIG. 105 is a top view of the locking clip of FIG. 102.
Figure 106:
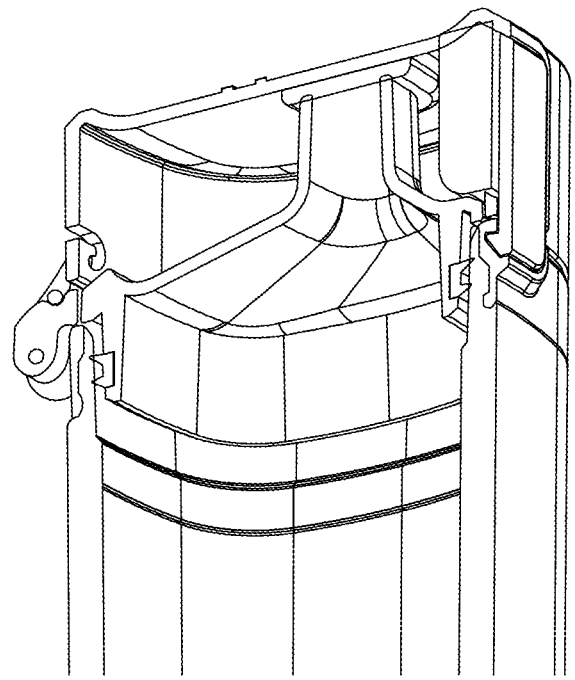
FIG. 106 is a cross-sectional perspective view of the fourth embodiment of the outer lid of a container attached to the container in accordance with the present disclosure.

FIGS. 92 through 106 illustrate a fourth embodiment of a container 400 featuring an improved closure or lid. Except as otherwise noted, the fourth embodiment is generally similar to the first embodiment.

In the embodiment shown, the container 400 has a main body 402 that is generally shaped as a prism with rounded corners. A top end 404a of the main body 402 is open, while the opposite bottom end 404b is closed. The interior of the main body 402 is hollow such that the main body 402 may hold contents (such as food or beverage) securely therein. As will be clear to one of ordinary skill in the art, other shapes (including but not limited to cylinders and prisms) may also be used for the main body 402. Although the main body 402 is shown without a handle, it is also contemplated that a handle (e.g., such as a U-shaped or L-shaped protrusion) may be provided to allow a user to more easily carry the container 400.

As shown, the main body 402 has a multi-wall construction whereby an outer wall 404 is concentrically nested with an inner wall 406, each of which is closed at its bottom end and open at its top end. Together, the inner wall and outer wall form a dual-walled vacuum insulated chamber. In the embodiment shown, the inner wall 406 features a protruding rim 408 that contacts the inner surface of the outer wall 404 when the inner wall 406 is nested therein. The protruding rim 408 is then sealed against the top end 404*a* of the outer wall such that a sealed volume is defined between the inner wall 406 and the outer wall 404. In an embodiment, the outer wall 404 and the inner wall 406 are each made of metal and may be formed through a unitary manufacturing process. In an alternative embodiment, the walls are formed separately before being joined together. In alternative embodiments, other materials such as glass or plastic may be used. The seal between the outer wall 404 and the inner wall 406 may be formed, for example, by soldering, brazing, welding, epoxying, applying adhesive, or co-forming the outer wall 404 and the inner wall 406. In an embodiment, the outer wall 404 and the inner wall 406 are formed from a single piece of material (rather than separate pieces of material joined together). In an embodiment, the sealed volume disposed between the outer wall 404 and the inner wall 406 is at least partially evacuated prior to sealing the outer wall 404 to the inner wall, such that the outer wall 404, the inner wall 406, and the sealed volume therebetween cooperatively form an insulating wall for the main body 402 such that changes in the temperature outside the main body 402 are not immediately felt by the contents of the main body 402, and vice versa. The sealed volume may be evacuated using techniques that are known in the art. In an embodiment, the walls are sealed together but for several small openings. The main body 402 is then placed in a vacuum chamber or low pressurized environment, and the inner volume is evacuated. An epoxy may then be used to seal these openings. In an alternative embodiment, the sealed volume may instead be filled with an insulating material, such as an insulating gel, foam, or gas.

In an alternative embodiment, the outer wall 404 is sealed to the inner wall 406 at the top end 404*a*, with an opening allowing access to the space therebetween at the bottom end 404*b*. In such embodiment, a base plate 460 may be sealed to both the outer wall 406 and the inner wall 404 to create a sealed volume therebetween.

In an embodiment, the bottom end 404*b* features a non-skid base surface. In an embodiment, the non-skid base surface may be formed on (or an inherent property of) a base plate 460 that is then joined to the bottom end 404*b*. In an embodiment, the base plate is made of silicon or a rubberized material. In embodiments, the base plate is joined to the main body 404 using an adhesive, epoxy, and/or a mechanical connection (such as a deformable member and corresponding rim on the main body).

As shown in the Figures, the main body 402 is closed by a lid assembly 403 comprising outer lid 434, inner lid 426, and collar 410.

In the embodiment shown, the collar 410 is joined to the main body 402 proximate the top end 404*a* and provides an attachment point for the outer lid 434 and the inner lid 426. As shown, the collar 410 is placed against the exposed portion of the inner wall 406 such that the exterior surface of the collar 410 sits substantially flush with the outer wall 404. The collar 410 may be sealed to the inner wall 406, for example, by soldering, brazing, welding, epoxying, applying adhesive, or co-forming with the outer wall 404. In an alternative embodiment, the collar 410 is integrally formed with the outer wall 404 and/or the inner wall 406 from a single piece of material (rather than separate pieces of material joined together). The collar 410 surrounds an opening, such that the volume within the inner wall 406 (i.e., where the contents of the container 400 may be located) is accessible through the collar 410.

A pair of outer hinge supports 416*a*, 416*b* extend from the exterior of a rear surface of the collar 410. As shown, each outer hinge support 416*a*, 416*b* comprises an opening 417*a*, 417*b* respectively for receiving a pin 418 that extends between the outer hinge supports 416*a*, 416*b*. In an alternative embodiment, each of the body coupling portion contains an indentation (rather than an opening) and each indentation retains a respective end of the pin 118. A pair of middle hinge supports 436*a*, 436*b* extend from the exterior of a rear surface of the outer lid 434 and a pair of inner hinge supports 432*a*, 432*b* extend from the exterior of a rear surface of the inner lid 426.

A flexible elastic retainer 422 (which may also be referred to as a biasing member) is positioned such that a first end 423*a* is secured by a spacer 420 proximate the pin 418. A second end 423*b* of the retainer 422 is secured to the outer lid 434 via a protrusion 454 surrounded by a slot or opening, which is located between the outer hinge supports 436*a*, 436*b*. As shown, the retainer 422 may comprise a resilient member such as an O-ring or elastic band.

The spacer 420 is shaped so as to have a flat surface configured to rest against the outer wall of the collar 410 when the outer lid 434 is closed, and to be able to rotate away from the outer wall when the outer lid 434 is opened. The spacer 420 further comprises a pair of ends separated by the larger central portion of the spacer 420. These ends may abut inner hinge supports 432*a*, 432*b* and contain openings therein to receive the pin 418, such that the spacer 420 may rotate about the pin 418.

With the outer lid 434 closed, the retainer 422 exerts tension on the outer lid 434 to pull the lid towards the fully opened position (i.e., because the retainer 422 is stretched) and hold the outer lid 434 in an opened position. This "spring loads" the outer lid 434 such that as soon as the locking clip 440 is released, the outer lid 434 opens and permits a user to access the interior of the container 400. The retainer 422 also ensures that the outer lid 434 does not close inadvertently, while still allowing a user to exert pressure to close the outer lid 434.

In an embodiment, the retainer 422 may be installed by first hooking the second end 423*a* about the protrusion 454 in the outer lid 434. With the outer lid in the opened position, the first end 423*a* may be routed through the space between the inner hinge supports 432*a*, 423*b* while the spacer 420 is held away from the container 400. Then, the spacer 420 may be rotated back into contact with the outer wall of the container 400 before releasing the first end 423*a* such that the first end 423*a* is secured to the spacer 420.

In the embodiment shown, when fully opened, the outer lid 434 rests against and is supported by the outer wall of the container 400 such that the bottom edge of the outer lid 434 forms a reflex angle (i.e., an angle of greater than 180 degrees) with the opening of the collar 410. This reflex angle enables a user to drink from the container without contacting the outer lid 434.

In an embodiment, the retainer 422 functions as a tensioning mechanism and is connected to the outer lid 134 such that the outer lid 434 is pulled towards the fully opened position. In this manner, absent pressure on the outer lid 434 (e.g., from a user's hand or from the locking clip 440), the outer lid 434 will remain in the fully opened position. This further enables the container to be easily cleaned, such as in a dishwasher, as the outer lid 434 will not obstruct access to the interior of the container 400 unless sealed in the closed position (e.g., through use of the locking clip 440).

The outer lid 434 is configured to close over the entire open end of the collar 410 (including the inner lid 426).

The outer lid 434 may be secured to the collar 410 in a closed position through the use of the locking clip 440. The locking clip 440 is rotatably connected to the front face of the outer lid 434 by a pair of bosses 444a, 444b which are each joined to the interior surface of the locking clip 440 by a respective support 441a, 441b. The ends of the pair of bosses 444a, 444b are held by corresponding slots 456a, 456b in the front side of the outer lid 434. In the embodiment shown, the supports 441a, 441b are resilient and the slots 456a, 456b are angled such that the distance between the slots 456a, 456b decreases further from the openings of the slots 456a, 456b. Each of the slots 456a, 456b terminates in an indentation 457a, 457b. As the bosses 444a, 444b are pushed into the slots 456a, 456b, the angle of the slots 456a, 456b causes the supports 441a, 441b to flex inwards. When the bosses 444a, 444b reach and enter the indentations 457a, 457b, the supports 441a, 441b return to their initial unflexed positions, thereby securing the bosses 444a, 444b in the indentations 457a, 457b (and rotatably connecting the locking clip 440 to the outer lid 434. The locking clip 440 can be removed by pressing the supports 441a, 441b together until the bosses 444a, 444b are free of the indentations 457a, 457b, allowing the bosses 444a, 444b to be moved away from the outer lid 434.

A resilient member 452 extends from the locking clip 440 and abuts the surface of the outer lid 434 when the locking clip 440 is rotatably connected to the outer lid 434. The resilient member 452 biases the locking clip such that the top end 443b of the locking clip 440 is pushed away from the outer lid 434 and the lower end 443a of the locking clip 440 is pushed towards the outer lid 434. In an embodiment, the resilient member 452 is integrally formed with the locking clip 440. In an embodiment, the resilient member is formed from a plastic or polymer.

A protrusion 445 extends away from the inner surface of the locking pin 444 at the lower end 443a and may be secured in a locking ridge 414 located on the front face of the collar 410. In use, the protrusion 445 on the locking clip 440 is secured to the locking ridge 414. The locking spring 442 pushes the protrusion against the locking ridge 414 until it is released by a user pressing against the top end 443b of the locking clip 440.

In an embodiment, the locking clip 440, supports 441a, 441b, bosses 444a, 444b, and resilient member 452 are integrally formed together from a single material, such as by using a molding process.

The inner lid 426 comprises an inner rim 428 configured to hold a deformable resilient seal 424, which may be one or more O-rings or similar structures. When the inner lid 426 is in a closed position, the inner rim 428 is located within the collar 410 and the seal 424 is pressed against the outer surface of the inner rim 428 and the inner surface of the collar 410, thereby sealing the inner lid 426 against the collar 410. The inner lid 426 further comprises a spout 430 with an opening therein adapted to allow the contents of the container 400 (e.g., a beverage) to be accessed without opening the inner lid 426. The outer lid 434 comprises a deformable resilient pad 438 positioned on the inner surface of the outer lid 434, such that when the outer lid 434 is closed the pad 438 presses against the spout 430. In the embodiment shown, the locking clip 440 applies downward pressure to the outer lid 434 such that the pad 438 seals the opening of the spout 430, preventing the contents of the container 400 from passing through the spout 438 when the outer lid 434 is closed. As shown, the pad 438 includes a rim that is secured within a channel in the outer lid 434. Other suitable structures for removably connecting the pad 438 to the outer lid 434 are also contemplated.

Fifth Embodiment

Figure 107:
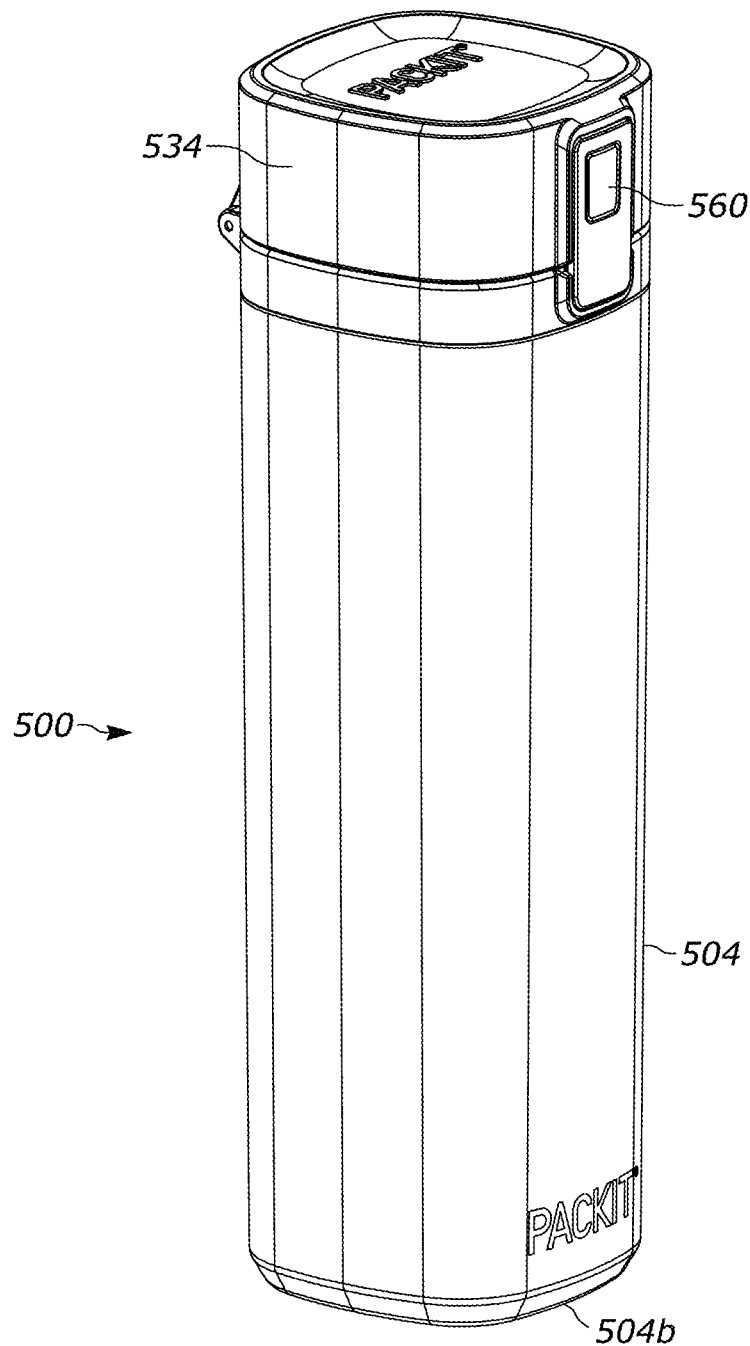
FIG. 107 is a perspective view of a fifth embodiment of a container in accordance with the present disclosure with the lid in a closed position.
Figure 108:
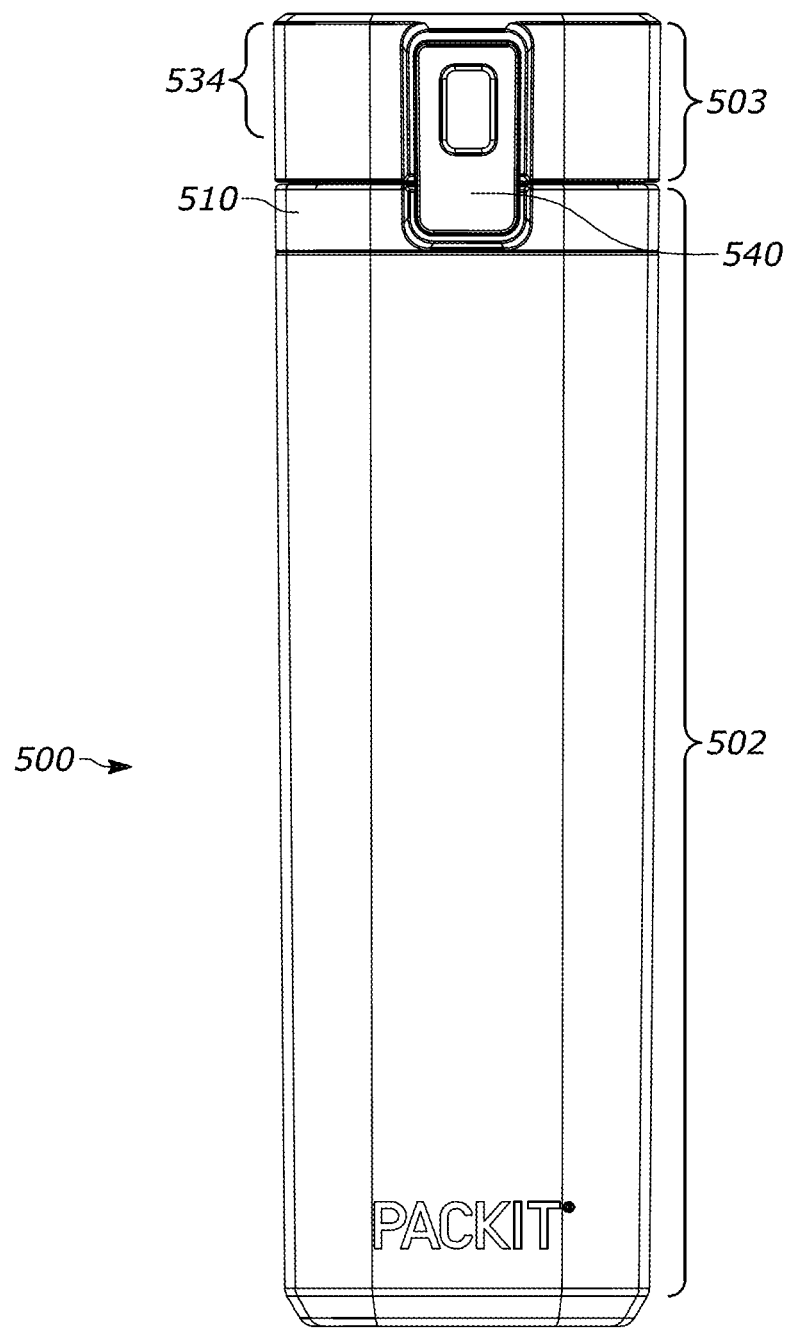
FIG. 108 is a front elevation view of the fifth embodiment of a container in accordance with the present disclosure with the lid in the closed position.
Figure 109:
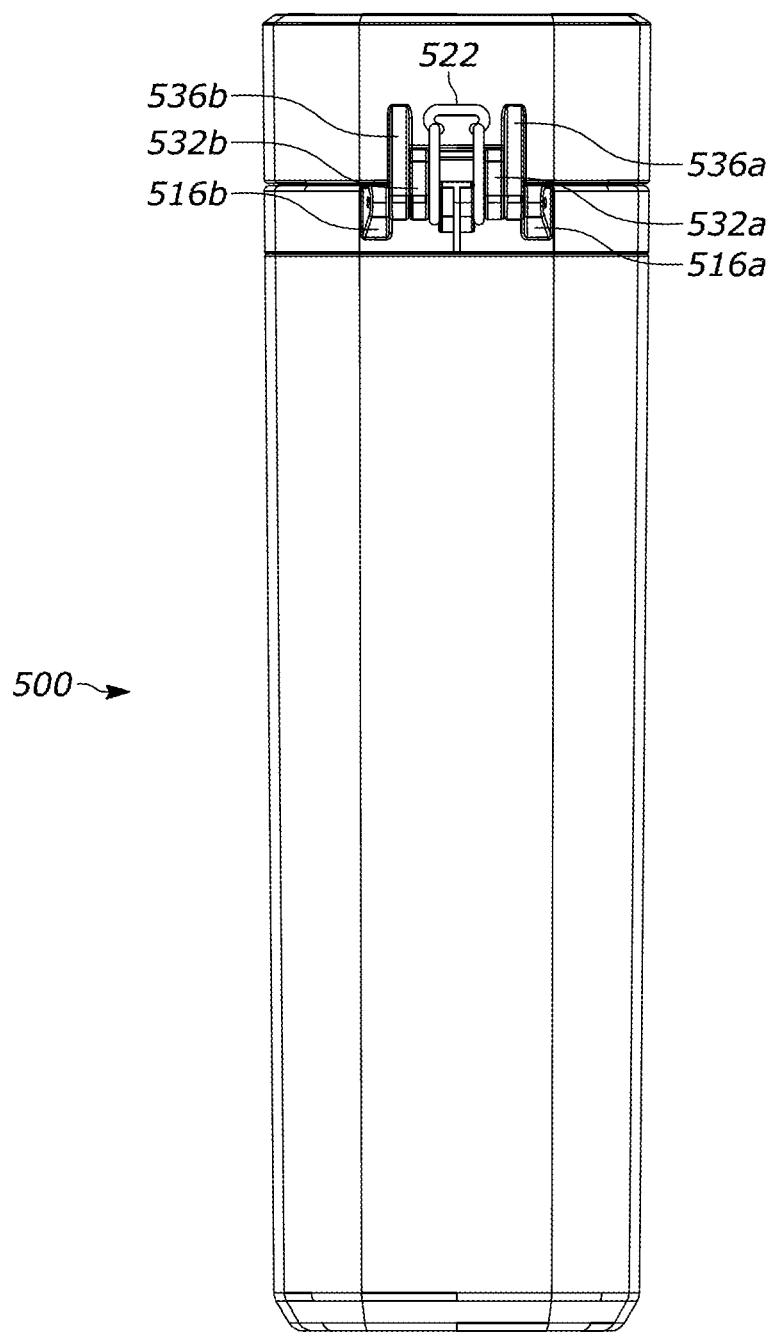
FIG. 109 is a rear elevation view of the fifth embodiment of a container in accordance with the present disclosure with the lid in the closed position.
Figure 110:
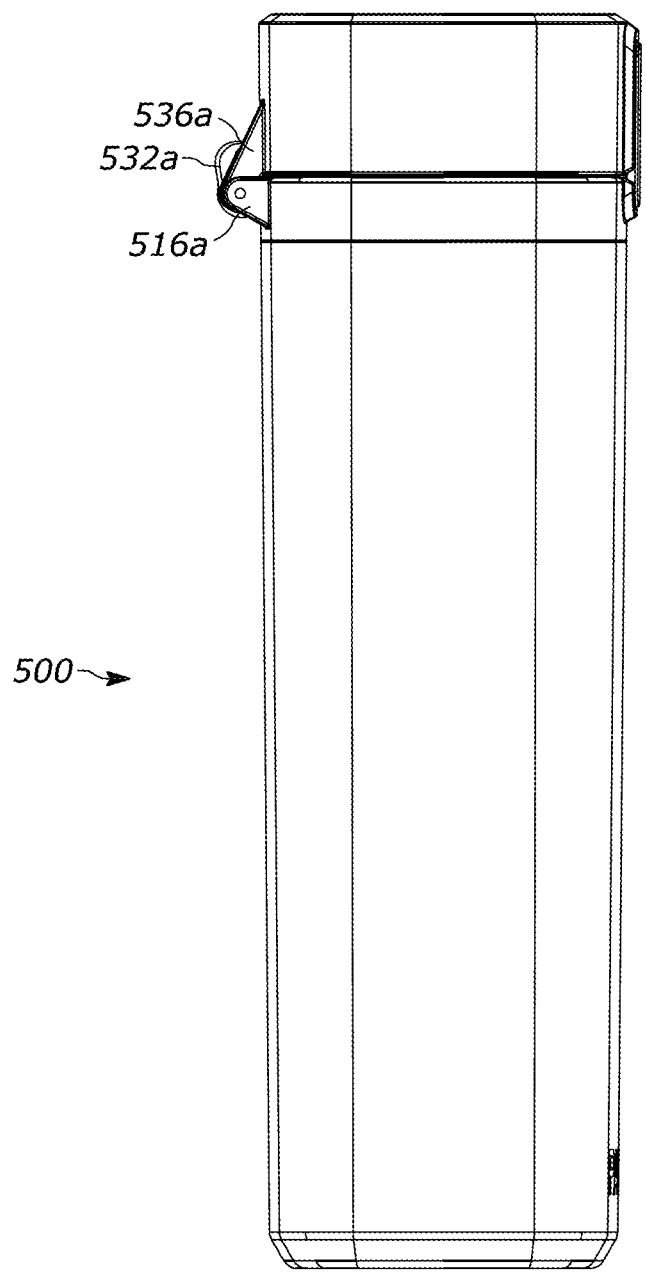
FIG. 110 is a right elevation side view of the fifth embodiment of a container in accordance with the present disclosure with the lid in the closed position.
Figure 111:
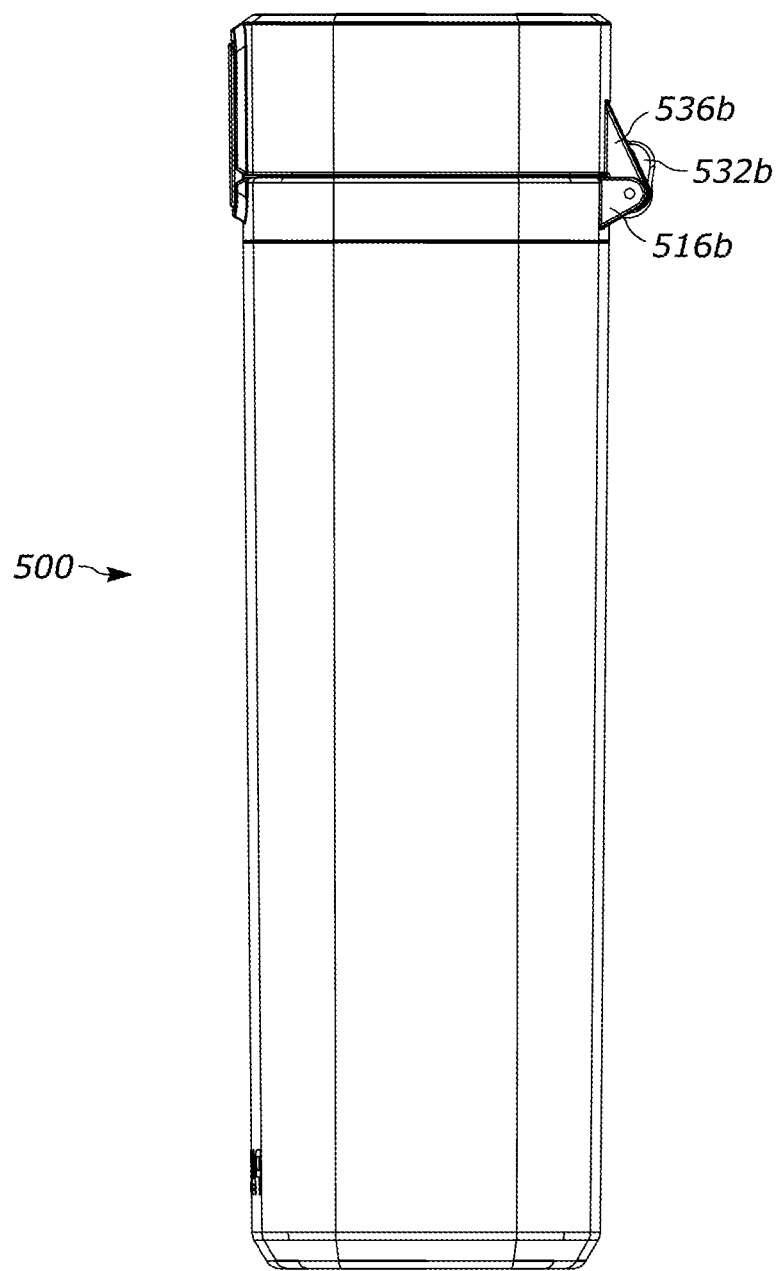
FIG. 111 is a left elevation side view of the fifth embodiment of a container in accordance with the present disclosure with the lid in the closed position.
Figure 112:
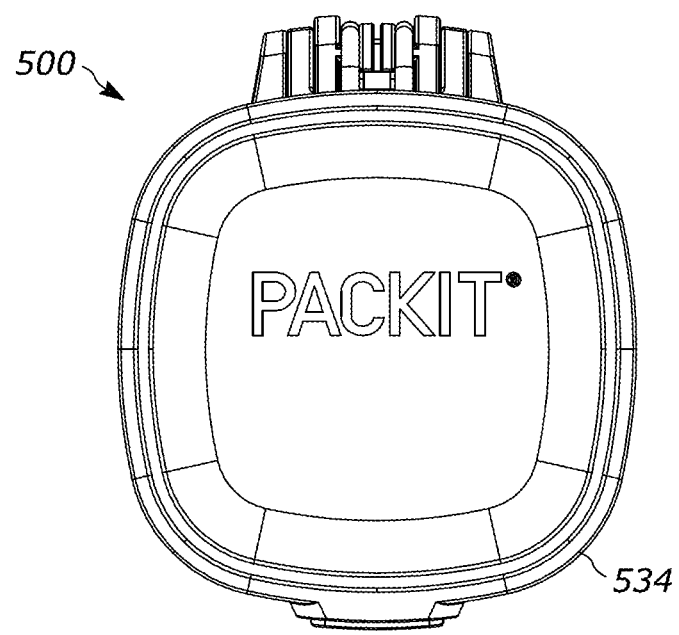
FIG. 112 is a top plan view of the fifth embodiment of a container in accordance with the present disclosure with the lid in the closed position.
Figure 113:
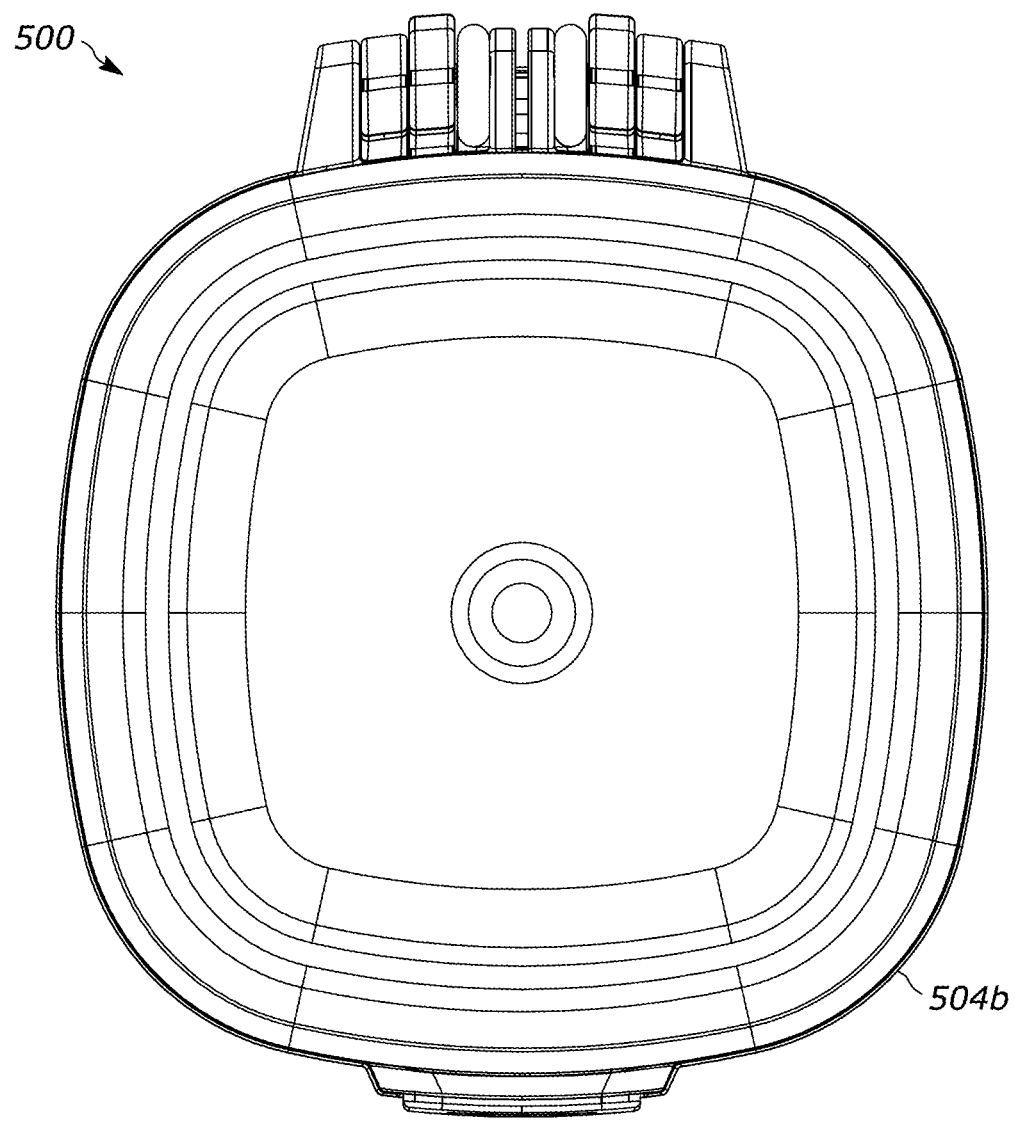
FIG. 113 is a bottom plan view of the fifth embodiment of a container in accordance with the present disclosure with the lid in the closed position.
Figure 114:
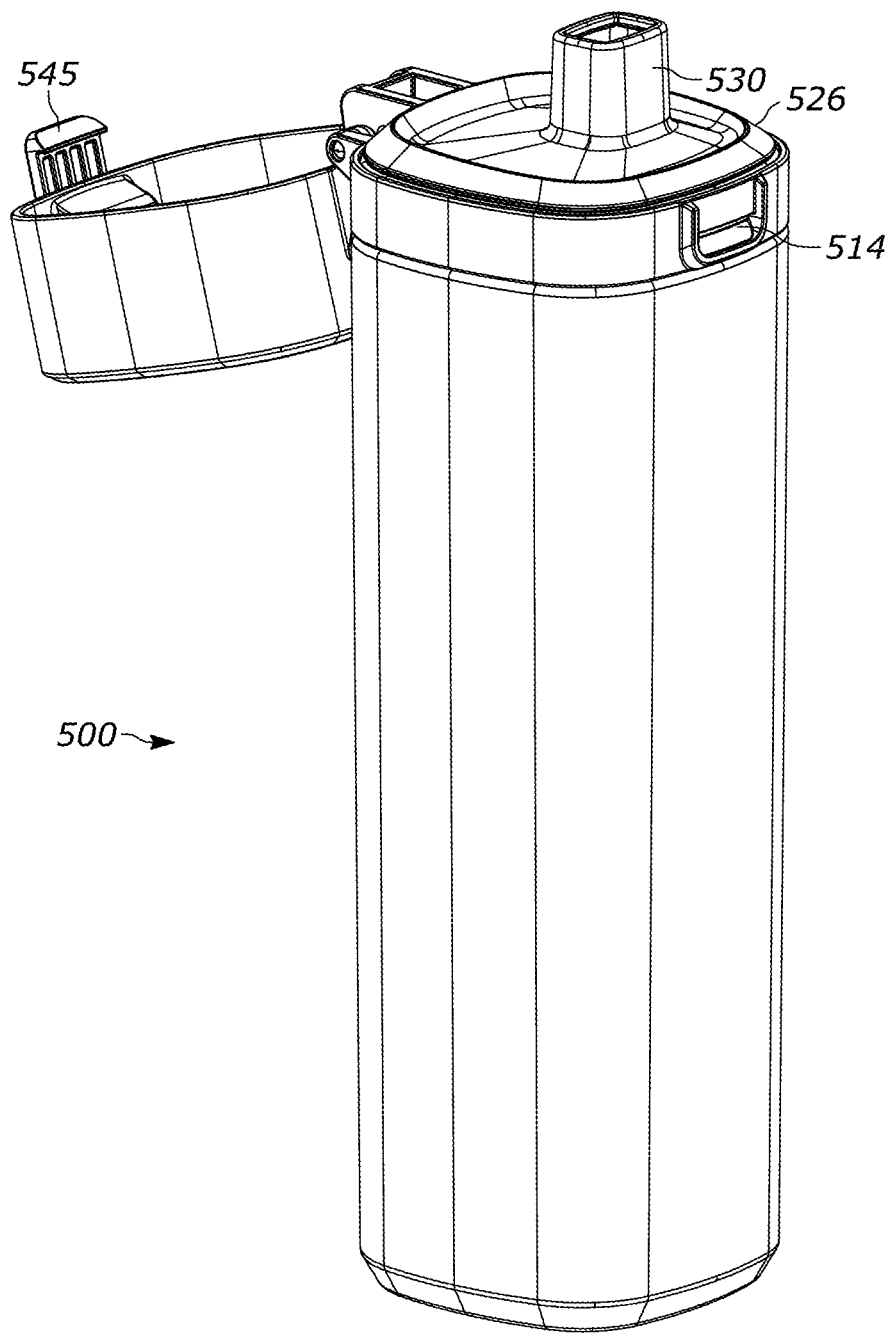
FIG. 114 a perspective view of the fifth embodiment of a container in accordance with the present disclosure with the outer lid in an opened position.
Figure 115:
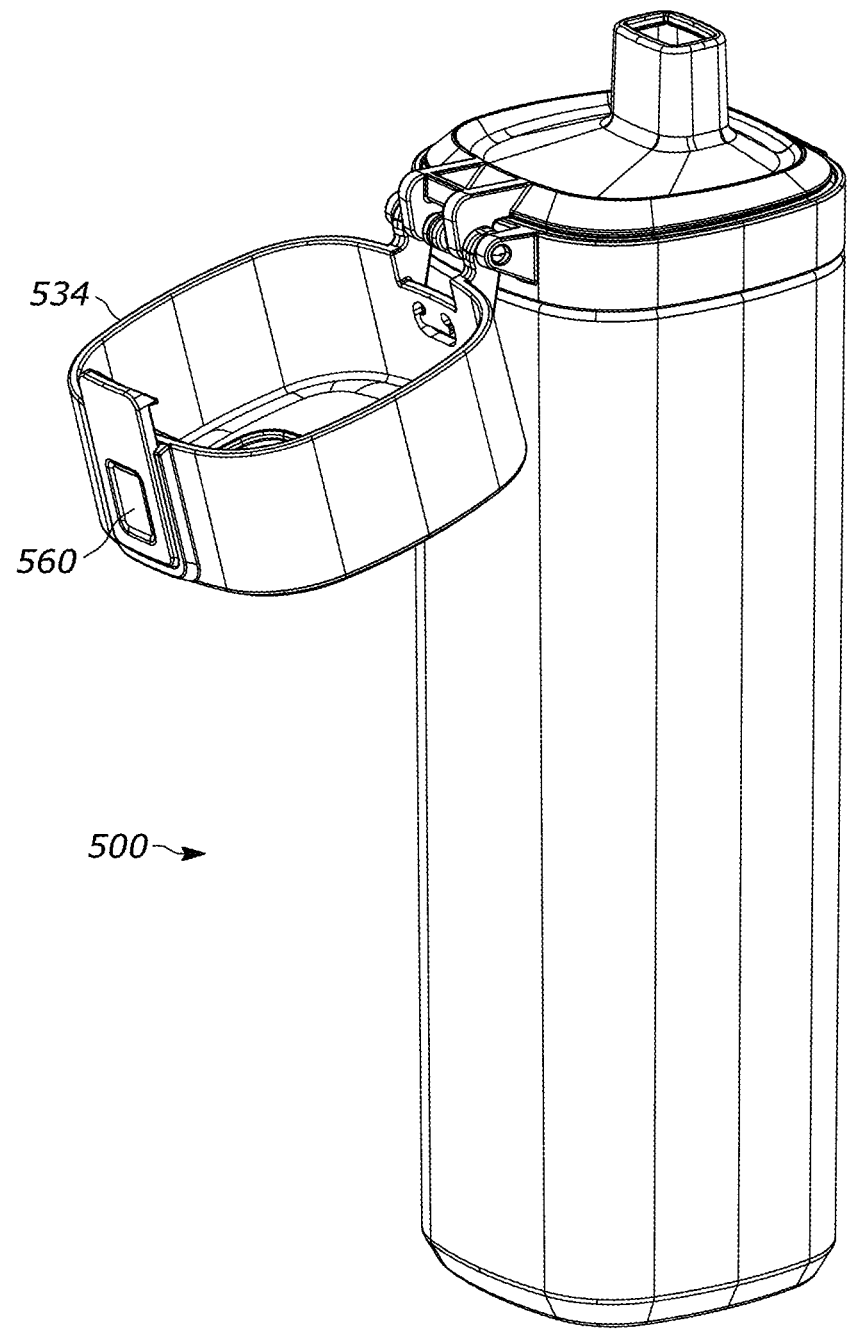
FIG. 115 is a perspective view of a fifth embodiment of a container in accordance with the present disclosure with the outer lid in an open position.
Figure 116:
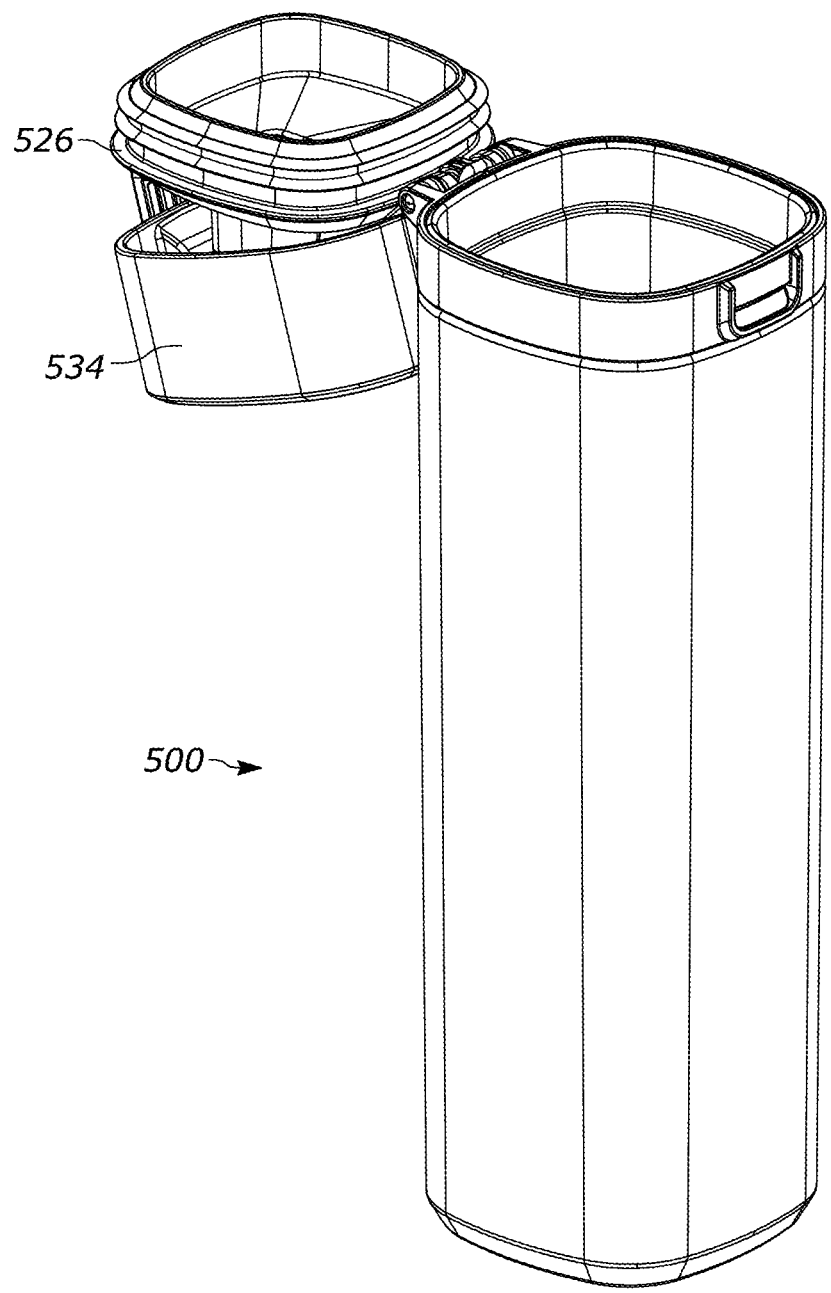
FIG. 116 is a perspective view of the fifth embodiment of a container in accordance with the present disclosure with both lids in an open position.
Figure 117:
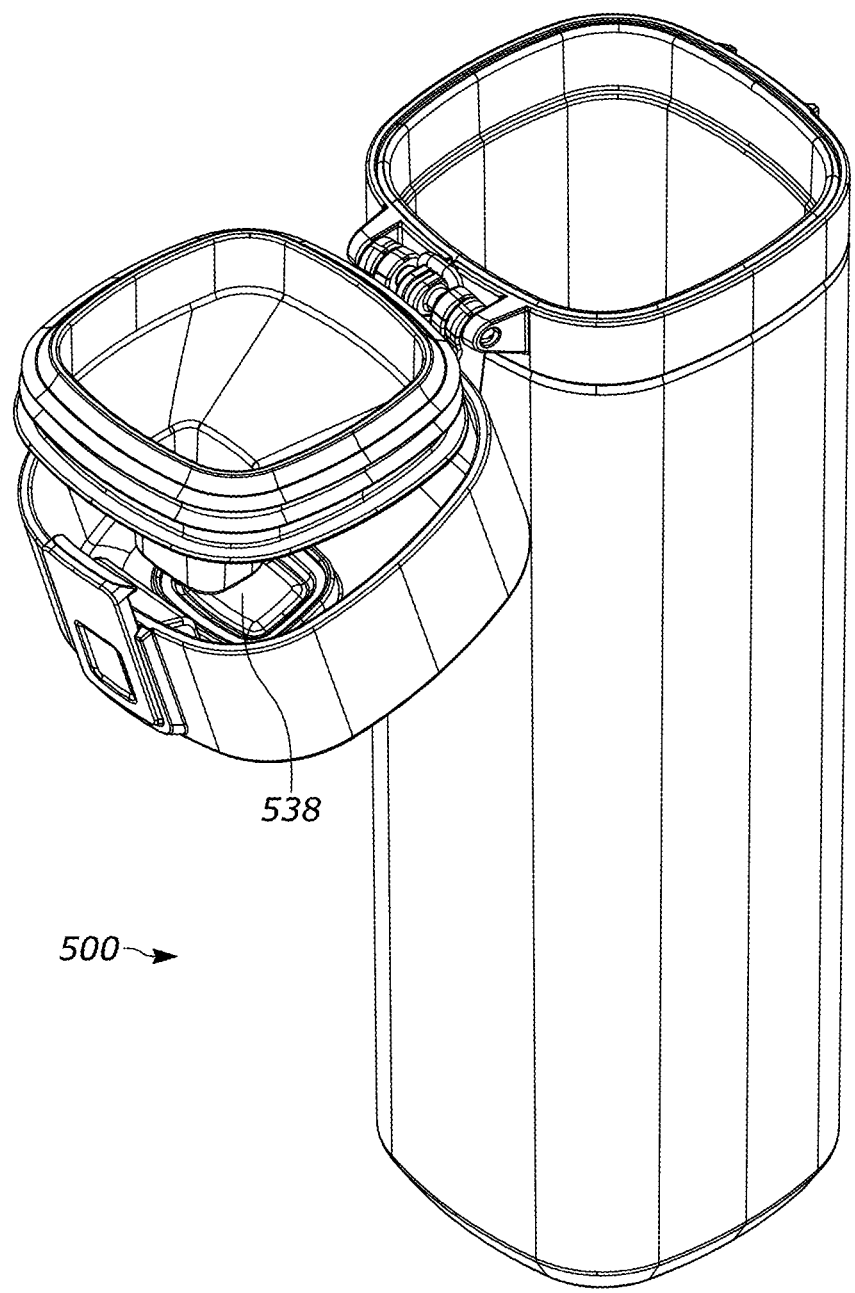
FIG. 117 is a second perspective view of the fifth embodiment of a container in accordance with the present disclosure with both lids in an open position.
Figure 118:
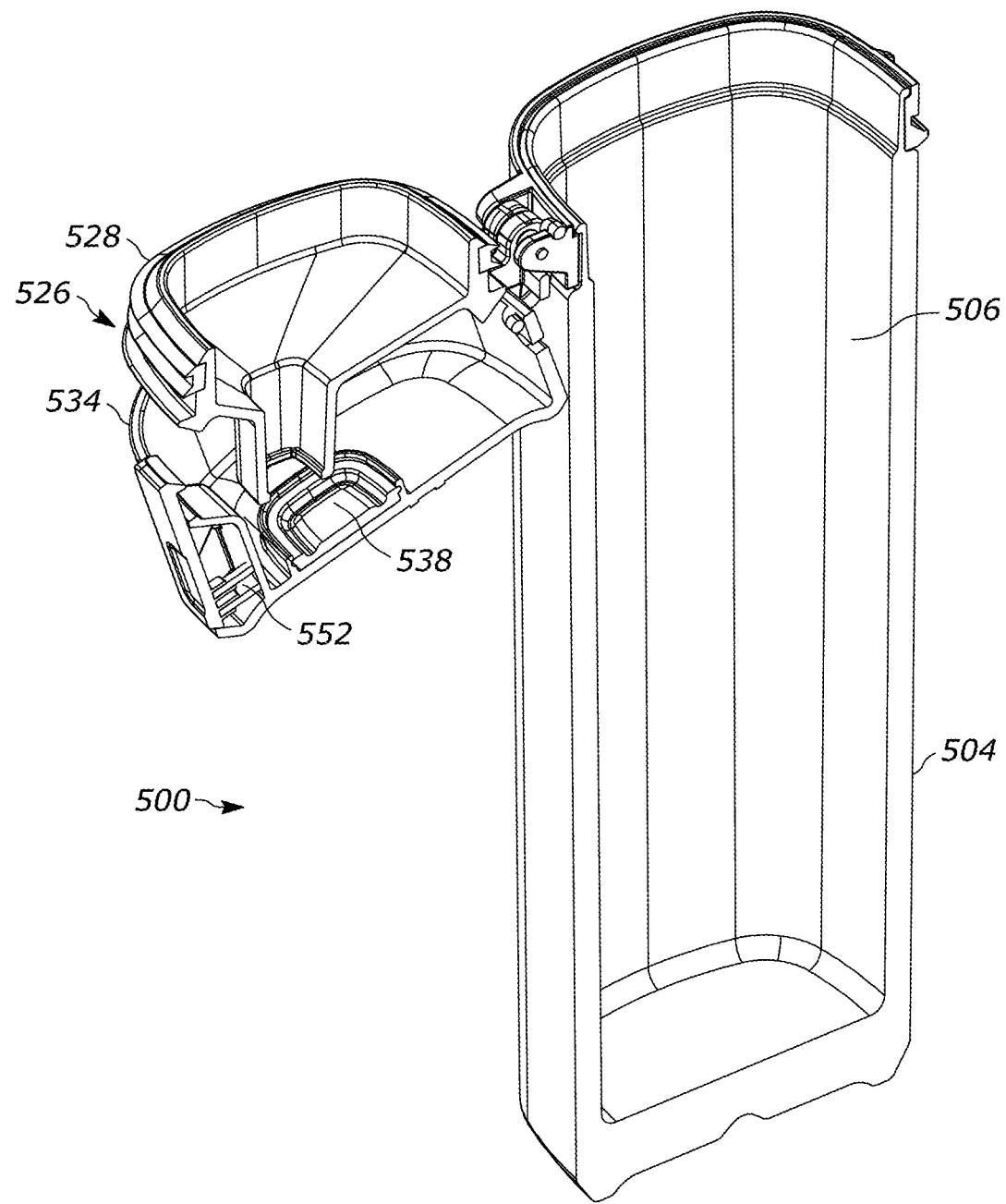
FIG. 118 is a right elevation cross-sectional view of the fifth embodiment of a container in accordance with the present disclosure with both lids in an open position.
Figure 119:
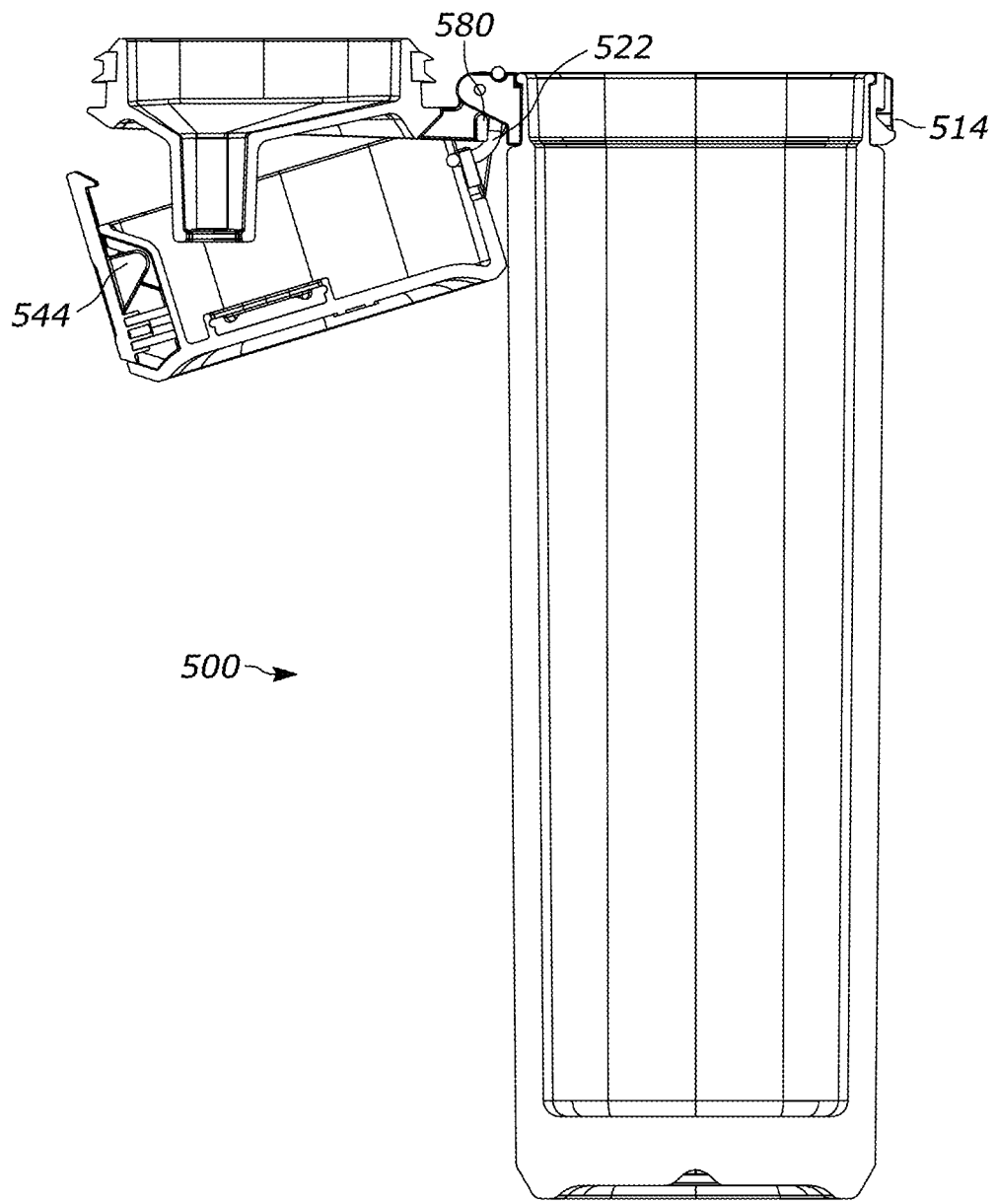
FIG. 119 is a right cross-sectional view of the fifth embodiment of a container in accordance with the present disclosure with both lids in an open position.
Figure 120:
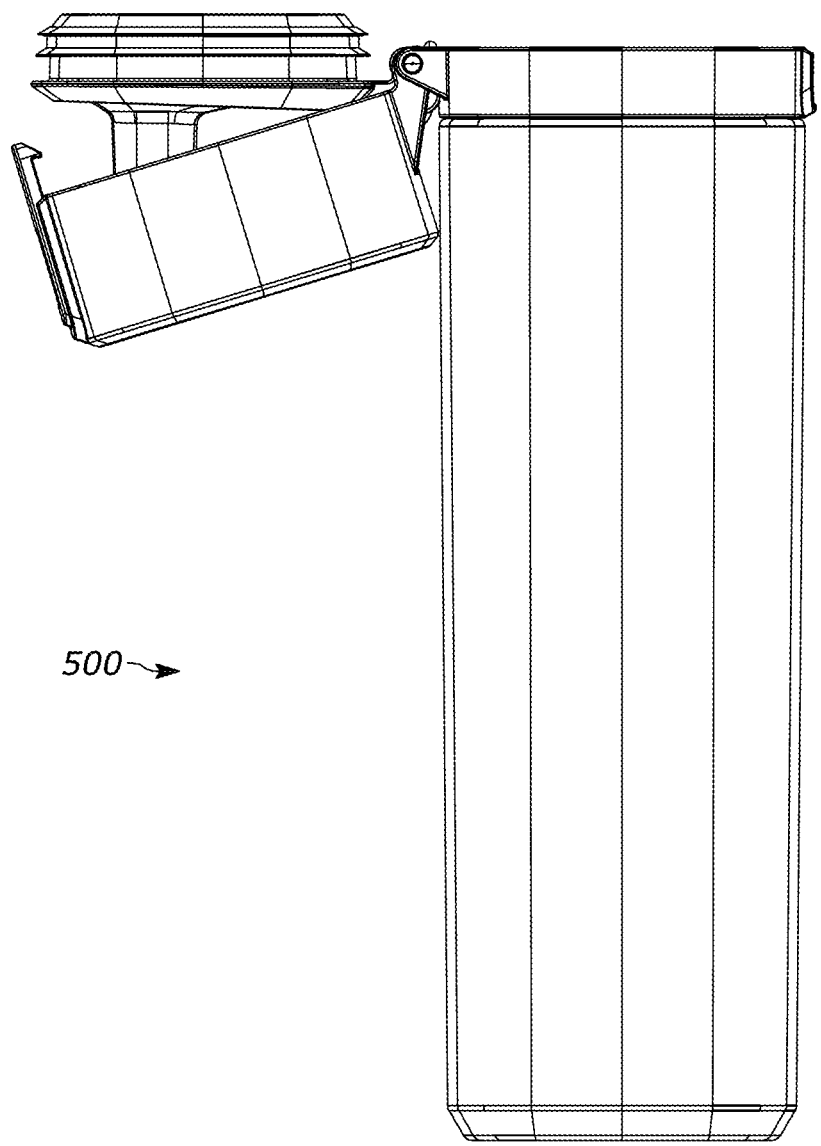
FIG. 120 is a right side view of the fifth embodiment of a container in accordance with the present disclosure with both lids in an open position.
Figure 121:
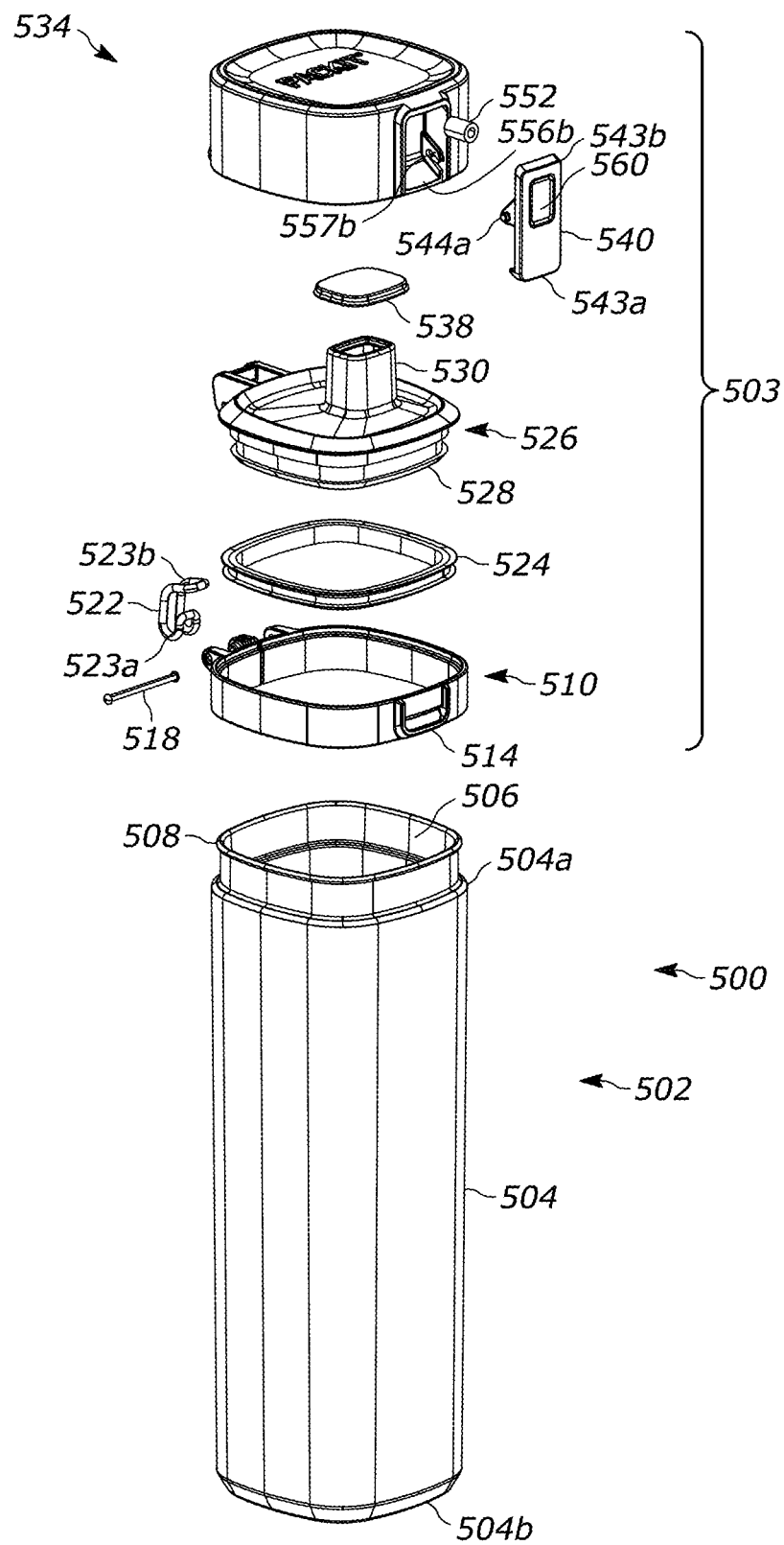
FIG. 121 is an annotated exploded view of the fifth embodiment of a container in accordance with the present disclosure.
Figure 122:
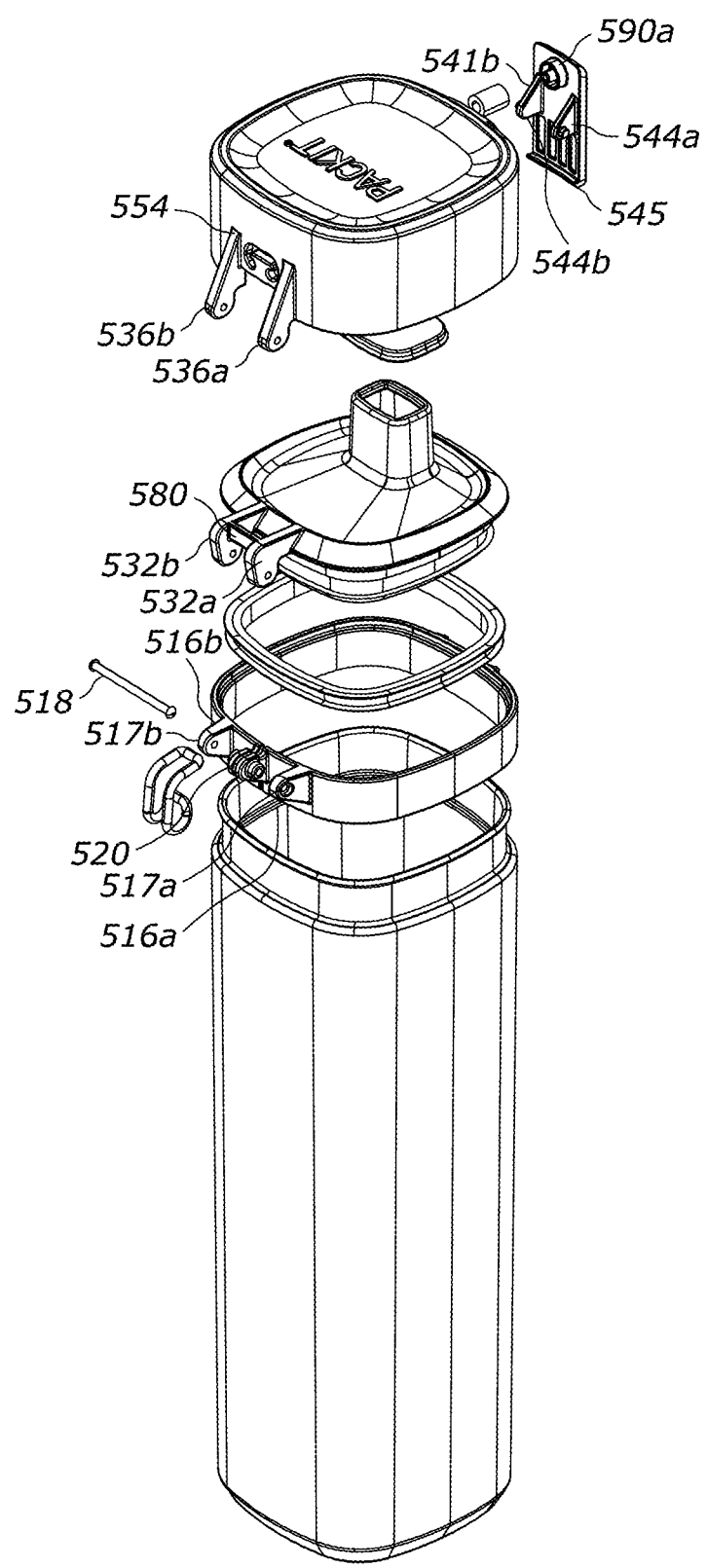
FIG. 122 is a second annotated exploded view of the fifth embodiment of a container in accordance with the present disclosure.

FIGS. 107 through 122 illustrate a fourth embodiment of a container 500 featuring an improved closure for the lid. Except as otherwise noted, the fifth embodiment is generally similar to the first embodiment.

In the embodiment shown, the container 500 has a main body 502 that is generally shaped as a prism with rounded corners. A top end 504a of the main body 402 is open, while the opposite bottom end 504b is closed. The interior of the main body 502 is hollow such that the main body 502 may hold contents (such as food or beverage) securely therein. As will be clear to one of ordinary skill in the art, other shapes (including but not limited to cylinders and prisms) may also be used for the main body 502. Although the main body 502 is shown without a handle, it is also contemplated that a handle (e.g., such as a U-shaped or L-shaped protrusion) may be provided to allow a user to more easily carry the container 500.

As shown, the main body 502 has a multi-wall construction whereby an outer wall 404 is concentrically nested with an inner wall 506, each of which is closed at its bottom end and open at its top end. Together, the inner wall and outer wall form a dual-walled vacuum insulated chamber. In the embodiment shown, the inner wall 506 features a protruding rim 508 that contacts the inner surface of the outer wall 504 when the inner wall 506 is nested therein. The protruding rim 508 is then sealed against the top end 504a of the outer wall such that a sealed volume is defined between the inner wall 506 and the outer wall 504. In an embodiment, the outer wall 504 and the inner wall 506 are each made of metal and may be formed through a unitary manufacturing process. In an alternative embodiment, the walls are formed separately before being joined together. In alternative embodiments, other materials such as glass or plastic may be used. The seal between the outer wall 504 and the inner wall 506 may be formed, for example, by soldering, brazing, welding, epoxying, applying adhesive, or co-forming the outer wall 504 and the inner wall 506. In an embodiment, the outer wall 504 and the inner wall 506 are formed from a single piece of material (rather than separate pieces of material joined together). In an embodiment, the sealed volume disposed between the outer wall 504 and the inner wall 506 is at least partially evacuated prior to sealing the outer wall 504 to the inner wall, such that the outer wall 504, the inner wall 506, and the sealed volume therebetween cooperatively form an insulating wall for the main body 502 such that changes in the temperature outside the main body 502 are not immediately felt by the contents of the main body 502, and vice versa. The sealed volume may be evacuated using techniques that are known in the art. In an embodiment, the walls are sealed together but for several small openings. The main body 502 is then placed in a vacuum chamber or low pressurized environment, and the inner volume is evacuated. An epoxy may then be used to seal these openings. In an alternative embodiment, the sealed volume may instead be filled with an insulating material, such as an insulating gel, foam, or gas.

As shown in the Figures, the main body 502 is closed by a lid assembly 503 comprising outer lid 534, inner lid 526, and collar 510.

In an embodiment, the main body 502 is tapered such that the body is wider at the top than at the bottom to keep the collar 510 secured to the main body 502 such that any expansion or contraction of the material will not affect the ability to attach the main body 502 and close lid assembly 503.

In the embodiment shown, the collar 510 is joined to the main body 502 proximate the top end 504a and provides an attachment point for the outer lid 534 and the inner lid 526. As shown, the collar 510 is placed against the exposed portion of the inner wall 506 such that the exterior surface of the collar 510 sits substantially flush with the outer wall 504. The collar 510 may be sealed to the inner wall 506, for example, by soldering, brazing, welding, epoxying, applying adhesive, or co-forming with the outer wall 504. In an alternative embodiment, the collar 510 is integrally formed with the outer wall 504 and/or the inner wall 506 from a single piece of material (rather than separate pieces of material joined together). The collar 510 surrounds an opening, such that the volume within the inner wall 506 (i.e., where the contents of the container 500 may be located) is accessible through the collar 510.

A pair of outer hinge supports 516a, 516b extend from the exterior of a rear surface of the collar 410. As shown, each outer hinge support 516a, 516b comprises an opening 517a, 517b respectively for receiving a pin 518 that extends between the outer hinge supports 516a, 516b. In an alternative embodiment, each of the body coupling portion contains an indentation (rather than an opening) and each indentation retains a respective end of the pin 518. A pair of middle hinge supports 536a, 536b extend from the exterior of a rear surface of the outer lid 534 and a pair of inner hinge supports 532a, 532b extend from the exterior of a rear surface of the inner lid 526.

A flexible elastic retainer 522 (which may also be referred to as a biasing member) is positioned such that a first end 523a is secured by a spacer 520 proximate the pin 518. A second end 523b of the retainer 522 is secured to the outer lid 534 via a protrusion 554 surrounded by a slot or opening, which is located between the outer hinge supports 536a, 536b. As shown, the retainer 522 may comprise a resilient member such as an O-ring or elastic band.

The spacer 520 is attached to the outer wall of the collar 510 between hinge supports 516a and 516b. The spacer 520 further comprises a pair of ends separated by the larger central portion of the spacer 520. These ends may abut inner hinge supports 532a, 532b and contain openings therein to receive the pin 518, such that the spacer 520 may rotate about the pin 518.

With the outer lid 534 closed, the retainer 522 exerts tension on the outer lid 534 to pull the lid towards the fully opened position (i.e., because the retainer 522 is stretched) and hold the outer lid 534 in an opened position. This "spring loads" the outer lid 534 such that as soon as the locking clip 540 is released, the outer lid 534 opens and permits a user to access the interior of the container 500. The retainer 522 also ensures that the outer lid 534 does not close inadvertently, while still allowing a user to exert pressure to close the outer lid 534.

In an embodiment, the retainer 522 is installed by first hooking the second end 523b about the protrusion 554 in the outer lid 534 and hooking the first end 523a through the space between the inner hinge supports 532a, 532b and about the bottom of the spacer 520 before insertion of the pin 518.

A horizontal member 580 extends between the inner hinge supports 532a, 532b. When fully opened, the horizontal member 580 contacts the retainer 522 such that the inner lid 526 is spaced apart from the outer lid 534. In this embodiment, when fully opened, the horizontal member 580 supports the inner lid 526 such that the inner lid 526 forms a 180 degree angle with the opening of the collar. In alternative embodiments, the horizontal member 580, when fully opened, supports the inner lid 526 such that the inner lid 526 is capable of forming other angles.

In the embodiment shown, when fully opened, the outer lid 534 rests against and is supported by the outer wall of the container 500 such that the bottom edge of the outer lid 534 forms a reflex angle (i.e., an angle of greater than 180 degrees) with the opening of the collar 510. This reflex angle enables a user to drink from the container without contacting the outer lid 534.

In an embodiment, the retainer 522 functions as a tensioning mechanism and is connected to the outer lid 534 such that the outer lid 534 is pulled towards the fully opened position. In this manner, absent pressure on the outer lid 534 (e.g., from a user's hand or from the locking clip 540), the outer lid 534 will remain in the fully opened position. This further enables the container to be easily cleaned, such as in a dishwasher, as the outer lid 534 will not obstruct access to the interior of the container 500 unless sealed in the closed position (e.g., through use of the locking clip 540).

The outer lid 534 is configured to close over the entire open end of the collar 510 (including the inner lid 526).

The outer lid 534 may be secured to the collar 510 in a closed position through the use of the locking clip 540. The locking clip 540 is rotatably connected to the front face of the outer lid 534 by a pair of bosses 544a, 544b which are each joined to the interior surface of the locking clip 540 by a respective support 541a, 541b. The ends of the pair of bosses 544a, 544b are held by corresponding slots 556a, 556b in the front side of the outer lid 534. In the embodiment shown, the supports 541a, 541b are resilient and the slots 556a, 556b are angled such that the distance between the slots 556a, 556b decreases further from the openings of the slots 556a, 556b. Each of the slots 556a, 556b terminates in an indentation 557a, 557b. As the bosses 544a, 544b are pushed into the slots 556a, 556b, the angle of the slots 556a, 556b causes the supports 541a, 541b to flex inwards. When the bosses 544a, 544b reach and enter the indentations 557a, 557b, the supports 541a, 541b return to their initial unflexed positions, thereby securing the bosses 544a, 544b in the indentations 557a, 557b (and rotatably connecting the locking clip 540 to the outer lid 534. The locking clip 540 can be removed by pressing the supports 541a, 541b together until the bosses 544a, 544b are free of the indentations 557a, 557b, allowing the bosses 544a, 544b to be moved away from the outer lid 534.

An outer and inner cylindrical projection 509a, 509b extends from the locking clip 540 and is capable of securing a resilient member 552 between its projections.

A resilient member 552 extends from the cylindrical projections 509a, 509b and is capable of abutting the surface of the outer lid 534. When a user presses on the button 560, the locking clip 540 is rotated and the resilient member 552 is compressed against the outer lid 534. The resilient member 552 biases the locking clip such that when the locking clip 540 is rotated, the top end 543b of the locking clip 540 is pushed away from the outer lid 534. In an embodiment, the resilient member 552 is formed from a plastic or polymer.

In a further embodiment, the resilient member 552 is held in place with cylindrical projections on both the outer lid 534 and the locking mechanism 540.

A protrusion 545 extends away from the inner surface of the locking pin 544 at the lower end 543a and may be secured in a locking ridge 514 located on the front face of the collar 510. In use, the protrusion 545 on the locking clip 540 is secured to the locking ridge 514. The protrusion 545 is latched against the locking ridge 514 until it is released by a user pressing against the button 560 of the locking clip 540.

In an embodiment, the locking clip 540, supports 541a, 541b, bosses 544a, 544b, and resilient member 552 are integrally formed together from a single material, such as by using a molding process.

The inner lid 526 comprises an inner rim 528 configured to hold a deformable resilient seal 524, which may be one or more O-rings or similar structures. When the inner lid 526 is in a closed position, the inner rim 528 is located within the collar 510 and the seal 524 is pressed against the outer surface of the inner rim 528 and the inner surface of the collar 510, thereby sealing the inner lid 526 against the collar 510. The inner lid 526 further comprises a spout 530 with an opening therein adapted to allow the contents of the container 500 (e.g., a beverage) to be accessed without opening the inner lid 526. The outer lid 534 comprises a deformable resilient pad 538 positioned on the inner surface of the outer lid 534, such that when the outer lid 534 is closed the pad 538 presses against the spout 530. In the embodiment shown, the locking clip 540 applies downward pressure to the outer lid 534 such that the pad 538 seals the opening of the spout 530, preventing the contents of the container 500 from passing through the spout 538 when the outer lid 534 is closed. As shown, the pad 538 includes a rim that is secured within a channel in the outer lid 534. Other suitable structures for removably connecting the pad 538 to the outer lid 534 are also contemplated.

It is understood that the preceding is merely a detailed description of some examples and embodiments of the present invention and that numerous changes to the disclosed embodiments may be made in accordance with the disclosure made herein without departing from the spirit or scope of the invention. The preceding description, therefore, is not meant to limit the scope of the invention but to provide sufficient disclosure to allow one of ordinary skill in the art to practice the invention without undue burden. It is further understood that the scope of the present invention fully encompasses other embodiments that may become obvious to those skilled in the art and that the scope of the present invention is accordingly limited by nothing other than the appended claims.

What is claimed is:

1. A container having a rear face, a front face, and a top end, the container comprising:
    an inner wall open at the top end defining a cavity accessible via the top end;
    an outer wall at least partially surrounding the inner wall and defining an interior volume between the inner wall and the outer wall, the outer wall comprising a recess;
    an inner rim extending between the outer wall and the inner wall proximate the top end;
    a collar configured to engage the recess proximate the top end;
    a hinge support extending from the rear face, the hinge support comprising an inner hinge support, a middle hinge support, and a horizontal member;
    one or more locking ridges for a locking mechanism disposed on the front face;
    an inner lid rotatably connected to the hinge support and configured to move between a first closed position in which the inner lid at least partially obstructs access to the cavity and a first open position in which the cavity may be accessed;
    a first deformable resilient seal located between the inner lid and the inner rim of the container when the inner lid is in the first closed position to seal the inner lid against the inner rim of the container;
    an outer lid rotatably connected to the hinge support and configured to move between a second closed position in which the outer lid obstructs access to the cavity and the inner lid and a second open position in which the inner lid may be accessed;
    a second deformable resilient seal disposed on an inner surface of the outer lid to seal the container when the outer lid is in the second closed position;
    wherein, the horizontal member is disposed so as to space the inner lid away from the outer lid when the outer lid is in the second open position.

* * * * *